(12) United States Patent
Holman et al.

(10) Patent No.: US 9,037,087 B2
(45) Date of Patent: May 19, 2015

(54) SYSTEMS AND METHODS FOR PROVIDING ONE OR MORE FUNCTIONALITIES TO A WEARABLE COMPUTING DEVICE WITH DIRECTIONAL ANTENNA

(71) Applicant: Elwha LLC, Bellevue, WA (US)

(72) Inventors: Pablos Holman, Seattle, WA (US);
Roderick A. Hyde, Redmond, WA (US);
Royce A. Levien, Lexington, MA (US);
Richard T. Lord, Tacoma, WA (US);
Robert W. Lord, Seattle, WA (US);
Mark A. Malamud, Seattle, WA (US);
Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 57 days.

(21) Appl. No.: 14/017,693

(22) Filed: Sep. 4, 2013

(65) Prior Publication Data

US 2015/0031294 A1   Jan. 29, 2015

Related U.S. Application Data

(63) Continuation of application No. 14/014,882, filed on Aug. 30, 2013, which is a continuation-in-part of application No. 13/950,926, filed on Jul. 25, 2013, and a continuation-in-part of application No. 13/962,373, filed on Aug. 8, 2013, which is a continuation of application No. 13/961,187, filed on Aug. 7, 2013.

(51) Int. Cl.
*H04B 7/00* (2006.01)
*H04W 4/00* (2009.01)

(52) U.S. Cl.
CPC ............... *H04W 4/008* (2013.01); *H04B 1/385* (2013.01)

(58) Field of Classification Search
CPC ....... H04B 1/385; H04W 4/008; H04W 8/005
USPC .................. 455/41.1, 41.2, 63.4, 66.1, 550.1, 455/556.1, 557, 134, 135, 334, 522
See application file for complete search history.

(56) References Cited

U.S. PATENT DOCUMENTS

| | | | |
|---|---|---|---|
| 6,711,414 | B1 | 3/2004 | Lightman et al. |
| 6,771,224 | B2 | 8/2004 | Apostolos |
| 6,995,723 | B1 | 2/2006 | Adams |
| 7,500,747 | B2 | 3/2009 | Howell et al. |

(Continued)

OTHER PUBLICATIONS

Brown, Michael, "Meet 60GHz Wi-Fi, the insanely fast future of wireless networking," PC World, Mar. 6, 2013, 4 pages, http://www.pcworld.com/article/2030041/meet-60ghz-wi-fi-the-insanely-fast-future-of-wireless-networking.html.

(Continued)

*Primary Examiner* — Tuan Pham

(57) ABSTRACT

Computationally implemented methods and systems include receiving one or more signals through a directional antenna of a wearable computing device, the one or more signals having been transmitted by one or more electronic devices; determining that the one or more electronic devices are within a spatial pod surrounding the wearable computing device based, at least in part, on the one or more signals received by the wearable computing device; and obtaining at least access to one or more functionalities from the one or more electronic devices that were determined to be within the spatial pod of the wearable computing device. In addition to the foregoing, other aspects are described in the claims, drawings, and text.

42 Claims, 30 Drawing Sheets

(56) References Cited

U.S. PATENT DOCUMENTS

| | | | |
|---|---|---|---|
| 7,715,873 B1* | 5/2010 | Biere et al. ............... | 455/557 |
| 7,929,914 B2 | 4/2011 | Tegreene | |
| 8,184,983 B1 | 5/2012 | Ho et al. | |
| 8,340,658 B2 | 12/2012 | Tsui et al. | |
| 8,430,310 B1 | 4/2013 | Ho et al. | |
| 8,442,542 B2 | 5/2013 | Brisebois et al. | |
| 8,489,546 B2 | 7/2013 | Rappaport | |
| 8,493,353 B2 | 7/2013 | Blanchflower et al. | |
| 8,493,849 B2 | 7/2013 | Fuste Vilella et al. | |
| 2012/0194399 A1 | 8/2012 | Bily et al. | |
| 2012/0195464 A1 | 8/2012 | Ahn | |
| 2012/0250615 A1 | 10/2012 | Gupta et al. | |
| 2013/0044130 A1* | 2/2013 | Geisner et al. ........... | 345/633 |
| 2013/0080616 A1 | 3/2013 | Tsui et al. | |
| 2013/0165138 A1 | 6/2013 | Bahl et al. | |
| 2014/0241540 A1* | 8/2014 | Hodges et al. ............ | 381/74 |
| 2015/0031286 A1 | 1/2015 | Holman et al. | |
| 2015/0031290 A1 | 1/2015 | Holman et al. | |
| 2015/0031291 A1 | 1/2015 | Holman et al. | |
| 2015/0031292 A1 | 1/2015 | Holman et al. | |
| 2015/0031293 A1 | 1/2015 | Holman et al. | |
| 2015/0031294 A1 | 1/2015 | Holman et al. | |
| 2015/0031295 A1 | 1/2015 | Holman et al. | |
| 2015/0031296 A1 | 1/2015 | Holman et al. | |
| 2015/0031297 A1 | 1/2015 | Holman et al. | |

OTHER PUBLICATIONS

Experton Group, "Bluetooth to Decide on 60GHZ Standard this Month," Experton Group, Apr. 19, 2010, 1 page, http://www.experton-group.com/nc/home/itnews/itnewsarticle/article/bluetooth-to-decide-on-60ghz-standard-this-month.html.

mmWAVES, "60GHz Wireless Technology Overview," 2013, 4 pages, http://www.mmwaves.com/products.cfm/product/20-194-0.htm, accessed Jul. 25, 2013.

Stevens et al., "White Paper: The Benefits of 60 GHz Unlicensed Wireless Communications," Dec. 2011, 10 pages, Sub10 Systems Limited, http://www.sub10systems.com/wp-content/uploads/2011/03/White-Paper-Benefits-of-60GHz.pdf.

University of California, Berkely, "60 GHz Short-Range Wireless Communication," Connectivity Lab, Feb. 2008, 1 page, http://connectivitylab.eecs.berkeley.edu/brochures/60ghz.pdf.

PCT International Search Report; International App. No. PCT/US2014/048167; Nov. 4, 2014; pp. 1-3.

* cited by examiner

GUI 300b

GUI 300a

GUI 300d

GUI 300c

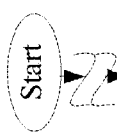

604 Determining that the one or more electronic devices are within a spatial pod of the wearable computing device based, at least in part, on the one or more signals received by the wearable computing device, the spatial pod of the wearable computing device being a spatial volume that includes the wearable computing device and being defined by an enveloping boundary, where low-power signals transmitted via the directional antenna being discernible over background noise within the enveloping boundary and not discernible over background noise outside the enveloping boundary 835 Determining that the one or more electronic devices are within the spatial pod of the wearable computing device based, at least in part, on a determination that the one or more signals received by the wearable computing device are one or more received beacon signals that were received at the directional antenna having one or more signal strengths greater than a predefined amount of signal strength, the one or more received beacon signals having been transmitted by the one or more electronic devices with one or more predefined amounts of transmit powers 836 Determining that the one or more electronic devices are within the spatial pod of the wearable computing device by determining that a plurality of electronic devices are within the spatial pod of the wearable computing device based, at least in part, on a determination that a plurality of signals that were received through the directional antenna are a plurality of received beacon signals that have one or more signal strengths greater than the predefined amount of signal strength, the plurality of received beacon signals having been transmitted by the plurality of electronic devices with one or more predefined amounts of transmit powers 837 Determining that the plurality of electronic devices are within the spatial pod of the wearable computing device based, at least in part, on a determination that the plurality of signals that were received through the directional antenna are a plurality of received beacon signals that have varying signal strengths greater than the predefined amount of signal strength, the plurality of received beacon signals having been transmitted by the plurality of electronic devices with one or more predefined amounts of transmit powers 838 Determining which of the plurality of electronic devices are nearest to the wearable computing device based, at least in part, on signal strengths of the plurality of received beacon signals that were received through the directional antenna and that were transmitted by the plurality of electronic devices

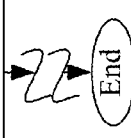

FIG. 8B

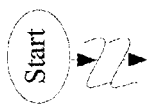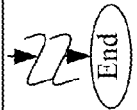

604 Determining that the one or more electronic devices are within a spatial pod of the wearable computing device based, at least in part, on the one or more signals received by the wearable computing device, the spatial pod of the wearable computing device being a spatial volume that includes the wearable computing device and being defined by an enveloping boundary, where low-power signals transmitted via the directional antenna being discernible over background noise within the enveloping boundary and not discernible over background noise outside the enveloping boundary 841 Determining that the one or more electronic devices are within the spatial pod of the wearable computing device including determining that the one or more electronic devices provide the one or more functionalities 842 Determining that the one or more electronic devices provide the one or more functionalities by querying each of the one or more electronic devices to determine whether the one or more electronic devices provide the one or more functionalities 843a Transmitting through the directional antenna and to the one or more electronic devices one or more queries to obtain one or more confirmations that the one or more electronic devices provide the one or more functionalities, the one or more queries being transmitted via one or more low-power query signals, the one or more low-power query signals that are transmitted through the directional antenna being discernible over background noise within the enveloping boundary of the spatial pod and not discernible over background noise outside the enveloping boundary 844 Transmitting through the directional antenna and to the one or more electronic devices the one or more queries to obtain one or more confirmations that the one or more electronic devices provide the one or more functionalities by transmitting through the directional antenna and to the one or more electronic devices one or more queries to obtain one or more confirmations that the one or more electronic devices provide one or more communication links to beyond the spatial pod 843b Receiving, through the directional antenna, one or more confirmations via one or more confirmation signals that are received from the one or more electronic devices confirming that the one or more electronic devices provide the one or more functionalities

FIG. 8D

 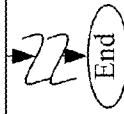

604 Determining that the one or more electronic devices are within a spatial pod of the wearable computing device based, at least in part, on the one or more signals received by the wearable computing device, the spatial pod of the wearable computing device being a spatial volume that includes the wearable computing device and being defined by an enveloping boundary, where low-power signals transmitted via the directional antenna being discernible over background noise within the enveloping boundary and not discernible over background noise outside the enveloping boundary

841 Determining that the one or more electronic devices are within the spatial pod of the wearable computing device including determining that the one or more electronic devices provide the one or more functionalities

842 Determining that the one or more electronic devices provide the one or more functionalities by querying each of the one or more electronic devices to determine whether the one or more electronic devices provide the one or more functionalities

843a Transmitting through the directional antenna and to the one or more electronic devices one or more queries to obtain one or more confirmations that the one or more electronic devices provide the one or more functionalities, the one or more queries being transmitted via one or more low-power query signals, the one or more low-power query signals that are transmitted through the directional antenna being discernible over background noise within the enveloping boundary of the spatial pod and not discernible over background noise outside the enveloping boundary

845 Transmitting through the directional antenna and to the one or more electric devices the one or more queries to obtain one or more confirmations that the one or more electronic devices provide the one or more functionalities by transmitting through the directional antenna and to the one or more electronic devices one or more queries to obtain one or more confirmations that the one or more electronic devices provide one or more sensor functionalities

848 Transmitting through the directional antenna and to the one or more electronic devices one or more queries to obtain one or more confirmations that the one or more electronic devices provide the one or more sensor functionalities by transmitting through the directional antenna and to the one or more electronic devices one or more queries to obtain one or more confirmations that the one or more electronic devices provide one or more visual and/or audio sensor functionalities

843b Receiving, through the directional antenna, one or more confirmations via one or more confirmation signals that are received from the one or more electronic devices confirming that the one or more electronic devices provide the one or more functionalities

FIG. 8F

SYSTEMS AND METHODS FOR PROVIDING ONE OR MORE FUNCTIONALITIES TO A WEARABLE COMPUTING DEVICE WITH DIRECTIONAL ANTENNA

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation of U.S. patent application Ser. No. 14/014,882, entitled SYSTEMS AND METHODS FOR PROVIDING ONE OR MORE FUNCTIONALITIES TO A WEARABLE COMPUTING DEVICE WITH DIRECTIONAL ANTENNA, naming PABLOS HOLMAN; RODERICK A. HYDE; ROYCE A. LEVIEN; RICHARD T. LORD; ROBERT W. LORD; MARK A. MALAMUD; CLARENCE T. TEGREENE as inventors, filed 30, Aug. 2013, which is currently co-pending or is an application of which a currently co-pending application is entitled to the benefit of the filing date.

The present application constitutes a continuation-in-part of U.S. patent application Ser. No. 13/950,926, entitled SYSTEMS AND METHODS FOR PROVIDING ONE OR MORE FUNCTIONALITIES TO A WEARABLE COMPUTING DEVICE WITH SMALL FORM FACTOR, naming Pablos Holman, Roderick A. Hyde; Royce A. Levien; Richard T. Lord; Robert W. Lord; Mark A. Malamud; Clarence T. Tegreene as inventors, filed 25, Jul. 2013, which is currently co-pending or is an application of which a currently co-pending application is entitled to the benefit of the filing date.

The present application constitutes a continuation-in-part of U.S. patent application Ser. No. 13/962,373, entitled SYSTEMS AND METHODS FOR PROVIDING ONE OR MORE FUNCTIONALITIES TO A WEARABLE COMPUTING DEVICE, naming Pablos Holman, Roderick A. Hyde; Royce A. Levien; Richard T. Lord; Robert W. Lord; Mark A. Malamud; Clarence T. Tegreene as inventors, filed 8, Aug. 2013, which is currently co-pending or is an application of which a currently co-pending application is entitled to the benefit of the filing date, and which is a continuation of U.S. patent application Ser. No. 13/961,187, entitled SYSTEMS AND METHODS FOR PROVIDING ONE OR MORE FUNCTIONALITIES TO A WEARABLE COMPUTING DEVICE, naming Pablos Holman, Roderick A. Hyde; Royce A. Levien; Richard T. Lord; Robert W. Lord; Mark A. Malamud; Clarence T. Tegreene as inventors, filed 7, Aug. 2013.

RELATED APPLICATIONS

None as of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In one or more various aspects, a method includes, but is not limited to, receiving one or more signals through a directional antenna of a wearable computing device, the one or more signals having been transmitted by one or more electronic devices, the wearable computing device being a computing device designed to be worn by a user, determining that the one or more electronic devices are within a spatial pod of the wearable computing device based, at least in part, on the one or more signals received by the wearable computing device, the spatial pod of the wearable computing device being a spatial volume that includes the wearable computing device and being defined by an enveloping boundary, where low-power signals transmitted via the directional antenna being discernible over background noise within the enveloping boundary and not discernible over background noise outside the enveloping boundary; and obtaining at least access to one or more functionalities from the one or more electronic devices that were determined to be within the spatial pod of the wearable computing device, the obtaining of the at least access to the one or more functionalities via the directional antenna. In some implementations, at least one of the registering, detecting, or displaying being performed by a machine or article of manufacture. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for receiving one or more signals through a directional antenna of a wearable computing device, the one or more signals having been transmitted by one or more electronic devices, the wearable computing device being a computing device designed to be worn by a user, means for determining that the one or more electronic devices are within a spatial pod of the wearable computing device based, at least in part, on the one or more signals received by the wearable computing device, the spatial pod of the wearable computing device being a spatial volume that includes the wearable computing device and being defined by an enveloping boundary, where low-power signals transmitted via the directional antenna being discernible over background noise within the enveloping boundary and not discernible over background noise outside the enveloping boundary, and means for obtaining at least access to one or more functionalities from the one or more electronic devices that were determined to be within the spatial pod of the wearable computing device, the obtaining of the at least access to the one or more functionalities via the directional antenna. In addition to the foregoing, other system aspects are described in the claims, drawings, and text forming a part of the disclosure set forth herein.

In one or more various aspects, a system includes, but is not limited to, circuitry for receiving one or more signals through a directional antenna of a wearable computing device, the one or more signals having been transmitted by one or more electronic devices, the wearable computing device being a computing device designed to be worn by a user, circuitry for determining that the one or more electronic devices are within a spatial pod of the wearable computing device based, at least in part, on the one or more signals received by the wearable computing device, the spatial pod of the wearable computing device being a spatial volume that includes the wearable computing device and being defined by an enveloping boundary, where low-power signals transmitted via the directional antenna being discernible over background noise within the enveloping boundary and not discernible over background noise outside the enveloping boundary, and circuitry for obtaining at least access to one or more functionalities from the one or more electronic devices that were determined to be within the spatial pod of the wearable computing device, the obtaining of the at least access to the one or more functionalities via the directional antenna. In addition to the foregoing, other system aspects are described in the claims, drawings, and text forming a part of the disclosure set forth herein.

In one or more various aspects, a computer program product, comprising a signal bearing non-transitory storage medium, bearing one or more instructions including, but not limited to, receiving one or more signals through a directional antenna of a wearable computing device, the one or more signals having been transmitted by one or more electronic devices, the wearable computing device being a computing device designed to be worn by a user, determining that the one or more electronic devices are within a spatial pod of the wearable computing device based, at least in part, on the one or more signals received by the wearable computing device, the spatial pod of the wearable computing device being a spatial volume that includes the wearable computing device and being defined by an enveloping boundary, where low-power signals transmitted via the directional antenna being discernible over background noise within the enveloping boundary and not discernible over background noise outside the enveloping boundary, and obtaining at least access to one or more functionalities from the one or more electronic devices that were determined to be within the spatial pod of the wearable computing device, the obtaining of the at least access to the one or more functionalities via the directional antenna. In addition to the foregoing, other computer program product aspects are described in the claims, drawings, and text forming a part of the disclosure set forth herein.

In one or more various aspects, a wearable computing device includes, but is not limited to, a signal capturing module configured to capture one or more signals through a directional antenna, the one or more signals having been transmitted by one or more electronic devices; a nearby ascertaining module configured to ascertain that the one or more electronic devices that transmitted the one or more signals are within a spatial pod of the wearable computing device based, at least in part, on the one or more signals captured through the directional antenna, the spatial pod of the wearable computing device being a spatial volume that includes the wearable computing device and being defined by an enveloping boundary, where low-power signals transmitted via the directional antenna being discernible over background noise within the enveloping boundary and not discernible over background noise outside the enveloping boundary; and a functionality acquiring module configured to acquire, via the directional antenna, at least access to one or more functionalities from the one or more electronic devices that were ascertained to be within the spatial pod of the wearable computing device.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 8B is a high-level logic flowchart of a process depicting alternate implementations of the nearby determining operation 604 of FIG. 6.

FIG. 8D is a high-level logic flowchart of a process depicting alternate implementations of the nearby determining operation 604 of FIG. 6.

FIG. 8F is a high-level logic flowchart of a process depicting alternate implementations of the nearby determining operation 604 of FIG. 6.

DETAILED DESCRIPTION

Figure 1A:
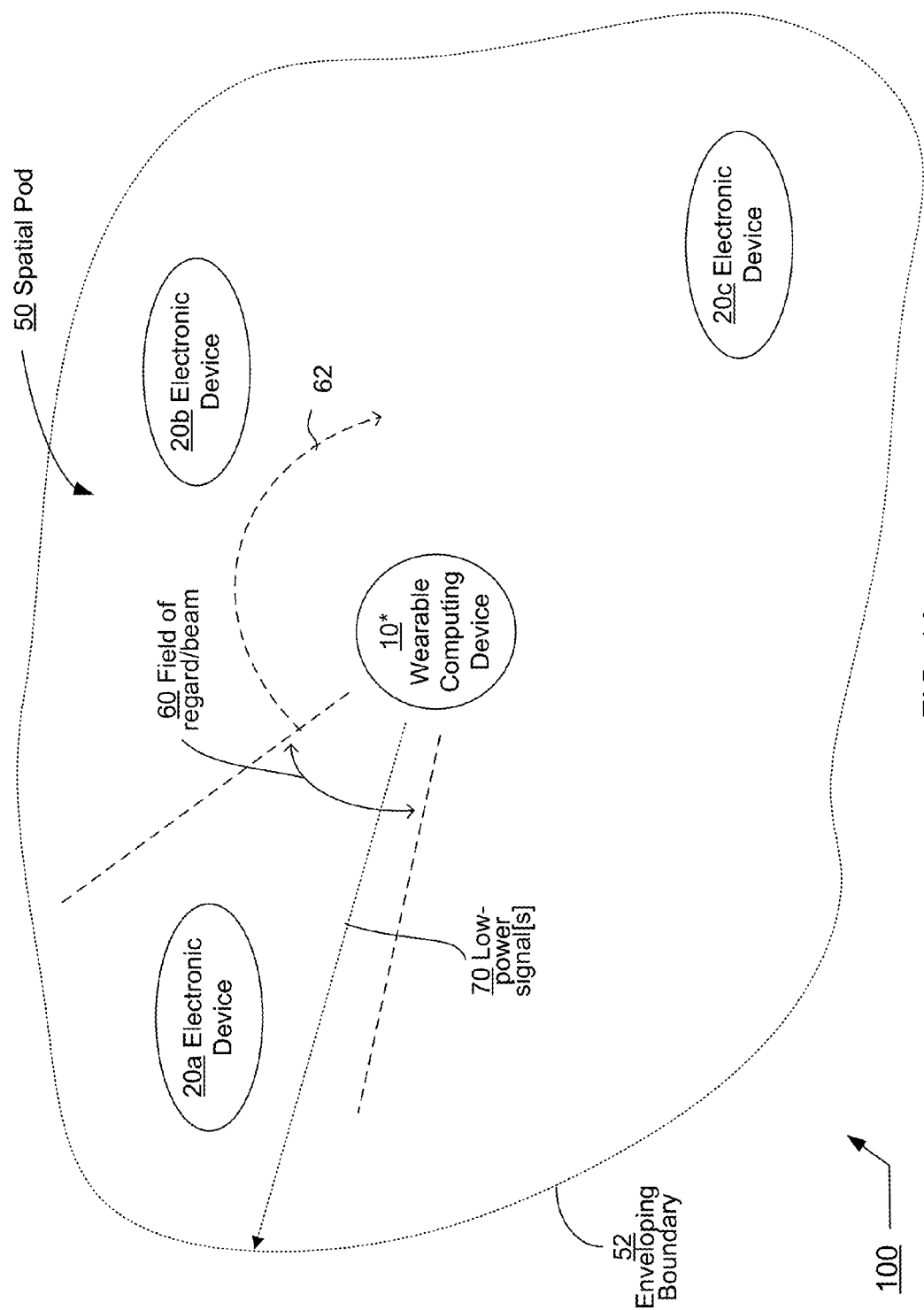
FIG. 1A is a high-level block diagram of one perspective of a wearable computing device 10* operating in an exemplary environment.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide one or more wearable computing devices for the environment illustrated in FIG. 1.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "111100001010111100001111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media holds or transmits device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include, but are not limited to, a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, application programs, one or more interaction devices (e.g., a touch pad, a touch screen, an antenna, etc.), and/or control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and application programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, application programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server. The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Although one or more users may be shown and/or described herein, e.g., in FIG. 1, and other places, as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

The rapid advancement and miniaturization of integrated circuitry and microelectronics over the last three decades have greatly facilitated those in the mobile computing industry to develop amazingly sleek and functionally powerful computing/communication devices, from the original clunky brick-sized portable telephones to today's sleek cellular telephones and Smartphones, and from yesterday's bulky laptops to today's sleek tablet computers and e-readers. One recent trend in the evolution of mobile computing is the development of wearable computing devices. That is, there are currently multiple efforts by various high-tech groups to develop computing/communication devices in the form of wearable computing devices. Such devices having very small form-factors, are designed to be worn by people, and can provide various functionalities beyond simple time/chronograph functionalities including, for example, at least some communication capabilities (e.g., connectivity to Wi-Fi or cellular networks) and capabilities for executing applications (e.g., software programs). Examples of such wearable computing devices include, for example, augmented reality (AR) devices having the form of glasses or goggles (herein "computing glasses"), and computerized watches (herein "computing watches")

Although the recent advancements in the fields of integrated circuitry and microelectronics (e.g., microprocessors) make the eventual implementation of wearable computing devices a likely inevitability, developers of such devices still face a number of hurdles that may prevent such devices from being able to provide the same type of functionalities that larger mobile devices (e.g., Smartphones, tablet computers, and so forth) can provide. One of the problems faced by developers of wearable computing devices is to try to cram into such small form-factor devices all of the components that may be necessary in order to provide the same functionalities provided by larger mobile devices. That is, because a wearable computing device (e.g., an AR device or a Smartwatch) is designed to be worn by a user, it is generally preferable that such a device have a relatively small form-factor and be relatively lightweight. As a result, such a device may only accommodate small and/or limited number of core components including a power storage device (e.g., batteries) that is relatively small (and as a result, with limited power storage capabilities) and light, and a relatively small communication system (e.g., a communication system that employs a small and/or limited number of antennas).

For example, and in contrast, larger mobile devices such as Smartphones and tablet computers typically have multiple antennas for various functionalities including, for example, an antenna for global positioning system (GPS), an antenna for Wi-Fi connectivity, and an antenna for cellular network connectivity. It may not be practical, if not impossible, to include multiple antennas into a small form-factor wearable computing device such as a computing watch or computing glasses. Also, because such wearable computing devices will be located somewhere on or adjacent to the body of a user, it will be generally desirable to employ a communication system that emits relatively low electromagnetic radiation at least towards the user's body.

In various embodiments, systems, articles of manufacture and methods are provided herein that allows a wearable computing device to have an extremely small form-factor while seamlessly providing the same or similar functionalities as those functionalities that may be provided by larger mobile computing devices. For these embodiments, a wearable computing device may be a computing device designed to be coupled to at least a portion (e.g., a limb or head) of a user and that has a relatively small form factor so that it can be comfortably worn by the user. Examples of a wearable computing device include, for example, a computing watch or computing glasses/goggles (e.g., augmented reality device or simply "AR" device). These wearable computing devices may include one or more components (e.g., eyeglass frame or wristband, or a clip to couple to a frame of a pair of glasses or a pin to couple to a wristband) to facilitate coupling the wearable computing device to at least a portion of a user's body.

In order to provide the same or similar functionalities provided by larger mobile devices (e.g. Smartphones, tablet computers, and so forth), the wearable computing device, in accordance with various embodiments, may be designed to "borrow" functionalities from one or more nearby electronic devices (e.g., Smartphones, tablet computers, workstations, access points, and so forth) that are near the wearable computing device. Examples of the type functionalities that may be borrowed by the wearable computing device may include, for example, Wi-Fi or cellular network connectivity, GPS functionalities, audio and/or visual sensor functionalities, and so forth. In order to minimize the power requirements for obtaining those functionalities from the nearby electronic devices, the wearable computing device may be designed to communicate with the nearby electronic devices using a directional antenna, such as a metamaterial antenna, to transmit low-power signals (e.g., less than 1 milliwatt of transmit power). In some embodiments, the employment of a directional antenna rather than other types of antennas (e.g., omni-directional antenna) to communicate with nearby electronic devices may provide certain advantages including reducing power requirements for communicating with the nearby electronic devices and minimizing the amount of electromagnetic (EM) radiation that the user of the wearable computing device may be exposed to by directing EM radiation away from the user.

In various embodiments, the systems, articles of manufacture and methods may be designed to determine whether one or more electronic devices are within a spatial pod of a wearable computing device based on one or more signals transmitted by the one or more one or more electronic devices, the spatial pod of the wearable computing device being a spatial volume that includes the wearable computing device and being defined by an enveloping boundary, where low-power signals transmitted via a directional antenna of the wearable computing device being discernible over background noise within the enveloping boundary and not discernible over background noise outside the enveloping boundary; and obtaining at least access to one or more functionalities from the one or more electronic devices that were determined to be within the spatial pod of the wearable computing device.

Referring now to FIG. 1A, which is a block diagram of a wearable computing device 10* operating in an exemplary environment 100 in in accordance with various embodiments. For ease of illustration and in order to facilitate understanding of various concepts to be introduced herein, the user (e.g., person) who is wearing/using the wearable computing device 10* while the wearable computing device 10* is operating will not be depicted in FIG. 1A (as well as FIGS. 1B, 1C, and 1D) even though the wearable computing device 10* is actually designed to operate while being worn by a user. Note that in the following, "*" represents a wildcard. Thus, references in the following description to, for example, "wearable computing device 10*" may be in reference to the wearable computing device 10* of FIG. 1A, as well as to the wearable computing device 10' of FIG. 4A or to the wearable computing device 10" of FIG. 4B, which are two different implementations of the wearable computing device 10* of FIG. 1A (as well as of FIGS. 1B, 1C, and 1D). In the illustrated environment 100, the wearable computing device 10* may communicate with one or more electronic devices 20*(e.g., electronic device 20a, electronic device 20b, and/or electronic device 20c) by pointing the directional antenna 130 (see FIG. 4A or 4B) of the wearable computing device 10* to different portions of the environment 100. In particular, the wearable computing device 10\* may communicate with the various electronic devices 20\* by moving the field of regard/beam 60 of the directional antenna 130 to scan the surrounding environment 100 as indicated by ref 62.

By convention, "field of regard" is sometimes used herein when describing an example wherein a directional antenna is likely to receive a signal while a "beam" is used herein when describing an example wherein a directional antenna is likely to transmit a signal. That is, a directional antenna when transmitting signals (e.g., transmitting electromagnetic radiation) will transmit the signals primarily towards one direction thus having greater gain then, for example, multi-directional antennas such as omnidirectional antennas or isotropic radiators (note that a gain is a measure of how much of the power is radiated in a given direction relative to other directions). The narrower the beamwidth of the emitted radiation, the greater the gain. When the same directional antenna is in receiving mode, it may be able to receive signals from the same direction that the directional antenna primarily radiates signals to. Thus references in the following to "pointing the directional antenna" or similar such phrases may be in reference to steering or directing the field of regard/beam of the directional antenna to different portions of the surrounding environment. A more detailed discussion related to the "field of regard" and "beam" is provided in U.S. Pat. No. 7,929,914, which is hereby incorporated by reference.

Figure 4A:
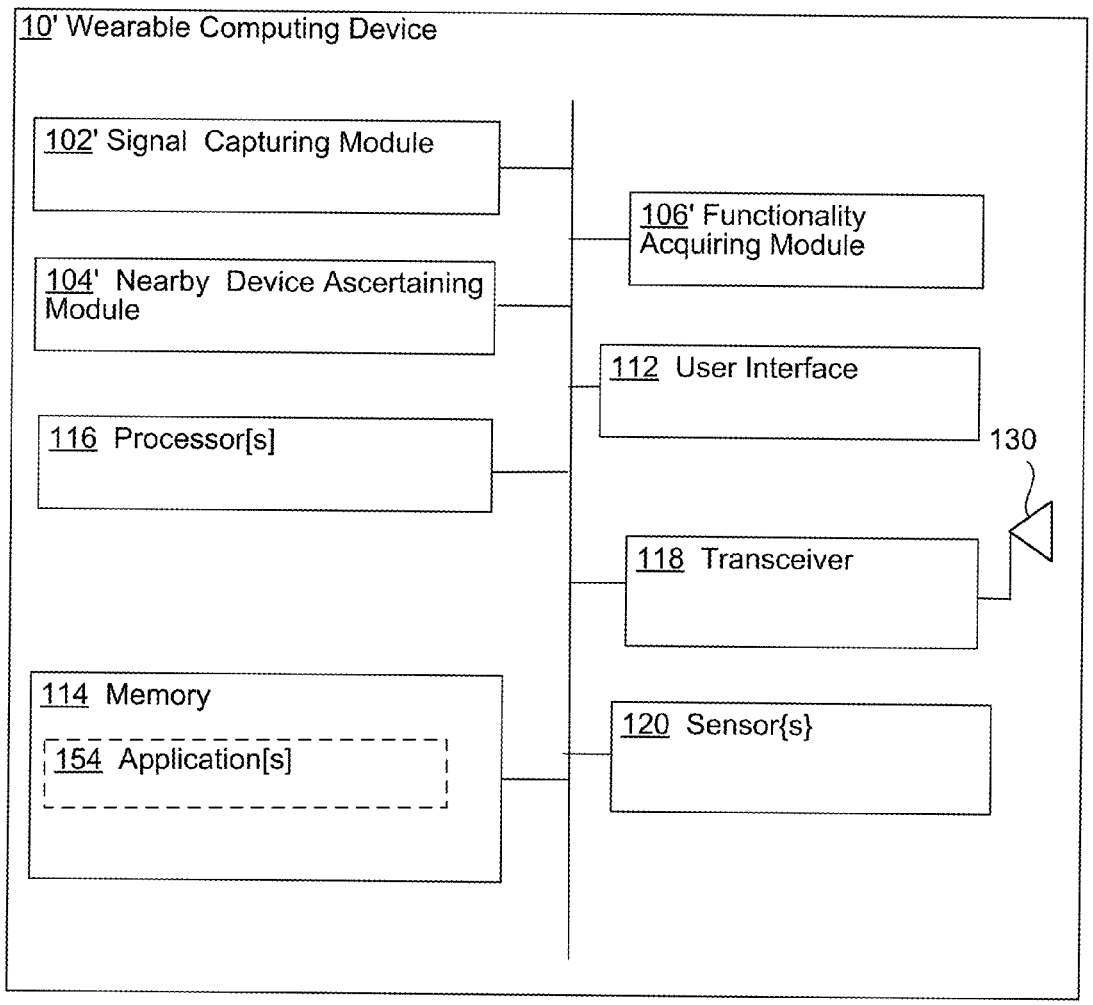
FIG. 4A shows a block diagram of particular implementation of the wearable computing device 10* of FIGS. 1A, 1B, 1C, and 1D.
Figure 4B:
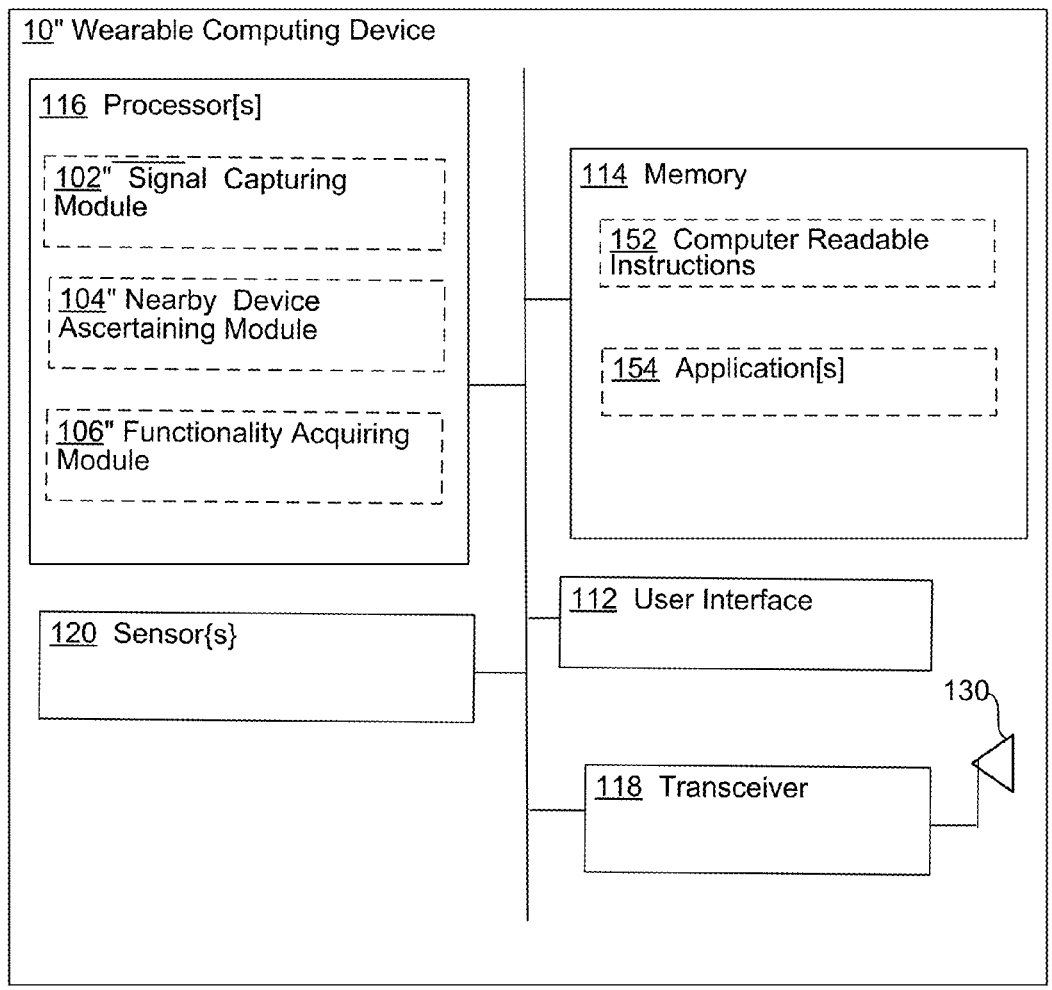
FIG. 4B shows a block diagram of another implementation of the wearable computing device 10* of FIGS. 1A, 1B, 1C, and 1D

In order to communicate with the one or more electronic devices 20\*, the wearable computing device 10\* may transmit one or more low-power signals 70 with limited transmission range (e.g., less than 30 feet) using a directional antenna (see directional antenna 130 of FIG. 4A or 4B). The range of the low-power signals 70 may define a spatial pod 50 that surrounds the wearable computing device 10\*. From another perspective, the spatial pod 50 of the wearable computing device 10\* may be a spatial volume that includes the wearable computing device 10\* and that is defined by an enveloping boundary 52, where low-power signals 70 transmitted via the directional antenna 130 being discernible over background noise within the enveloping boundary 52 and not discernible over background noise outside the enveloping boundary 52. For purposes of this description, an electronic device 20\* may be any device that can provide one or more functionalities that are being sought or needed by the wearable computing device 10\*.

Examples of an electronic device 20\* include an external linking device that can communicate beyond the spatial pod 50 such as a Smartphone, a laptop or desktop computer, a repeater, an access point, and so forth, or other types of computing devices that can provide desirable functionalities including other wearable computing devices. The use of low-power signals 70 to communicate with nearby electronic devices 20\* may provide certain advantages such as reducing the size of the spatial pod 50 of the wearable computing device 10\* to reduce the chance that the spatial pod 50 of the wearable computing device 10\* overlaps with an adjacent spatial pod 50 of another device, and the use of low-power signals 70 may reduce the power consumption requirements for communication. In various embodiments, references in the following to low-power signals may be in reference to signals that may be transmitted using the directional antenna 130 with substantially less than 1 milliwatt of transmit power such as 0.5 milliwatt of transmit power. Note that shape of the spatial pod 50 will not be spherical in most cases since the size and shape of the spatial pod 50 will be affected by environmental conditions (e.g., atmospheric conditions) and the presence of various objects in the environment (e.g., people, walls, chairs, etc.). In various embodiment, by steering or pointing the directional antenna 130 (e.g., steering or directing the field of regard/beam 60) at different directions as illustrated by ref 62, the wearable computing device 10\* may establish a spatial pod 50 and communicate with one or more electronic devices 50\* that are located nearby the wearable computing device 10\* and within the spatial pod 50.

Figure 1B:
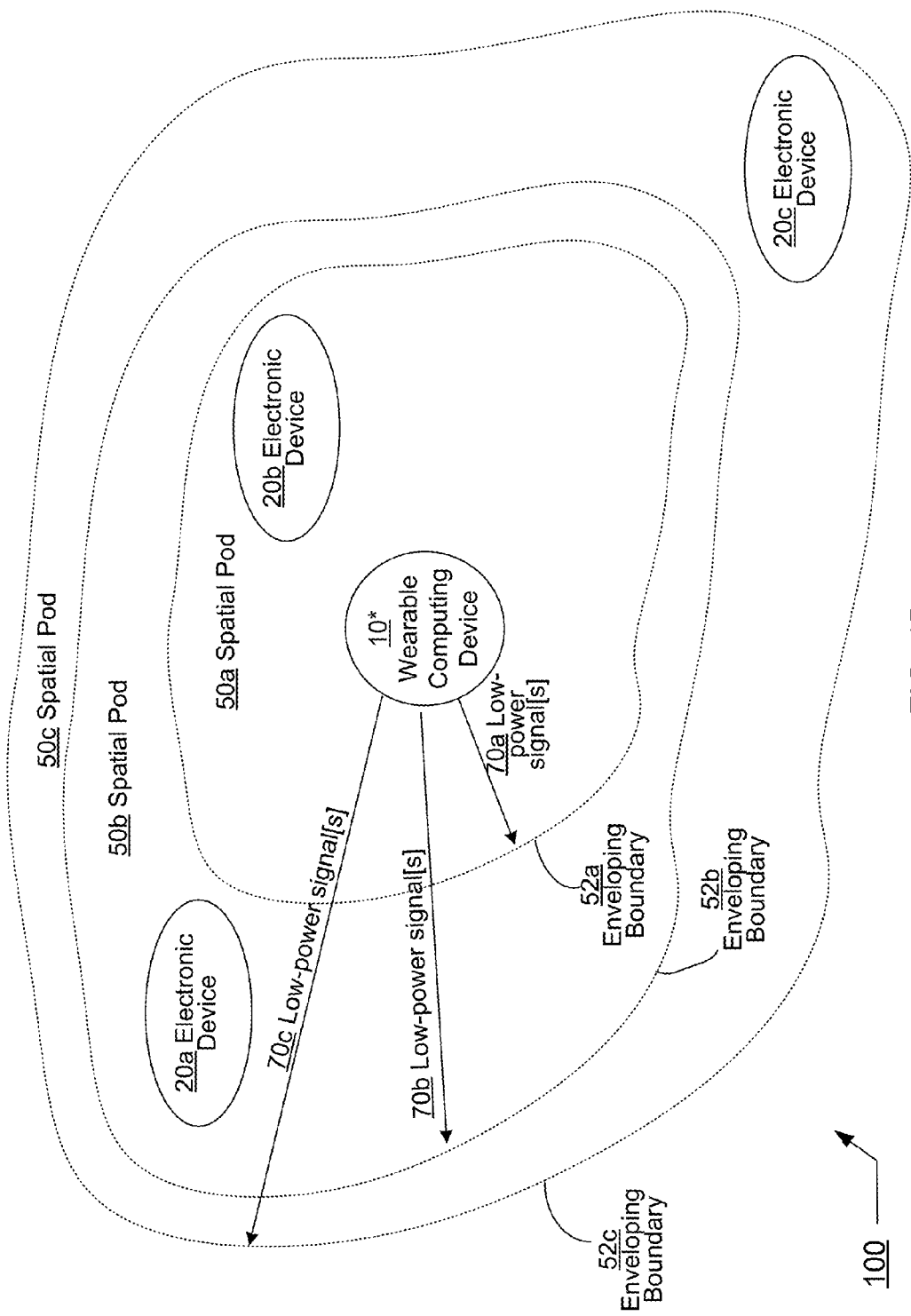
FIG. 1B is a high-level block diagram of another perspective of the wearable computing device 10* operating in an exemplary environment.

Referring now to FIG. 1B, which illustrates another aspect of the wearable computing device 10\* operating in the exemplary environment 100 of FIG. 1A in accordance with various embodiments. In FIG. 1B, the wearable computing device 10\* is illustrated as transmitted low-power signals 70\* at various levels of transmit powers in order to generate various sizes of spatial pods 50\*. For example, the wearable computing device 10\* may initially transmit one or more low-power signals 70a with a first transmit power (e.g., 0.1 milliwatt of transmit power) in order to create a first spatial pod 50a that surrounds the wearable computing device 10\*. Because the first spatial pod 50a is relatively small, only electronic device 20b may be able to detect the one or more low-power signals 70a transmitted by the wearable computing device 10\* and to respond to it when detected. In order to increase the size of its spatial pod 50\*, the wearable computing device 10\* may then transmit one or more low-power signals 70b with a second transmit power (e.g., 0.2 milliwatt of transmit power) in order to create a second spatial pod 50b that surrounds the wearable computing device 10\*. Because the second spatial pod 50b is bigger than the first spatial pod 50a, both electronic device 20a and electronic device 20b may be able to detect the one or more low-power signals 70b transmitted by the wearable computing device 10\* and to respond to it when detected. In order to further increase the size of its spatial pod 50\*, the wearable computing device 10\* may then further transmit one or more low-power signals 70c with a third transmit power (e.g., 0.3 milliwatt of transmit power) in order to create a third spatial pod 50c that surrounds the wearable computing device 10\*. Because the third spatial pod 50c is even bigger than the second spatial pod 50b, electronic devices 20a and 20b, as well as electronic device 20c may be able to detect the one or more low-power signals 70c transmitted by the wearable computing device 10\* and to respond to it when detected.

There are at least two ways for the wearable computing device 10\*(e.g., the endowed logic of the wearable computing device 10\*) to determine which electronic devices 20\* are within a spatial pod 50\* of the wearable computing device 10\*(e.g., which are within the communication range of the wearable computing device 10\*) and/or which of the electronic devices 20 are nearest to the wearable computing device 10\* (e.g., which electronic devices 20\* requires the least or less power to communicate with). The first possible way is to measure the signal strengths of beacon signals received by the wearable computing device 10\* and transmitted by each of the electronic devices 20\*. That is, if each of the electronic devices 20\* transmits beacon signals that were originally transmitted with known transmit power or powers, then by detecting the signal strengths of the beacon signals received by the wearable computing device 10\*, determination can be made as to which of the electronic devices 20\* are in the spatial pod 50\* of the wearable computing device 10\*(e.g., within the communication range of the wearable computing device 10\*) and/or which of the electronic devices 20\* are nearest to the wearable computing device 10\*(as well as the amount of power needed by the wearable computing device 10\* in order to communicate with such devices).

A second possible way of determining which electronic devices 20\* are within a spatial pod 50\* of the wearable computing device 10\* and/or which of the electronic devices 20* are nearest to the wearable computing device 10* is for the wearable computing device 10* to transmit one or more "prompting" signals at various levels of transmission power and wait to see if any of the electronic devices 20* respond to the prompting signals after each transmission of the prompting signals at each level of transmission power. For example, the wearable computing device 10* may initially transmit first prompting signals at a very low transmit power (0.1 milliwatt of transmit power) that are designed to, upon being received by an electronic device 20*, prompt the electronic device 20* to transmit back to the wearable computing device 10* one or more responsive signals. After the transmission of the first prompting signals, the wearable computing device 10* may monitor for the one or more responsive signals in order to determine whether any electronic devices 20* are nearby. If the wearable computing device 10* does not detect any responsive signals from an electronic device 20* and/or if there is a need to find more electronic devices 20* then the wearable computing device 10* may repeat the above process by transmitting a second prompting signals at a higher transmit power (e.g., 0.2 milliwatt of transmit power) than the first prompting signals and then monitoring for responsive signals. This process may then be repeated over and over again for incrementally higher transmit power in order to determine whether there are any electronic devices 20* near the wearable computing device 10* within different sizes of spatial pods 50* of the wearable computing device 10*, to determine the amount of power needed to communicate with those electronic device 20* found nearby, and/or to determine which electronic devices 20* are nearest to the wearable computing device 10* when multiple electronic devices 20* are located nearby. In some cases, this process of transmitting prompting signals and monitoring for responsive signals may be part of a handshaking protocol.

In some embodiments, two different processes may be employed by the wearable computing device 10* in order for the wearable computing device 10* to obtain one or more functionalities from one or more electronic devices 20* that are located near the wearable computing device 10*(e.g., located within a spatial pod 50* of the wearable computing device 10*). The first process involves determining whether there are one or more electronic devices 20* located near the wearable computing device 10*(e.g., located within a spatial pod 50* of the wearable computing device 10*) sufficiently close to the wearable computing device 10* so that the wearable computing device 10* is able to communicate with such devices using low-power signals. The second process involves determining which, if any, of the one or more electronic devices 10* that are detected near the wearable computing device 10*(e.g., located within a spatial pod 50* of the wearable computing device 10*) provides the one or more functionalities that are sought or needed by the wearable computing device 10*. Note that it may be possible to combine these two processes into a single process in various alternative embodiments as will be described herein.

Figure 1C:
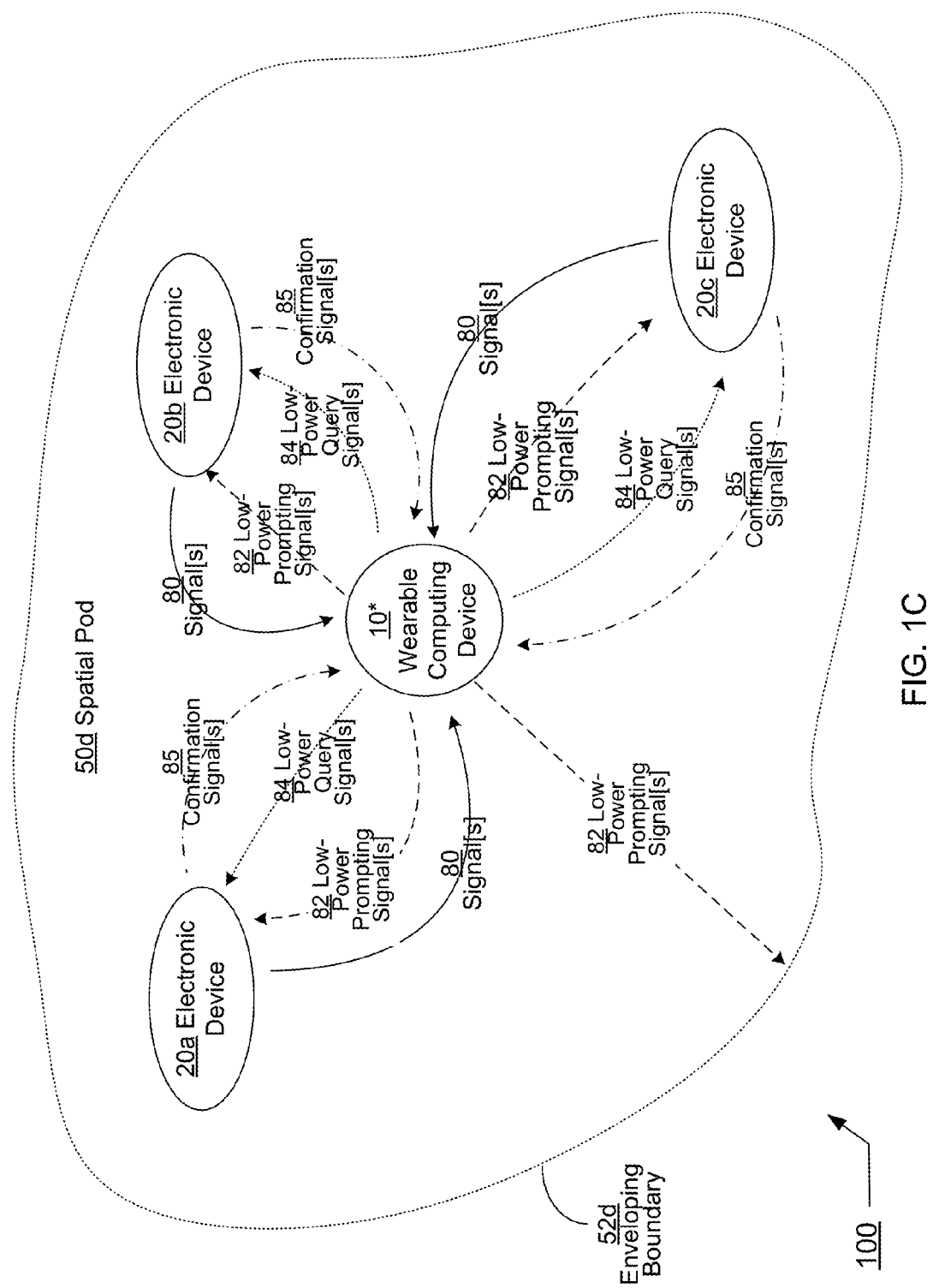
FIG. 1C is a high-level block diagram of still another perspective of the wearable computing device 10* operating in an exemplary environment.

FIG. 1C illustrates how the wearable computing device 10*, in order to implement the two processes (e.g., a process for determining whether there are one or more electronic devices 20* within a spatial pod 50d of the wearable computing device 10* and a process for determining whether any nearby electronic devices 20* that were determined to be within the spatial pod 50d of the wearable computing device 10* has one or more functionalities that are being sought or needed by the wearable computing device 10*) described above, may communicate with one or more electronic devices 20* that are located within the spatial pod 50d of the wearable computing device 10. As described previously, a spatial pod 50d of the wearable computing device 10* is a spatial volume that includes the wearable computing device 10* and that is defined (e.g., enclosed) by an enveloping boundary 52d, where low-power signals (e.g., signals transmitted with less than 0.5 or 0.8 milliwatt of transmit power) transmitted via the directional antenna 130 being discernible over background noise within the enveloping boundary 52d and not discernible over background noise outside the enveloping boundary 52d.

First, in order to determine whether the one or more electronic devices 20* are within the spatial pod 50d of the wearable computing device 10*, the wearable computing device 10* through the directional antenna 130 may initially receive or capture one or more signals 80 transmitted by the one or more electronic devices 20*. In some embodiments, the one or more signals 80 that are received by wearable computing device 10* may be one or more beacon signals that were transmitted by the one or more electronic devices 20* with known amounts of transmit powers. In such cases, the signal strengths of the received one or more beacon signals may be determined in order to determine whether the one or more electronic devices 20* are within the spatial pod 50d of the wearable computing device 10*(e.g., to determine the amount of transmission power needed by the wearable computing device 10* to communicate with the one or more electronic devices 20*) and/or which of the electronic devices 20* are nearest to the wearable computing device 10*(e.g., requires least amount of power to communicate with by the wearable computing device 10*).

In alternative embodiments, the one or more signals 80 that are received by wearable computing device 10* may be one or more responsive signals that were transmitted by the one or more electronic devices 20* in response to the one or more electronic devices 20* receiving/detecting one or more low-power prompting signals 82 (e.g., signals designed to prompt an electronic device 20*, upon receiving/detecting the signals, to transmit responsive signals) broadcasted by the wearable computing device 10*. By merely detecting the one or more responsive signals (e.g., one or more signals 80) transmitted by the one or more electronic devices 20*, a determination can be made that the one or more electronic devices 20* are within the spatial pod 50d of the wearable computing device 10*. If multiple electronic devices 20* transmit multiple responsive signals in respond to the one or more low-power prompting signals 82, then the wearable computing device 10* may determine which of the electronic devices 20* are nearest to the wearable computing device based on the detected signal strengths of the responsive signals (e.g., signals 80). Note that shown at the bottom left side of FIG. 1C is one or more low-power promoting signals 82 that has a range only up to the edge (e.g., enveloping boundary 52d) of the spatial pod 50d.

With respect to the second process (e.g., process for determining whether any nearby electronic devices 20* that were determined to be within the spatial pod 50d of the wearable computing device 10* has one or more functionalities that are being sought or needed by the wearable computing device 10*), the wearable computing device 10* may transmit one or more low-power query signals 84 to query each of the one or more electronic devices 20* as to whether the one or more electronic devices 20* can confirm that they can provide one or more functionalities that are sought/needed by the wearable computing device 10*. If the one or more electronic devices 20* can confirm that they can provide the one or more functionalities, then the one or more electronic devices 20* may transmit back to the wearable computing device 10* one or more confirmation signals 85 to confirm the availability of the one or more functionalities through the one or more electronic devices 20*. As described above, various functionalities may be obtained from the one or more electronic devices 20* including, for example, communication connectivity to beyond (outside) the spatial pod 50d such as Wi-Fi links or cellular network links, global positioning system (GPS) functionalities, movement sensor functionalities (e.g., accelerometer functionality), visual and/or audio sensor functionalities, and so forth.

As briefly described above, in some alternative embodiments, the above described process for determining whether there are any electronic devices 20* within the spatial pod 50d of the wearable computing device 10* and the process for determining whether those electronic devices 20* detected as being within the spatial pod 50d can provide one or more functionalities being sought/needed by the wearable computing device 10* can be combined into a single process. That is, in alternative embodiments, the wearable computing device 10* may blindly broadcast the low-power query signals 84 and wait to see if any electronic device 20* transmits confirmation signals 85 in response to detecting the low-power query signals 84. If the wearable computing device 10* detects a confirmation signal 85 transmitted by an electronic devices 20*, then a determination can be made that the responding electronic device 20* associated with the confirmation signal 85 is within the spatial pod 50d of the wearable computing device 10* as well as having the one or more functionalities that are being sought/needed by the wearable computing device 10*.

Figure 1D:
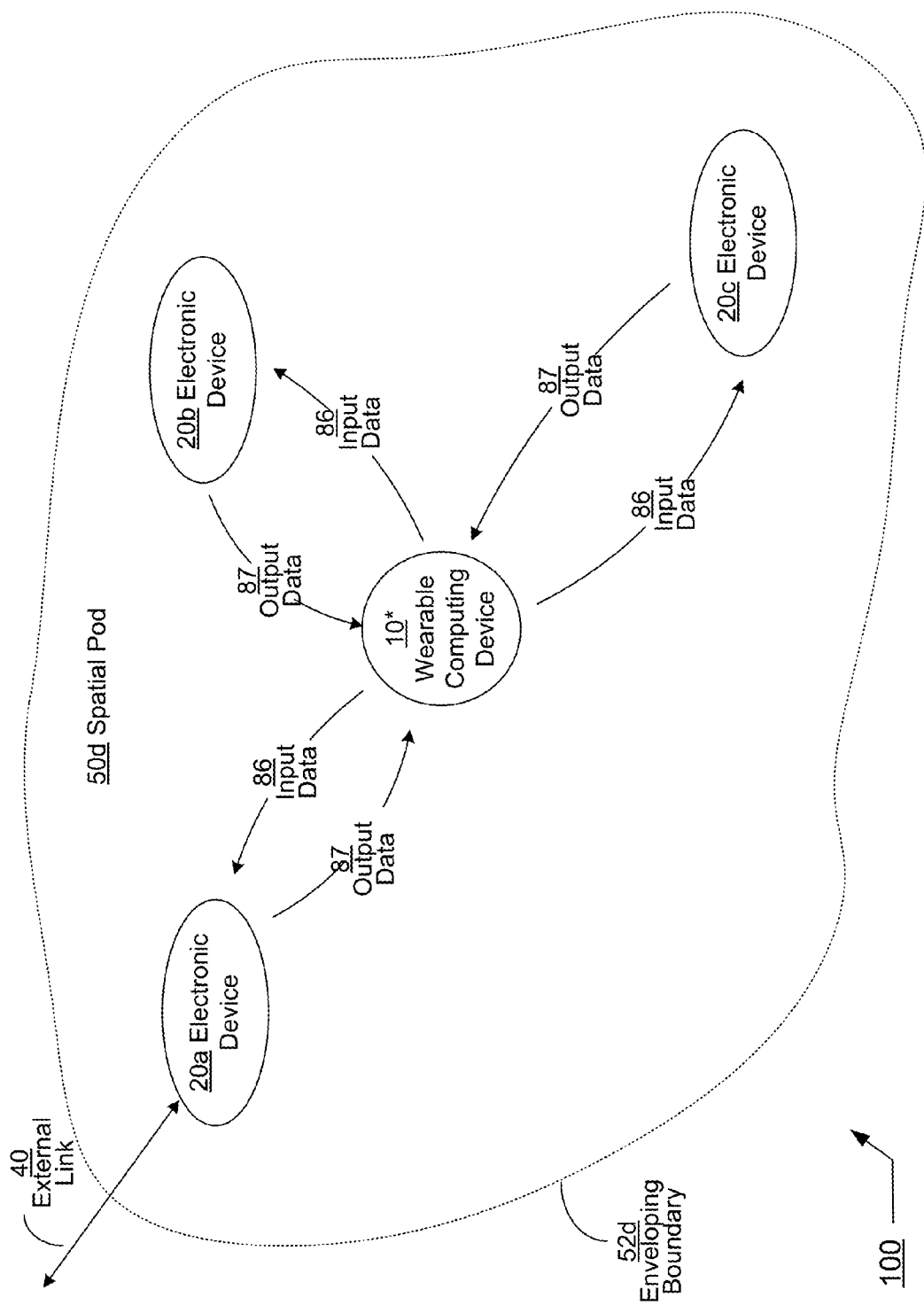
FIG. 1D is a high-level block diagram of yet another perspective of the wearable computing device 10* operating in an exemplary environment.

Turning now to FIG. 1D, which illustrates how the wearable computing device 10* may obtain one or more functionalities from one or more electronic devices 20* after the one or more electronic devices 20* were determined to be within the spatial pod 50d of the wearable computing device 10* (e.g., within the communication range of the wearable computing device 10*). In various embodiments, the one or more functionalities that may be obtained by the wearable computing device 10* from the one or more electronic devices 20* include, for example, access to one or more external links 40 (e.g., Wi-Fi links such as WLAN links or cellular network links) to outside or beyond the spatial pod 50d of the wearable computing device 10*, GPS functionalities, sensor functionalities including movement sensor functionalities and/or audio and/or visual sensor functionalities, application functionalities (e.g., functionalities related to communication applications such as email and instant messaging applications), and so forth.

In some embodiments, the wearable computing device 10* may obtain the one or more functionalities by merely having access to the one or more functionalities. For example, if the one or more functionalities to be obtained are sensor functionalities or GPS functionalities, then the wearable computing device 10* may obtain or acquire the one or more functionalities by merely receiving output data 87 in the form of sensor data or GPS data (e.g., locational data). In other cases, however, the wearable computing device 10* may need to provide input (e.g., input data 86) to the one or more electronic devices 20* in order to fully utilize the one or more functionalities obtained from the one or more electronic devices 20*. The input or input data 86 may include, for example, a command or instructions for executing the one or more functionalities, a request for accessing the one or more functionalities, and/or other types of data that may be needed in order to fully utilize the one or more functionalities. For example, if the one or more functionalities being obtained by the wearable computing device 10* is Wi-Fi link to access the Internet, then the wearable computing device 10* may need to provide a URL address or if the Internet access is being sought for the purpose of transmitting emails, then the wearable computing device 10* will need to provide the emails to be transmitted.

As illustrated in FIG. 1D, in various embodiments, the wearable computing device 10* may rely on at least one electronic device 20a for communicating beyond (e.g., outside) the spatial pod 50d of the wearable computing device 10*. For these embodiments, the at least one electronic device 20a may be a variety of communication devices that can link the wearable computing device 10* to one or more external communication networks (e.g., LAN, WLAN, MAN, WAN, cellular data networks, PTSN, and so forth). In some embodiments, the at least one electronic device 20a that is able to provide a communication link (e.g., external link 40) beyond the spatial pod 50d may be, for example, a Smartphone, a tablet computer, a desktop or laptop computer, an access point, and so forth)

Figure 2A:
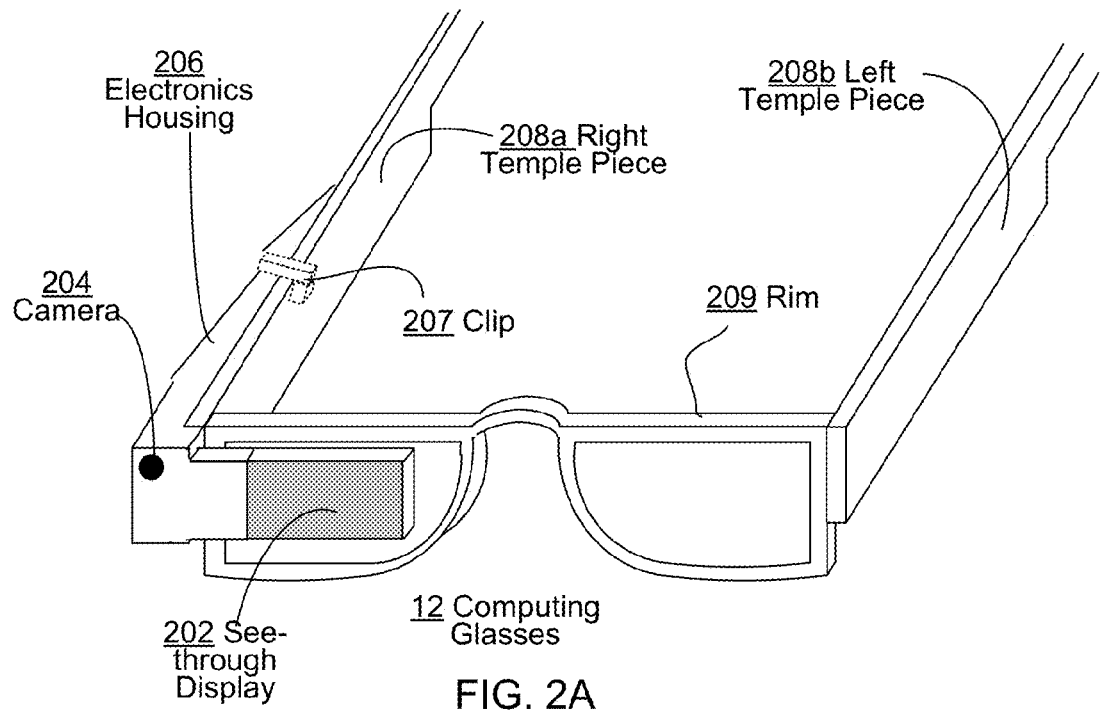
FIG. 2A shows exemplary computing glasses 12 that the wearable computing device 10* of FIGS. 1A, 1B, 1C, and 1D may be in the form of in accordance with various embodiments.

Referring now to FIG. 2A, which illustrates exemplary computing glasses 12, which is one form of the wearable computing device 10* of FIG. 1 in accordance with various embodiments. The computing glasses 12, in various embodiments, may be an augmented reality (AR) system or device. The computing glasses 12 may comprise a see-through display 202, a camera 204, an electronic housing 206 (which houses the electronics), and/or a frame that comprises a right temple piece 208a, a left temple piece 208b, and a rim 209. The right temple piece 208a and the left temple piece 208b are designed to extend to and wrap around the ears of the user and to couple the computing glasses 12 to the head of the user. Note that in alternative implementations, the wearable computing device 10* may take on the form of computing goggles rather than computing glasses 12, where the computing goggles employ a "regular" display such as a light emitting diode (LED) display rather than a see-through display 202. Note further that in some cases, the wearable computing device 10* may comprise merely the electronic housing 206 and the electronics housed by the electronic housing 206, the see-through display 202, the camera 204, and a coupling component such as a clip 207 for coupling to a frame (e.g., the rim 209 and the right temple piece 208a and the left temple piece 208b).

Figure 2B:
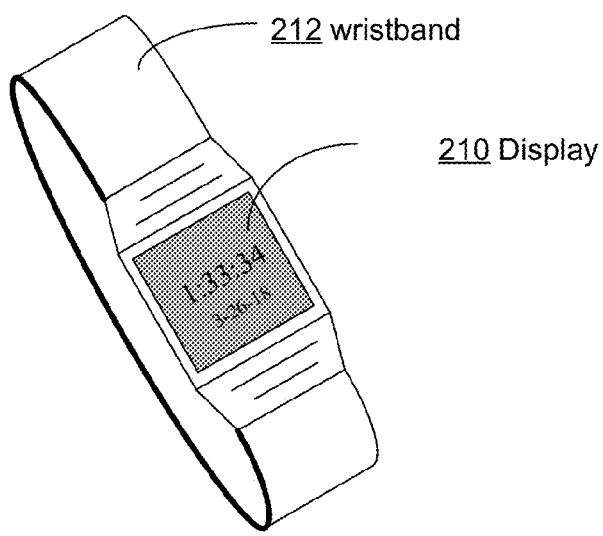
FIG. 2B shows an exemplary computing watch 14 that the wearable computing device 10* of FIGS. 1A, 1B, 1C, and 1D may be in the form of in accordance with various embodiments.

FIG. 2B illustrates an exemplary computing watch 14, which is another form of the wearable computing device 10* of FIG. 1 in accordance with various embodiments. The computing watch 14 includes at least a display 210 and a wristband 212 for wrapping around the wrist/arm of a user (e.g., coupling with the limb of the user). The display 210 may be a variety of displays including, for example, an LED display or liquid crystal display (LCD). In some embodiments, the wearable computing device 10* may comprise merely the watch portion of the computing watch 14 without the wristband 212 and one or more coupling components that couples with the wristband 212 (e.g., the wristband 212 portion of the computing watch is optional). Note that both forms of the wearable computing device 10* illustrated, for example, in FIGS. 2A and 2B (e.g., computing glasses 12 or computing watch 14) include one or more components (e.g., the right temple piece 208a, the left temple piece 208b, and the rim 209 of the computing glasses 12, a clip 207 of the computing glasses 12, or the wristband 212 of the computing watch 14) to facilitate coupling the wearable computing device 10* to at least a portion of a user's body.

Regardless of whether the wearable computing device 10* is in the form of computing glasses 12 (as illustrated, for example in FIG. 2A) or is the form of a computing watch 14 (as illustrated, for example, in FIG. 2B) the directional antenna 130 (see FIG. 4A or 4B) that is included with the wearable computing device 10* may be configured to point away from the user (e.g., wearer) of the wearable computing device 10* so that the user is minimally exposed to electromagnetic (EM) radiation when the directional antenna 130 is at least transmitting signals. For example, if the wearable computing device 10* is in the form of computing glasses 12, then the directional antenna 130 may be configured to only point away from the head of the user at least when transmitting signals in order to reduce the amount of EM radiation being exposed to the user's head. Similarly, if the wearable computing device 10* is in the form of a computing watch 14*, then the incorporated directional antenna 130 may be configured to point away from the wrist or arm of the user at least whenever the directional antenna 130 is transmitting signals.

In order to minimize the size of the wearable computing device 10*, the wearable computing device 10* may lack one or more functionalities that are typically found in larger computing devices but which may be accessed or obtained from nearby electronic devices 20*. For example, in some embodiments, the wearable computing device 10* may only include a single directional antenna 130 (see FIG. 4A or 4B) that may be used for communicating with one or more electronic devices 20* using low-power signals 70*(e.g., less than 0.8 milliwatt of transmit power) that are within the spatial pod 50* of the wearable computing device 10*. In some embodiments, the wearable computing device 10* may also lack a GPS system, which typically requires its own separate antenna (e.g., separate from an antenna that may be used for Wi-Fi or cellular network communication). The wearable computing device 10* may also lack other components such as various sensors (e.g., audio and/or visual sensors such as cameras if, for example, the wearable computing device 10* is in the form of a computing watch 14) commonly found in larger computing devices.

In various embodiments, a wearable computing device 10* may be a computing device that can be worn by a user. For these embodiments, a wearable computing device 10* may be wearable when the wearable computing device 10* includes at least one component for coupling the wearable computing device 10* to at least one portion of a person's body, or one or more components (e.g., one or more clips 207 of FIG. 2A) for coupling to a device (e.g., the frame of a pair of glasses including rim 209 and a pair of temple pieces 208a and 208b) that allows the wearable computing device 10*(e.g., the electronics housing 206 of FIG. 2A, the electronics included in the electronic housing 206, the see-through display 202, and so forth) to be coupled to a portion of a user. For example, if the wearable computing device 10* of FIG. 1 is in the form of computing glasses 12 (see FIG. 2A), which in some cases may be an augmented reality (AR) device, then it may include two temple pieces 208* for extending over and around ears of a user. Alternatively, the wearable computing device 10* may merely be the electronic housing 206 (see FIG. 2A) including the electronics housed in the electronic housing 206 and the see-through display 202 of an AR device that clips (via clip 207) onto the frame (e.g., rim 209 and temples 208*) of computing glasses 12 (see FIG. 2A) On the other hand, if the wearable computing device 10* is in the form of a computing watch 14 (see FIG. 2B), then it may include a wristband 212 for wrapping around the wrist/arm of the user. Alternatively, the wearable computing device 10* may merely be the watch portion of a watch (without the wristband 212) along with a feature for attaching the watch portion to the wristband 212 (see FIG. 2B).

As briefly described above, in some embodiments, the wearable computing device 10* may employ only a single directional antenna 130 that may be used to communicate with one or more nearby electronic devices 20*. In various embodiments, the directional antenna 130 that may be employed may be a variety of directional antennas such as a metamaterial antenna (see, for example, U.S. Patent Application Pub. No. 2012/0194399, which is hereby incorporated by reference), a Yagi-Uda antenna, a log periodic antenna, a dipole antenna, a parabolic antenna, a patch antenna, a microstrip antenna, an array antenna, a biconical antenna, or a collinear antenna and so forth.

In various embodiments, the wearable computing device 10* may wirelessly communicate with one or more electronic devices 20* that are located with spatial pod 50* of the wearable computing device 10* via one or more signals from at least one of a variety of frequency bands. For example, in some embodiments, the wearable computing device 10* may communicate with nearby electronic devices via one or more signals from the 2.4 GHz industrial, scientific and medical (ISM) frequency band, which has a frequency range from 2.4 GHz to 2.4835 GHz. Alternatively, the wearable computing device 10* may communicate with nearby electronic devices via one or more signals from the 5 GHz ISM frequency band or the 5 GHz U-NII (Unlicensed National Information Infrastructure) frequency band with a frequency range between 5.180 GHz and 5.825 GHz. In still other alternative embodiments, the wearable computing device 10* may communicate with nearby electronic devices 20* via one or more signals from the 60 GHz band (e.g., millimeter waveband or mmWave band with a frequency range between 57 and 64 GHz (U.S.) or between 57 and 66 GHz (Japan and Europe)).

Note that the 60 GHz frequency band provides certain advantages over the other two frequency bands. For example, signals from the 60 GHz frequency band tend to attenuate very quickly in nominal environmental conditions (e.g., gets easily absorbed by materials, moisture, etc.) and therefore when used for communicating by the wearable computing device 10* may cause the spatial pod 50* of the wearable computing device 10* to be relatively small (which may be desirable in some cases in order to avoid overlapping with adjacent spatial pods of other devices). Further, higher data rates are possible using the 60 GHz frequency band rather than the two lower frequency bands (2.4 GHz frequency band and the 5 GHz frequency band).

In various embodiments, a spatial pod 50* that envelopes a wearable computing device 10* may be a spatial volume that includes the wearable computing device 10* and that is defined or enclosed by an enveloping boundary 52*, where low-power wireless signals generated by the wearable computing device 10* being discernible over background noise (e.g., background electromagnetic radiation noise) within the enveloping boundary 52* and not discernible over background noise outside the enveloping boundary 52*. In some embodiments, references in the following to "low-power signals" may be in reference to wireless signals that were transmitted using less than 1 milliwatt of transmitting power. In some cases, low-power signals 70* may be, for example, wireless signals that were transmitting with 0.8 milliwatt, 0.5 milliwatt, 0.3 milliwatt, or less than 0.3 milliwatt of transmit power.

In various embodiments, the low-power signals 70* that may define the enveloping boundary 52* of a spatial pod 50* may be the maximum low-power wireless signals that may be allowed to transmitted by the wearable computing device 10*. That is, in order to keep the size of a spatial pod 50* of the wearable computing device 10* relatively small and to keep power consumption relatively low, the logic endowed in the wearable computing device 10* may restrict the transmission power of wireless signals transmitted by the wearable computing device 10*.

In some embodiments, the size and shape of a spatial pod 50* of a wearable computing device 10* may be dictated by the presence of one or more spatial objects (e.g., a wall, the interior surface of a passenger cabin of a room, a cubical, a car, a bus, a boat, a plane, and so forth) in the proximity of the wearable computing device 10*. That is, wireless signals tend to be attenuated by various solids, semi-solids, and even gaseous materials at different rates (note that the rate of attenuation of wireless signals will also typically depend on the frequency of the wireless signals be transmitted). Of course, and regardless of the material, the more "material" that a wireless signal has to travel through the greater the attenuation of the wireless signal.

In some embodiments, the size of a spatial pod 50* of a wearable computing device 10* may be minimized in order to, for example, reduce power requirements of the wearable computing device 10* for communicating within the spatial pod 50*. In some cases, the size of the spatial pod 50* of the wearable computing device 10* may be minimized by reducing or restricting the power (e.g., restricting to less than 0.5 milliwatt of transmit power) of the wireless signals transmitted by the wearable computing device 10*.

Figure 3B:
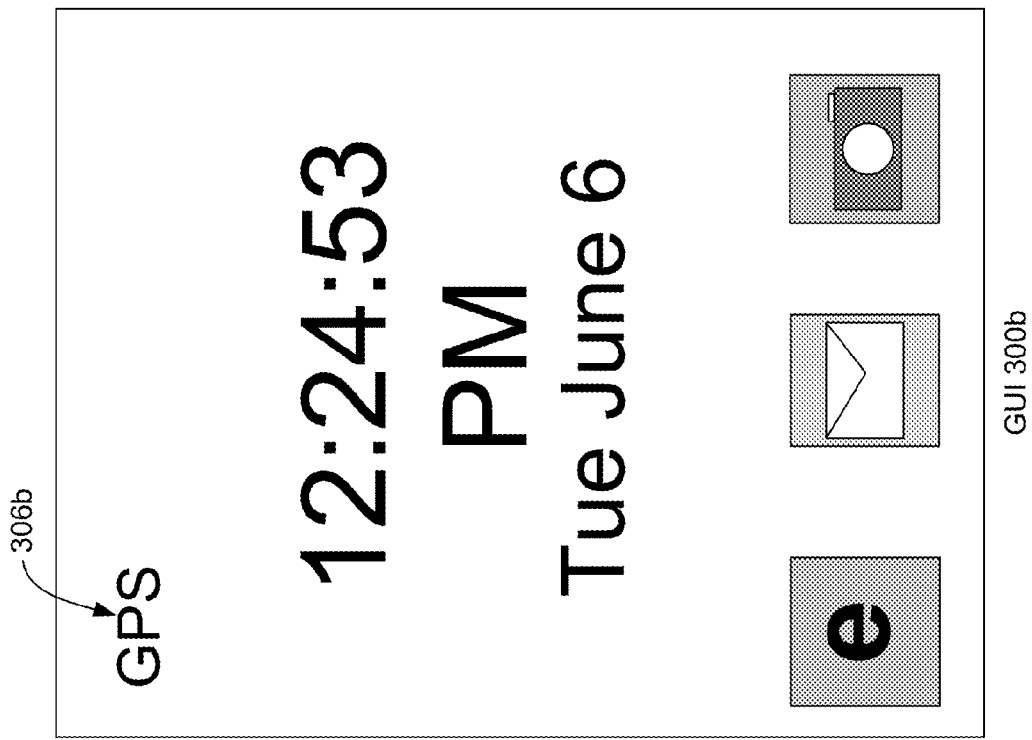
FIGS. 3A, 3B, 3C, 3D, and 3E show exemplary Graphical User Interfaces (GUIs) that may be displayed by the wearable computing device 10* of FIG. 1.
Figure 3A:
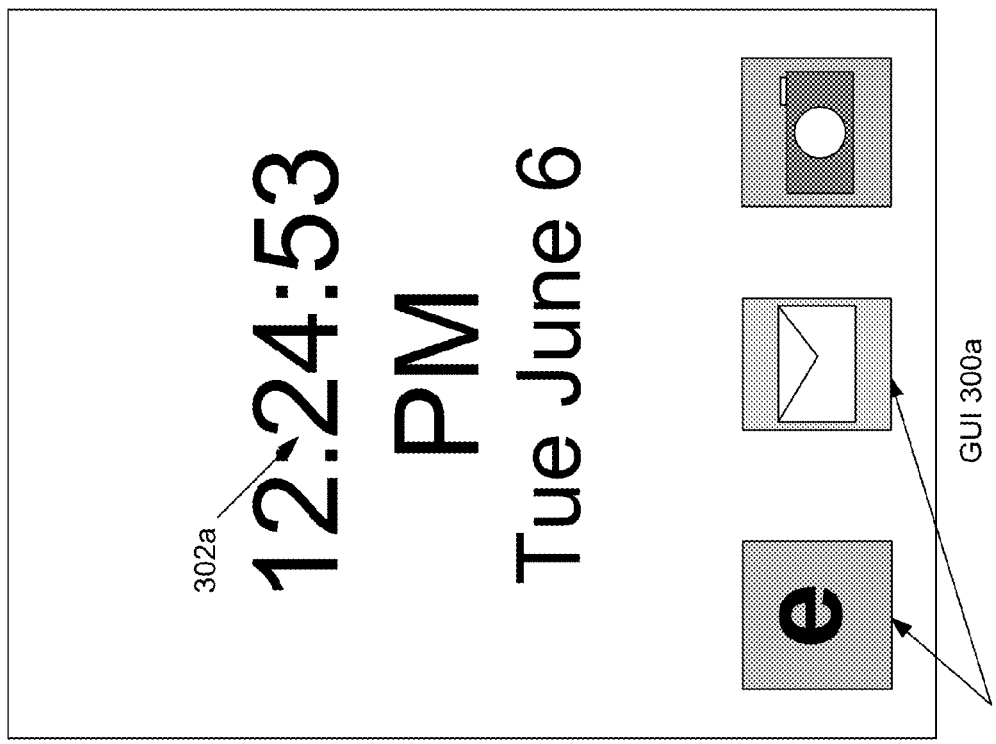
Figure 3D:
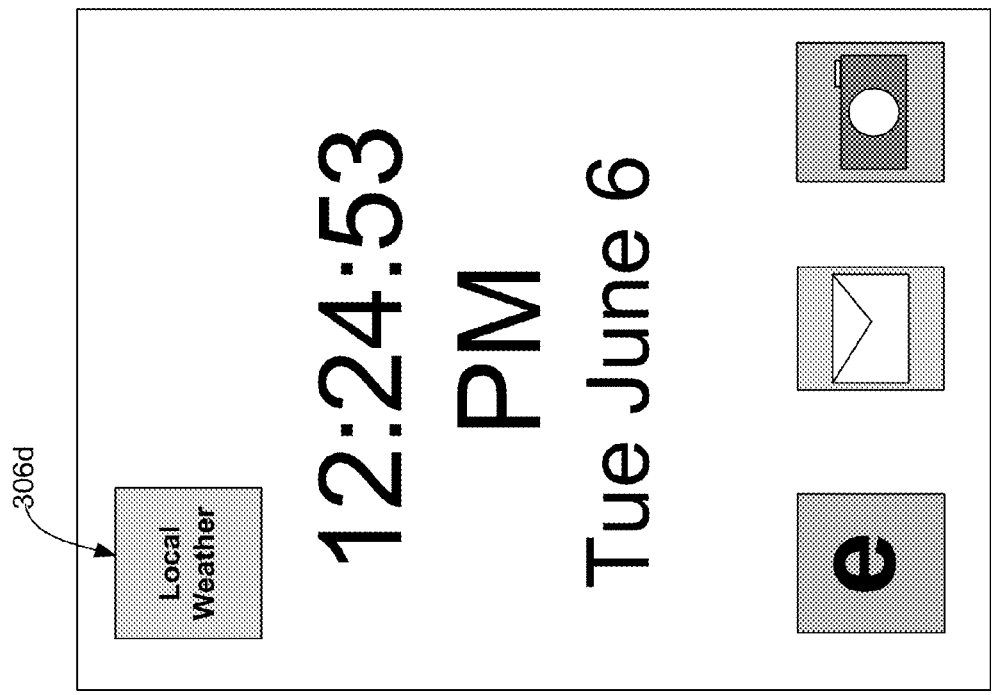

Turning now to FIGS. 3A, 3B, 3C, 3D, and 3E, which illustrate exemplary graphical user interfaces (GUIs) that the wearable computing device 10* may present through a display device when the wearable computing device 10* is in the form of a computing watch 14. Turning particularly now to FIG. 3A, which illustrates an exemplary GUI 300a that includes three icons 304 representing three different applications that may be available through the wearable computing device 10*. Note that at least some of the applications (e.g., browser or email application) that may be available through the wearable computing device 10* may only be available if certain functionalities (e.g., access to the Internet) are obtained or acquired from a nearby electronic device.

Turning now to FIGS. 3A, 3B, 3C, 3D, and 3E, which illustrates exemplary graphical user interfaces (GUIs) that the wearable computing device 10* may present through a display device when, for example, the wearable computing device 10* is in the form of a computing watch 14. Turning particularly now to FIG. 3A, which illustrates an exemplary GUI 300a that includes three icons 304 representing three different applications that may be available through the wearable computing device 10*. Note that at least some of the applications (e.g., browser or email application) that may be available through the wearable computing device 10* may only be available if certain functionalities (e.g., access to the Internet) are obtained or acquired from a nearby electronic device.

FIG. 3B illustrates an exemplary GUI 300b that may be displayed by the wearable computing device 10* after the wearable computing device 10* acquires a particular functionality, in this case GPS functionality, from a nearby electronic device. In particular, the GUI 300b includes icon 306b that indicates availability of the GPS functionality.

Figure 3C:
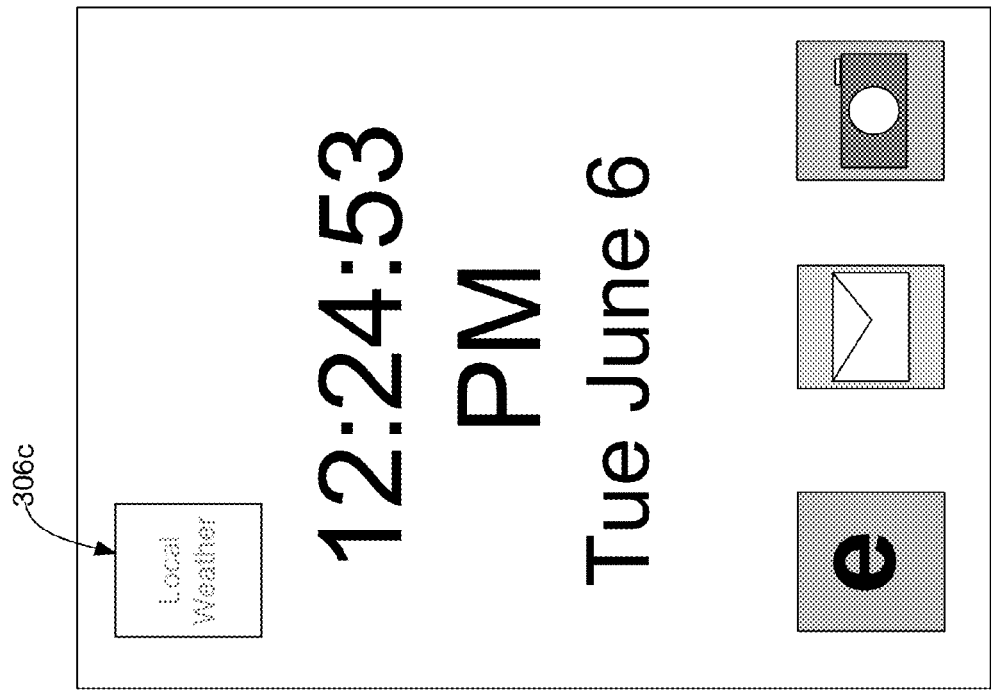

FIG. 3C illustrates an exemplary GUI 300c that may be displayed by the wearable computing device 10*. In particular, the exemplary GUI 300c includes an icon 306c that represents an application (e.g., local weather reporting application) and that is being displayed in a first format (e.g., semi-transparent) that indicates that the application is disabled. That is, the associated application (e.g., local weather reporting application) may be fully executable only if the wearable computing device 10* has obtained access to specific functionalities such as access to the Internet and/or GPS functionalities. In contrast, the GUI 300d of FIG. 3D may be displayed by the wearable computing device 10* once the specific functionalities (e.g., Internet access and/or GPS functionalities) has been acquired by the wearable computing device 10*. The GUI 300d includes icon 306d, which is similar or the same as icon 306c of FIG. 3C except that icon 306d being in a second format (e.g., bolded) that indicates that the associated application (e.g., local weather reporting application) is functional or executable.

Figure 3E:
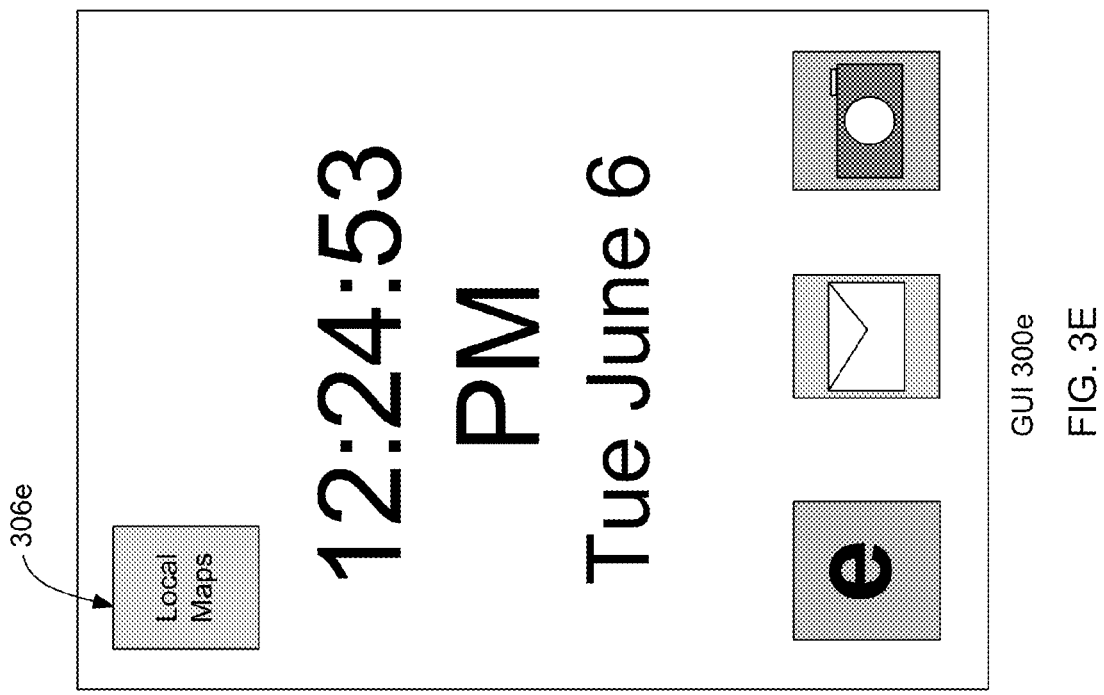

FIG. 3E illustrates yet another exemplary GUI 300e that may be displayed by the wearable computing device 10*. In particular, the GUI 300e includes an icon 306e that represents an application (e.g., a navigation/maps application) and that is only displayed only when certain functionalities (e.g., GPS functionalities) are acquired by the wearable computing device 10*.

Referring now to FIGS. 4A and 4B, illustrating two block diagrams representing two different implementations of the wearable computing device 10* of FIGS. 1A, 1B, 1C, and 1D and that are designed to execute the operations and processes to be described herein. In particular, and as will be further described herein, FIG. 4A illustrates a wearable computing device 10' that is the "hardwired" or "hard" implementation of a small form-factor wearable device that can implement the operations and processes to be described herein. The wearable computing device 10' may comprise certain logic modules including, for example, a signal capturing module 102', a nearby ascertaining module 104', and/or a functionality acquiring module 106' that are implemented using purely hardware or circuitry components (e.g., application specific integrated circuit or "ASIC"). In contrast, FIG. 4B illustrates a wearable computing device 10" that is the "soft" implementation of a small form-factor wearable device that can implement the operations and processes to be described herein. In various embodiments, the wearable computing device 10" may also include certain logic modules including, for example, a signal capturing module 102", a nearby ascertaining module 104", and/or a functionality acquiring module 106" that are implemented using electronic circuitry (e.g., one or more processors 116 including one or more microprocessors, controllers, etc.) executing one or more programming instructions (e.g., software in the form of computer readable instructions 152—see FIG. 4B).

The embodiments of the wearable computing device 10* illustrated in FIGS. 4A and 4B are two extreme implementations of a small form-factor wearable system in which all of the logic modules (e.g., the signal capturing module 102', the nearby ascertaining module 104', and the functionality acquiring module 106') are implemented using purely hardware solutions (e.g., circuitry such as ASIC) as illustrated in, for example, FIG. 4A or in which all of the logic modules (e.g., the signal capturing module 102", the nearby ascertaining module 104", and the functionality acquiring module 106") are implemented using software solutions (e.g., programmable instructions in the form of computer readable instructions 152 being executed by hardware such as one or more processors 116) as illustrated in, for example, FIG. 4B. Since there are many ways of combining hardware, software, and/or firmware in order to implement the various logic modules (e.g., the signal capturing module 102*, the nearby ascertaining module 104*, and the functionality acquiring module 106*), only the two extreme implementations (e.g., the purely hardware solution as illustrated in FIG. 4A and the software solution of FIG. 4B) are illustrated here. It should be noted here that with respect to the "soft" implementation illustrated in FIG. 4B, hardware in the form of circuitry such as one or more processors 116 are still needed in order to execute the software. Further details related to the two implementations of the wearable computing device 10* illustrated in FIGS. 4A and 4B will be provided in greater detail below.

In some instances, one or more components may be referred to herein as "configured to," "configured by," "configurable to," "operable/operative to," "adapted/adaptable," "able to," "conformable/conformed to," "designed to," etc. Those skilled in the art will recognize that such terms (e.g., "configured to") generally encompass active-state components and/or inactive-state components and/or standby-state components, unless context requires otherwise.

Referring particularly now to FIG. 4A, which illustrates a block diagram of an wearable computing device 10' that includes a signal capturing module 102', a nearby ascertaining module 104', a functionality acquiring module 106', memory 114, user interface 112 (e.g., a display, a speaker, and so forth), one or more processors 116 (e.g., one or more microprocessors), transceiver 118, one or more sensors 120, and a directional antenna 130. In various embodiments, the memory 114 may store one or more applications 154 (e.g., communication applications such as email, instant messaging, text messaging, and VoIP applications, personal information manager application such as Microsoft Outlook, gaming application, and so forth). The one or more sensors 120 that may be included in the wearable computing device 10' may include, for example, one or more audio sensors (e.g., microphones), one or more visual sensors (e.g., cameras), one or more myoelectric sensors, and so forth.

In various embodiments, the signal capturing module 102' of FIG. 4A is a logic module that may be designed to, among other things, capture (e.g., receive) one or more signals through the directional antenna 130, the one or more signals 80 having been transmitted by one or more electronic devices 20*. In contrast, the nearby ascertaining module 104' of FIG. 4A is a logic module that may be configured to ascertain (e.g., determine) that the one or more electronic devices 20* that transmitted the one or more signals 80 are within a spatial pod 50* of the wearable computing device 10' based, at least in part, on the one or more signals 80 captured through the directional antenna 130, the spatial pod 50* of the wearable computing device 10' being a spatial volume that includes the wearable computing device 10' and being defined by an enveloping boundary 52*, where low-power signals (e.g. low-power signals 70* of FIG. 1A or 1B) transmitted via the directional antenna 130 being discernible over background noise within the enveloping boundary 52* and not discernible over background noise outside the enveloping boundary 52*. The functionality acquiring module 106' of FIG. 4A, on the other hand, is a logic module that may be configured to acquire or obtain, via the directional antenna 130, at least access to one or more functionalities from the one or more electronic devices 20* that were ascertained to be within the spatial pod 50* of the wearable computing device 10'.

Turning now to FIG. 4B, which illustrates a block diagram of another wearable computing device 10" that can implement the operations and processes to be described herein. As indicated earlier, the wearable computing device 10" in FIG. 4B is merely the "soft" version of the wearable computing device 10' of FIG. 4A because the various logic modules: the signal capturing module 102", the nearby ascertaining module 104", and the functionality acquiring module 106" are implemented using one or more processors 116 (e.g., one or more microprocessors or controllers) executing software (e.g., computer readable instructions 152) rather than being implemented using purely hardware (e.g., ASIC) solutions as was the case in the wearable computing device 10' of FIG. 4A. Thus, the signal capturing module 102", the nearby ascertaining module 104", and the functionality acquiring module 106" of FIG. 4B may be designed to execute the same functions as the signal capturing module 102', the nearby ascertaining module 104', and the functionality acquiring module 106' of FIG. 4A. The wearable computing device 10", as illustrated in FIG. 4B, may include other components (e.g., the user interface 112, the transceiver 118, directional antenna 130, memory 114 that stores one or more applications 154 as well as the computer readable instructions 152, and so forth) that are the same or similar to the other components that may be included in the wearable computing device 10' of FIG. 4A. Note that in the embodiment of the wearable computing device 10" illustrated in FIG. 4B, the various logic modules (e.g., the signal capturing module 102", the nearby ascertaining module 104", and the functionality acquiring module 106") may be implemented by the one or more processors 116 (or other types of circuitry such as field programmable gate arrays or FPGAs) executing one or more computer readable instructions 152 stored in memory 114.

In various embodiments, the memory 114 of the wearable computing device 10' of FIG. 4A and the wearable computing device 10" of FIG. 4B may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices.

Figure 5A:
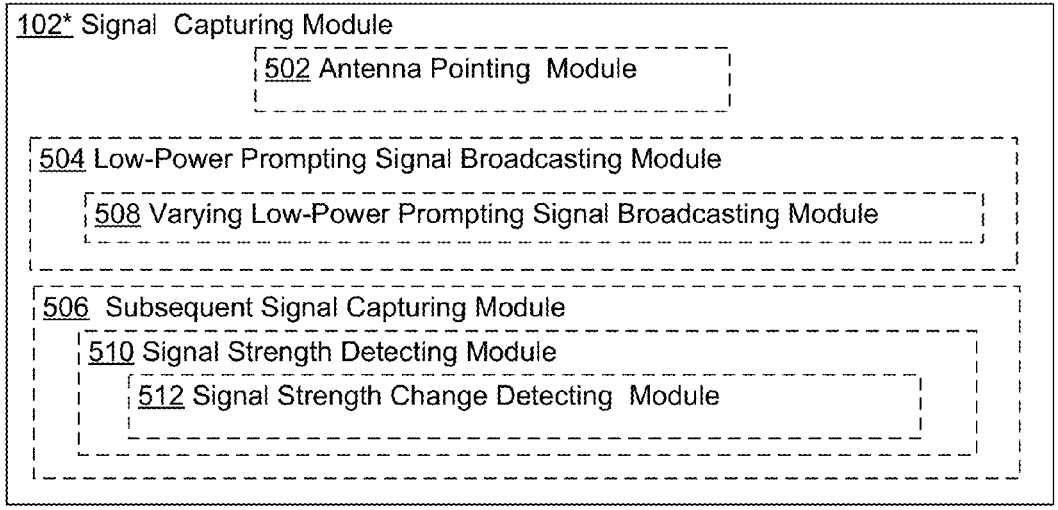
FIG. 5A shows another perspective of the signal capturing module 102* of FIGS. 4A and 4B (e.g., the signal capturing module 102' of FIG. 4A or the signal capturing module 102" of FIG. 4B) in accordance with various implementations.

Turning now to FIG. 5A illustrating a particular implementation of the signal capturing module 102*(e.g., the signal capturing module 102' or the signal capturing module 102") of FIGS. 4A and 4B. As illustrated, the signal capturing module 102* may include one or more sub-logic modules in various alternative implementations. For example, in various embodiments, the signal capturing module 102* may include an antenna pointing module 502, a low-power prompting signal broadcasting module 504 (which may further include a varying low-power prompting signal broadcasting module 508) and/or a subsequent signal capturing module 506 (which may further include a signal strength detecting module 510 that may further comprise a signal strength change detecting module 512). Specific details related to the signal capturing module 102* as well as the above-described sub-modules of the signal capturing module 102* will be provided below with respect to the operations and processes to be described herein.

Figure 5B:
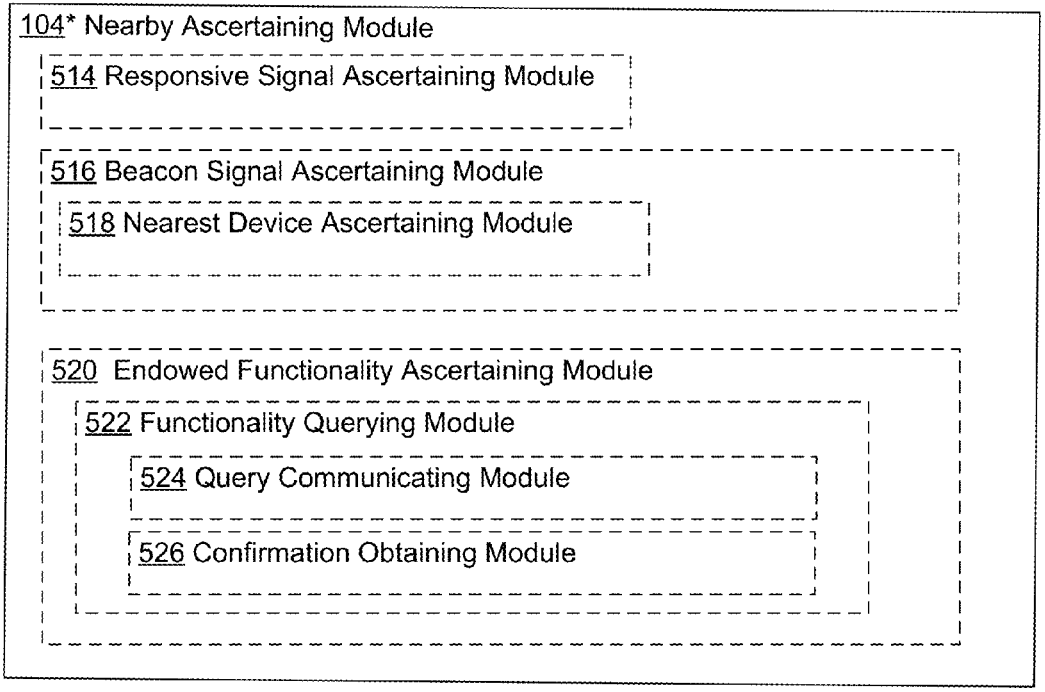
FIG. 5B shows another perspective of the nearby ascertaining module 104* of FIGS. 4A and 4B (e.g., the nearby ascertaining module 104' of FIG. 4A or the nearby ascertaining module 104" of FIG. 4B) in accordance with various implementations.

Turning now to FIG. 5B illustrating a particular implementation of the nearby ascertaining module 104*(e.g., the nearby ascertaining module 104' or the nearby ascertaining module 104") of FIGS. 4A and 4B. As illustrated, the nearby ascertaining module 104* may include one or more sub-logic modules in various alternative implementations. For example, in various embodiments, the nearby ascertaining module 104* may include a responsive signal ascertaining module 514, a beacon signal ascertaining module 516 (which may further include a nearest device ascertaining module 518), and/or an endowed functionality ascertaining module 520 (which may further include a functionality querying module 522 that may further include a query communicating module 524 and/or a confirmation obtaining module 526). Specific details related to the nearby ascertaining module 104* as well as the above-described sub-modules of the nearby ascertaining module 104* will be provided below with respect to the operations and processes to be described herein.

Figure 5C:
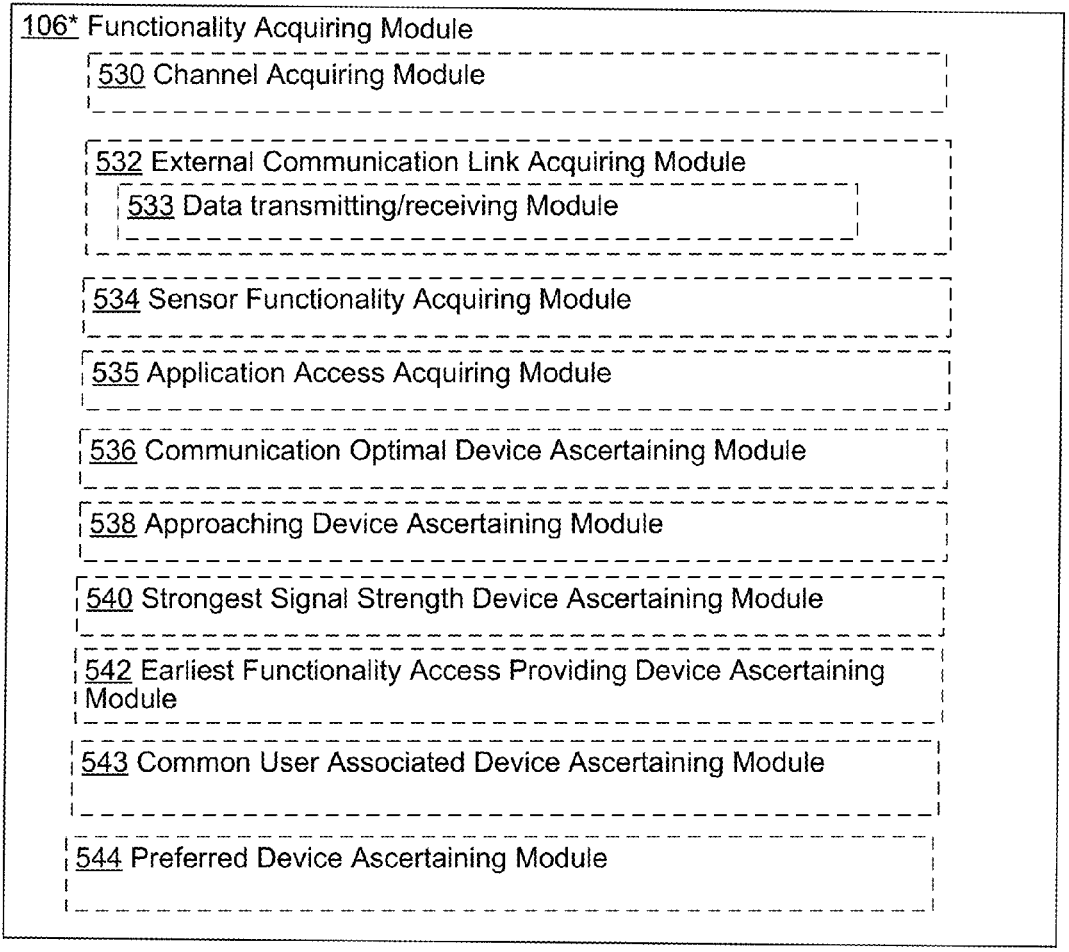
FIG. 5C shows another perspective of the functionality acquiring module 106* of FIGS. 4A and 4B (e.g., the functionality acquiring module 106' of FIG. 4A or the functionality acquiring module 106" of FIG. 4B) in accordance with various implementations.

FIG. 5C illustrates a particular implementation of the functionality acquiring module 106*(e.g., the functionality acquiring module 106' or the functionality acquiring module 106") of FIG. 4A or 4B. As illustrated, the functionality acquiring module 106* may include one or more sub-logic modules in various alternative embodiments. For example, in various embodiments, the functionality acquiring module 106* may include a channel acquiring module 530, an external communication link acquiring module 532 (which may further comprise a data transmitting/receiving module 533), a sensor functionality acquiring module 534, an application access acquiring module 535, a communication optimal device ascertaining module 536, an approaching device ascertaining module 538, a strongest signal strength device ascertaining module 540, an earliest functionality access providing device ascertaining module 542, a common user associated device ascertaining module 543, and/or a preferred device ascertaining module 544. Specific details related to the functionality acquiring module 106*, as well as the above-described sub-modules of the functionality acquiring module 106*, will be provided below with respect to the operations and processes to be described herein.

Figure 6:
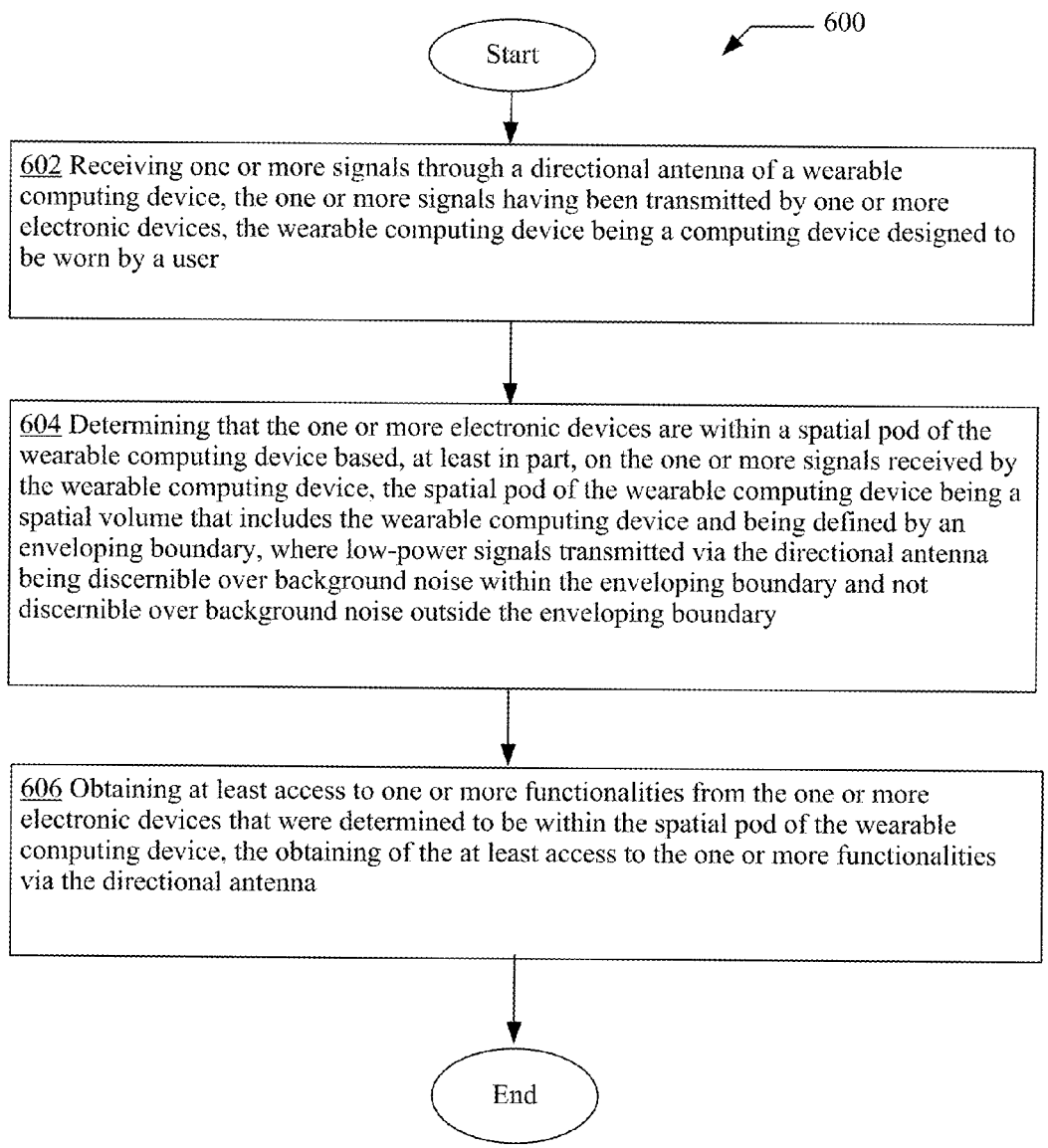
FIG. 6 is a high-level logic flowchart of a process, e.g., operational flow 600, according to some embodiments.

A more detailed discussion related to the wearable computing device 10*(e.g., the wearable computing device 10' of FIG. 4A or the wearable computing device 10" of FIG. 4B) discussed above will now be provided with respect to the processes and operations to be described herein. FIG. 6 illustrates an operational flow 600 representing example operations that may be implemented by a wearable computing device 10* for, among other things, receiving or capturing one or more signals 80 through a directional antenna 130 that was transmitted by one or more electronic devices 20*; determining or ascertaining that the one or more electronic devices 20* are near the wearable computing device 10* within a spatial pod 50* of the wearable computing device 10*, where the spatial pod 50* of the wearable computing device 10* being a spatial volume that includes the wearable computing device 10* and being defined by an enveloping boundary 52*, where low-power signals 70* transmitted via the directional antenna 130 being discernible over background noise within the enveloping boundary 52* and not discernible over background noise outside the enveloping boundary 52*; and obtaining or acquiring at least access to one or more functionalities from the one or more electronic devices 20* that were determined to be within the spatial pod 50* of the wearable computing device 10*. In various implementations, these operations may be implemented by the wearable computing device 10* of FIG. 4A or 4B (as well as FIG. 1A, 1B, 1C, or 1D).

In FIG. 6 and in the following figures that include various examples of operational flows, discussions and explanations will be provided with respect to the wearable computing device 10* described above and as illustrated in FIGS. 4A, 4B, 5A, 5B, 5C, and/or with respect to other examples (e.g., as provided in FIGS. 1A, 1B, 2C, 1D, 2A, 2B, 2C, 3A, 3B, 3C, 3D, and 3E) and contexts. However, it should be understood that the operational flows may be executed in a number of other environments and contexts, and/or in modified versions of FIGS. 1A, 1B, 1C, 1D, 2A, 2B, 2C, 3A, 3B, 3C, 3D, 3E, 4A, 4B, 5A, 5B, and/or 5C. Also, although the various operational flows are presented in the sequence(s) illustrated, it should be understood that the various operations may be performed in orders other than those which are illustrated, or may be performed concurrently.

Further, in FIG. 6 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 6 as well as the other operations to be described herein are performed by at least one of a machine, an article of manufacture, or a composition of matter unless indicated otherwise.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

In any event, after a start operation, the operational flow 600 of FIG. 6 may move to a signal receiving operation 602 for receiving one or more signals through a directional antenna of a wearable computing device, the one or more signals having been transmitted by one or more electronic devices, the wearable computing device being a computing device designed to be worn by a user. For instance, and as illustration, the signal capturing module 102* of the wearable computing device 10* of FIG. 4A or 4B (e.g., the signal capturing module 102' of FIG. 4A or the signal capturing module 102" of FIG. 4B) receiving or capturing one or more signals 80 (see FIG. 1C) through a directional antenna 130 (e.g., a metamaterial antenna) of the wearable computing device 10*, the one or more signals 80 having been transmitted by one or more electronic devices 20*, the wearable computing device 10* being a computing device designed to be worn by a user (e.g., to be coupled to a portion of the user such as coupled to a limb or the head of the user). Note that in embodiments where multiple signals 80 from multiple electronic devices 20* are captured through the directional antenna 130, the directional antenna 130 may be steered to point to different portions of the surrounding environment 100 as illustrated in, for example, FIG. 1A without, for example in some embodiments, pointing towards the body of the user wearing the wearable computing device 10*.

Operational flow 600 may also include a nearby determining operation 604 for determining that the one or more electronic devices are within a spatial pod of the wearable computing device based, at least in part, on the one or more signals received by the wearable computing device, the spatial pod of the wearable computing device being a spatial volume that includes the wearable computing device and being defined by an enveloping boundary, where low-power signals transmitted via the directional antenna being discernible over background noise within the enveloping boundary and not discernible over background noise outside the enveloping boundary. For instance, the nearby ascertaining module 104* (e.g., the nearby ascertaining module 104' of FIG. 4A or the nearby ascertaining module 104" of FIG. 4B) of the wearable computing device 10* of FIG. 4A or 4B determining or ascertaining that the one or more electronic devices 20* are within a spatial pod 50* of the wearable computing device 10* based, at least in part, on the one or more signals 80 (see, for example, FIG. 1C) received by the wearable computing device 10*, the spatial pod 50* of the wearable computing device 10* being a spatial volume that includes the wearable computing device 10* and being defined by an enveloping boundary 52*, where low-power signals 70*(see, for example, FIG. 1A or 1B) transmitted via the directional antenna 130 being discernible over background noise within the enveloping boundary 52* and not discernible over background noise outside the enveloping boundary 50*. In various embodiments, the low-power signals 70* that define the perimeter of the spatial pod 50* of the wearable computing device 10* may be one or more wireless signals (e.g., one or more wireless signals having one or more frequencies from the 2.4 GHz, 5 GHz, or 60 GHz ISM or U-NII frequency band) that were transmitted via the directional antenna 130 with less than or equal to 0.8 milliwatt of transmit power.

As further illustrated in FIG. 6, operational flow 600 may also include a functionality obtaining operation 606 for obtaining at least access to one or more functionalities from the one or more electronic devices that were determined to be within the spatial pod of the wearable computing device, the obtaining of the at least access to the one or more functionalities via the directional antenna. For instance, the functionality acquiring module 106*(e.g., functionality acquiring module 106' of FIG. 4A or the functionality acquiring module 106" of FIG. 4B) of the wearable computing device 10* of FIG. 4A or 4B obtaining or acquiring at least access to one or more functionalities (e.g., access to data outputted by a sensor such as GPS data or access to a communication link to outside of the spatial pod 50*) from the one or more electronic devices 20* that were determined to be within the spatial pod 50* of the wearable computing device 10*, the obtaining or acquiring of the at least access to the one or more functionalities via the directional antenna 130.

Figure 7A:
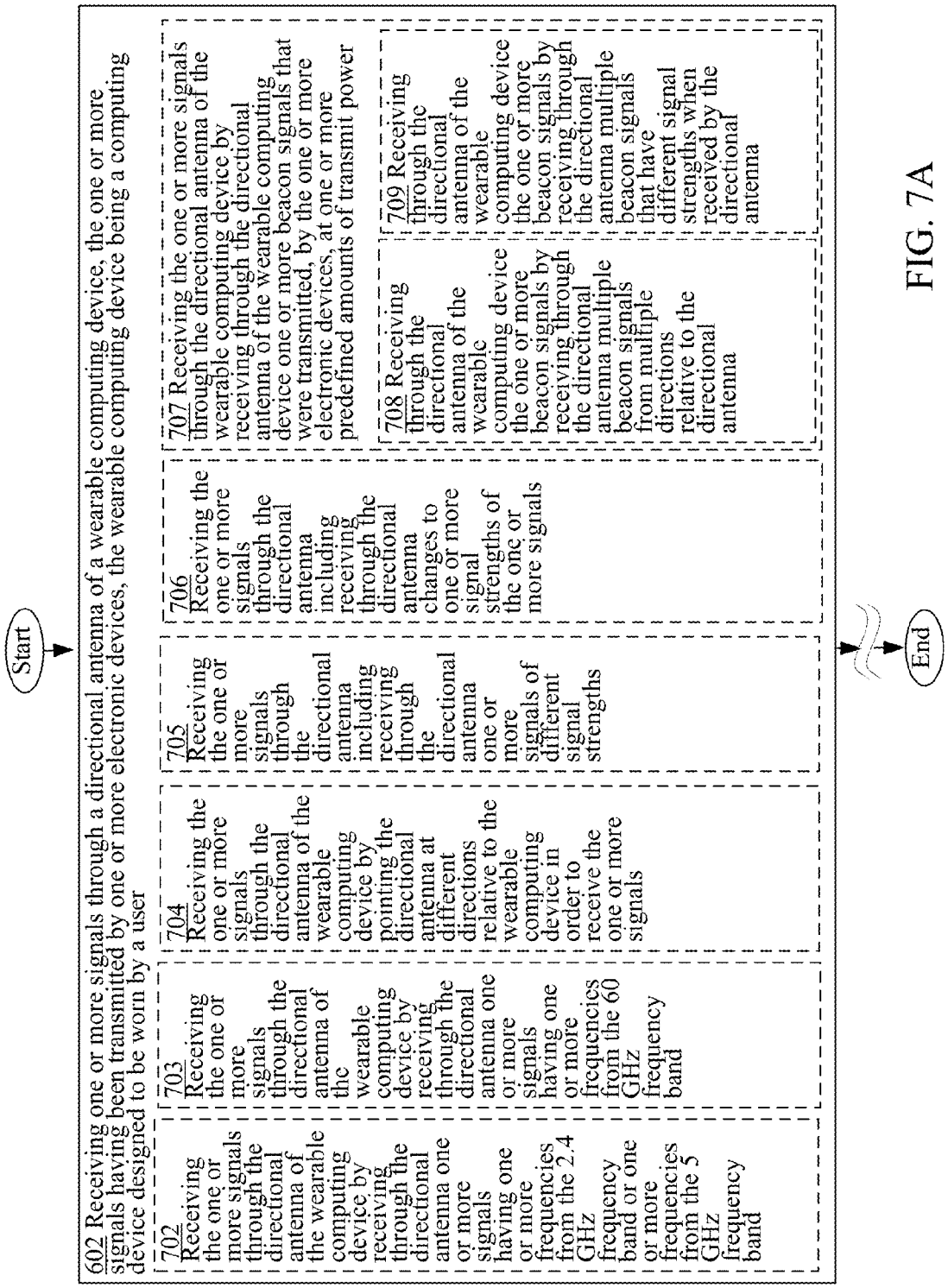
FIG. 7A is a high-level logic flowchart of a process depicting alternate implementations of the signal receiving operation 602 of FIG. 6.

As will be described below, the signal receiving operation 602, the nearby determining operation 604, and the functionality obtaining operation 606 may be executed in a variety of different ways in various alternative implementations. FIGS. 7A, 7B, 7C, 7D, and 7E, for example, illustrate at least some of the alternative ways that the signal receiving operation 602 of FIG. 6 may be executed in various alternative implementations. In some cases, for example, the signal receiving operation 602 may actually include or involve an operation 702 for receiving the one or more signals through the directional antenna of the wearable computing device by receiving through the directional antenna one or more signals having one or more frequencies from the 2.4 GHz frequency band or one or more frequencies from the 5 GHz frequency band as illustrated in FIG. 7A. For instance, the signal capturing module 102* of the wearable computing device 10*(e.g., the wearable computing device 10' of FIG. 4A or the wearable computing device 10" of FIG. 4B) receiving the one or more signals 80 (see, for example, FIG. 1C) through the directional antenna 130 of the wearable computing device 10* by receiving or capturing through the directional antenna 130 one or more signals 80 having one or more frequencies from the 2.4 GHz frequency band (e.g., 2.4 GHz ISM band with a frequency range between 2.400 GHz to 2.4835 GHz) or one or more frequencies from the 5 GHz frequency band (e.g., 5 GHz ISM frequency band with a range of 5.725 GHz to 5.875 GHz or the 5 GHz U-NII band with a range of 5.180 GHz or 5.825 GHz).

In some alternative implementations, the signal receiving operation 602 may actually include or involve an operation 703 for receiving the one or more signals through the directional antenna of the wearable computing device by receiving through the directional antenna one or more signals having one or more frequencies from the 60 GHz frequency band. For instance, the signal capturing module 102* of the wearable computing device 10* of FIG. 4A or 4B receiving the one or more signals 80 through the directional antenna 130 of the wearable computing device 10* by receiving or capturing through the directional antenna 130 one or more signals 80 having one or more frequencies from the 60 GHz frequency band (e.g., frequency band between 57 GHz and 64 GHz).

As illustrated in FIGS. 1A to 1D, electronic devices 20* that are located near (e.g., located within the spatial pod 50*) the wearable computing device 10* may be located in different directions from the wearable computing device 10*. Thus, in order to ensure that signals 80 (see, for example, FIG. 1C) emitted by all of the electronic devices 20* near the wearable computing device 10* are actually being captured or received by the directional antenna 130 of the wearable computing device 10*, the directional antenna 130 may be steered to scan at least selective portions of the surrounding environment of the wearable computing device 10*. Thus, in various implementations, the signal receiving operation 602 may actually include or involve an operation 704 for receiving the one or more signals through the directional antenna of the wearable computing device by pointing the directional antenna at different directions relative to the wearable computing device in order to receive the one or more signals. For instance, the signal capturing module 102* including the antenna pointing module 502 (see FIG. 5A) of the wearable computing device 10* of FIG. 4A or 4B receiving the one or more signals 80 through the directional antenna 130 of the wearable computing device 10* by having the antenna pointing module 502 point the directional antenna 130 at different directions relative to the wearable computing device 10* in order to receive the one or more signals 80 as illustrated, for example, in FIG. 1B.

In the same or alternative implementations, the signal receiving operation 602 may include or involve an operation 705 for receiving the one or more signals through the directional antenna including receiving through the directional antenna one or more signals of different signal strengths. For instance, the signal capturing module 102* of the wearable computing device 10* of FIG. 4A or 4B receiving the one or more signals 80 through the directional antenna 130 including receiving or capturing through the directional antenna 130 one or more signals 80 of different signal strengths. In some cases, by determining the signal strengths of the received one or more signals 80, a determination may be made as to how much transmit power may be needed in order to wirelessly communicate with the one or more electronic devices 20* that transmitted the one or more signals 80. That is, if the one or more signals 80 were originally transmitted by the one or more electronic devices 20* at a predefined/known amount of transmit power, then based on the detected signal strength of the one or more signals 80 when received by the wearable computing device 10*, a determination can be made as to how much transmit powers will be needed in order for the wearable computing device 10* to communicate (e.g., transmit messages) to the one or more electronic devices 20*.

In the same or alternative implementations, the signal receiving operation 602 may include or involve an operation 706 for receiving the one or more signals through the directional antenna including receiving through the directional antenna changes to one or more signal strengths of the one or more signals. For instance, the signal capturing module 102* of the wearable computing device 10* of FIG. 4A or 4B receiving the one or more signals 80 through the directional antenna 130 including receiving or capturing through the directional antenna 130 changes to one or more signal strengths of the one or more signals 80. In some cases, a determination of the changes in signal strengths of signals transmitted by a particular electronic device 20\* may at least infer that the particular electronic device 20\* is either coming nearer or moving away from the wearable computing device 10\*. Such information may be useful in some cases in selecting which nearby electronic devices 20\* should be used by the wearable computing device 10\* in order to obtain a particular functionality when multiple nearby electronic devices 20\* provide the same particular functionality.

In the same or alternative implementations, the signal receiving operation 602 may include or involve an operation 707 for receiving the one or more signals through the directional antenna of the wearable computing device by receiving through the directional antenna of the wearable computing device one or more beacon signals that were transmitted, by the one or more electronic devices, at one or more predefined amounts of transmit power. For instance, the signal capturing module 102\* of the wearable computing device 10\* of FIG. 4A or 4B receiving the one or more signals 80 through the directional antenna 130 of the wearable computing device 10\* by receiving or capturing through the directional antenna 130 of the wearable computing device 10\* one or more beacon signals (e.g., wireless signals that are transmitted continuously, periodically, or randomly with known characteristics) that were transmitted, by the one or more electronic devices 20\*, at one or more predefined amounts of transmit power.

In various implementations, operation 707 may further include or involve an operation 708 for receiving through the directional antenna of the wearable computing device the one or more beacon signals by receiving through the directional antenna multiple beacon signals from multiple directions relative to the directional antenna. For instance, the signal capturing module 102\* of the wearable computing device 10\* of FIG. 4A or 4B receiving through the directional antenna 130 of the wearable computing device 10\* the one or more beacon signals by receiving or capturing through the directional antenna 130 multiple beacon signals from multiple directions relative to the directional antenna 130. In other words, the directional antenna 130 may be steered to scan the surrounding environment (e.g., point the directional antenna 130 at different directions) in order to capture multiple beacon signals that were transmitted by, for example, multiple electronic devices 20\*.

In the same or alternative implementations, operation 707 may additionally or alternatively include or involve an operation 709 for receiving through the directional antenna of the wearable computing device the one or more beacon signals by receiving through the directional antenna multiple beacon signals that have different signal strengths when received by the directional antenna. For instance, the signal capturing module 102\* of the wearable computing device 10\* of FIG. 4A or 4B receiving through the directional antenna 130 of the wearable computing device 10\* the one or more beacon signals by receiving through the directional antenna 130 multiple beacon signals that have different signal strengths when received by the directional antenna 130. In some cases, reception of multiple beacon signals by the wearable computing device 10\* having different signal strengths may indicate that the electronic devices 20\* that transmitted the multiple beacon signals may be located at varying distances from the wearable computing device 10\*.

Figure 7B:
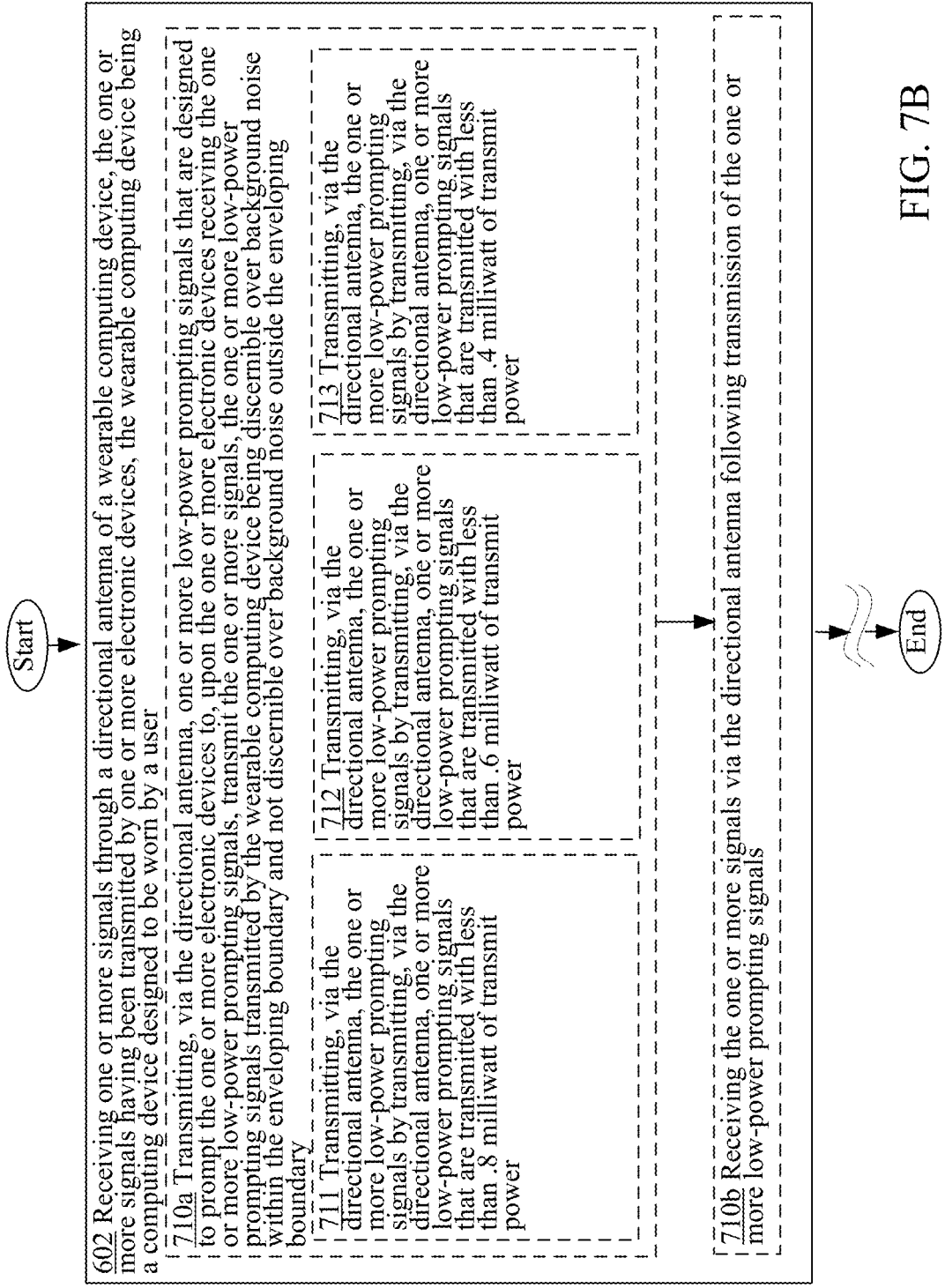
FIG. 7B is a high-level logic flowchart of a process depicting alternate implementations of the signal receiving operation 602 of FIG. 6.

Referring now to FIG. 7B, in various implementations, the signal receiving operation 602 of FIG. 6 may include an operation 710a for transmitting, via the directional antenna, one or more low-power prompting signals that are designed to prompt the one or more electronic devices to, upon the one or more electronic devices receiving the one or more low-power prompting signals, transmit the one or more signals, the one or more low-power prompting signals transmitted by the wearable computing device being discernible over background noise within the enveloping boundary and not discernible over background noise outside the enveloping boundary and an operation 710b for receiving the one or more signals via the directional antenna following transmission of the one or more low-power prompting signals. For instance, the low-power prompting signal broadcasting module 504 (see FIG. 5A) of the wearable computing device 10\* of FIG. 4A or 4B transmitting or broadcasting, via the directional antenna 130, one or more low-power prompting signals 82 (see FIG. 1C) that are designed to prompt the one or more electronic devices 20\* to, upon the one or more electronic devices 20\* receiving the one or more low-power prompting signals 82, transmit the one or more signals 80, the one or more low-power prompting signals 82 (e.g., prompting signals that were transmitted with less than 1 milliwatt of transmit power) transmitted by the wearable computing device 10\* being discernible over background noise within the enveloping boundary 52\* and not discernible over background noise outside the enveloping boundary 52\*, and the subsequent signal capturing module 506 (see FIG. 5A) of the wearable computing device 10\* of FIG. 4A or 4B receiving (e.g., capturing) the one or more signals 80 via the directional antenna 130 following transmission of the one or more low-power prompting signals 82 by the low-power prompting signal broadcasting module 504. In some implementations, the one or more low-power prompting signals 82 that are transmitted by the wearable computing device 10\* may be transmitted as part of a handshaking protocol with an electronic device 20\*.

As further illustrated in FIG. 7B, in various implementations, operation 710a may actually include an operation 711 for transmitting, via the directional antenna, the one or more low-power prompting signals by transmitting, via the directional antenna, one or more low-power prompting signals that are transmitted with less than 0.8 milliwatt of transmit power. For instance, the low-power prompting signal broadcasting module 504 of the wearable computing device 10\* of FIG. 4A or 4B transmitting, via the directional antenna 130, the one or more low-power prompting signals 82 by transmitting, via the directional antenna 130, one or more low-power prompting signals 82 that are transmitted via the directional antenna 130 with less than 0.8 milliwatt of transmit power.

In some implementations, operation 710a may actually include an operation 712 for transmitting, via the directional antenna, the one or more low-power prompting signals by transmitting, via the directional antenna, one or more low-power prompting signals that are transmitted with less than 0.6 milliwatt of transmit power. For instance, the low-power prompting signal broadcasting module 504 of the wearable computing device 10\* of FIG. 4A or 4B transmitting, via the directional antenna 130, the one or more low-power prompting signals 82 by transmitting, via the directional antenna 130, one or more low-power prompting signals 82 that are transmitted with less than 0.6 milliwatt of transmit power.

In some implementations, operation 710a may actually include an operation 713 for transmitting, via the directional antenna, the one or more low-power prompting signals by transmitting, via the directional antenna, one or more low-power prompting signals that are transmitted with less than 0.4 milliwatt of transmit power. For instance, the low-power prompting signal broadcasting module 504 of the wearable computing device 10\* of FIG. 4A or 4B transmitting, via the directional antenna 130, the one or more low-power prompting signals 82 by transmitting, via the directional antenna 130, ne or more low-power prompting signals 82 that are transmitted with less than 0.4 milliwatt of transmit power.

Figure 7C:
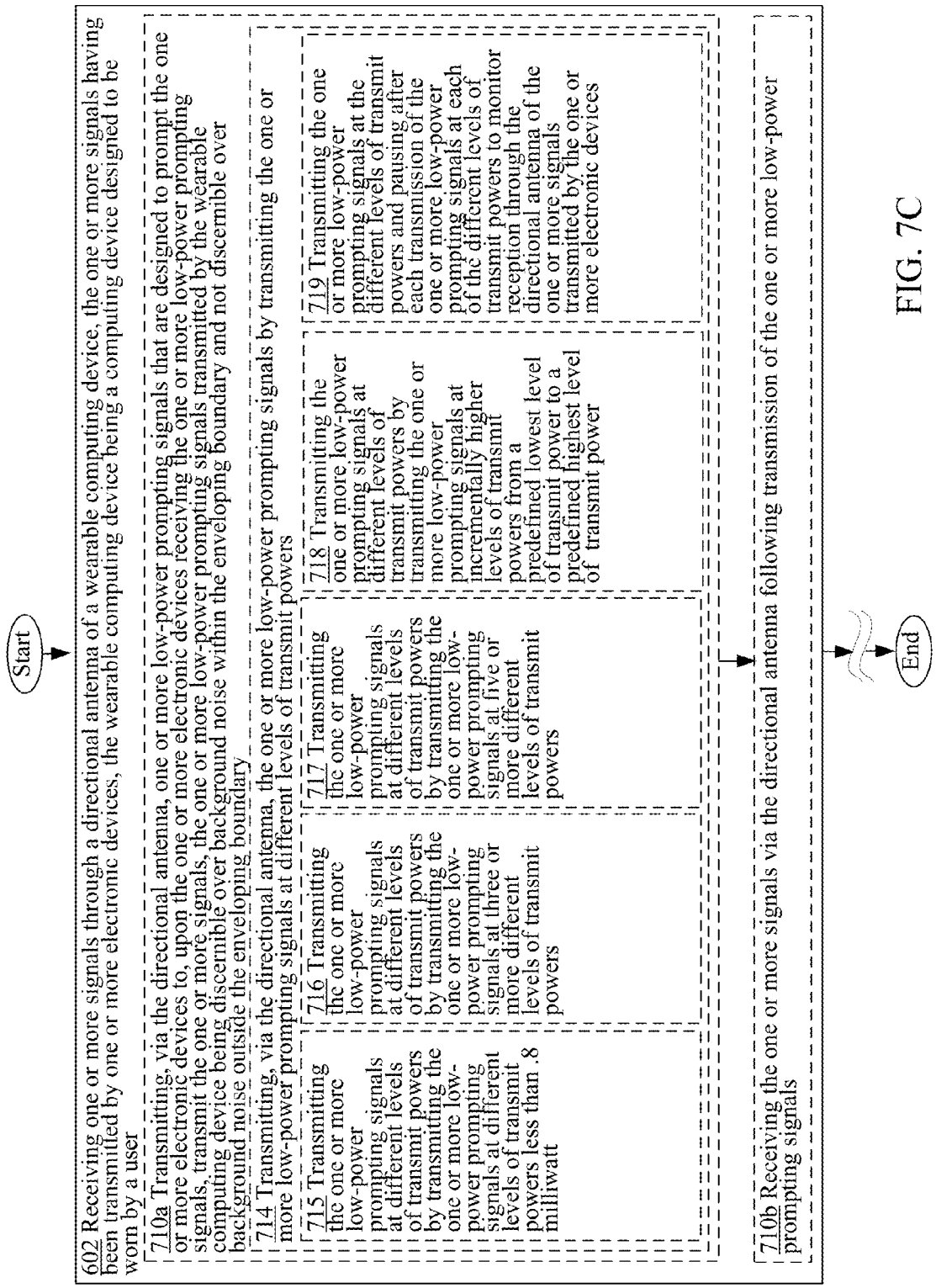
FIG. 7C is a high-level logic flowchart of a process depicting alternate implementations of the signal receiving operation 602 of FIG. 6.

Referring now to FIG. 7C, in various implementations operation 710a may include or involve an operation 714 for transmitting, via the directional antenna, the one or more low-power prompting signals by transmitting the one or more low-power prompting signals at different levels of transmit powers. For instance, the low-power prompting signal broadcasting module 504 including the varying low-power prompting signal broadcasting module 508 (see FIG. 5A) of the wearable computing device 10\* of FIG. 4A or 4B transmitting, via the directional antenna 130, the one or more low-power prompting signals 82 when the varying low-power prompting signal broadcasting module 508 transmits or broadcasts the one or more low-power prompting signals 82 at different levels of transmit powers.

For example, the wearable computing device 10\* initially transmitting, via the directional antenna 130, the one or more low-power prompting signals 82 using 0.1 milliwatt of transmit power, then pausing to monitor for reception of one or more responsive signals at the directional antenna 130 that was generated by one or more electronic devices 20\* in response to the one or more electronic devices 20\* receiving/detecting the one or more low-power prompting signals 82 that were transmitted with 0.1 milliwatt of transmit power. The wearable computing device 10\* then transmitting, via the directional antenna 130, the one or more low-power prompting signals 82 using 0.2 milliwatt of transmit power, then pausing to again monitor for reception of one or more responsive signals at the directional antenna 130 that was generated by one or more electronic devices 20\* in response to the one or more electronic devices 20\* receiving/detecting the one or more low-power prompting signals 82 that were transmitted with 0.2 milliwatt of transmit power. This process may be repeated over and over again by transmitting the one or more low-power prompting signals 82 at incrementally higher transmit powers and pausing between each transmission of the one or more low-power prompting signals 82 at each level of transmit power in order to monitor for responsive signals transmitted by one or more electronic devices 20\* in response to the one or more electronic devices 20\* detecting the one or more low-power prompting signals 82. The process may be repeated at least until some maximum transmit power is reached such as 0.8 milliwatt of transmit power. In some embodiments, such processes may facilitate in determining which electronic device 20\* is nearest to the wearable computing device 10\* or require the least amount of power to communicate with by the wearable computing device 10\*.

As further illustrated in FIG. 7C, operation 714 may further include one or more additional operations in various alternative implementations including, in some implementations, an operation 715 for transmitting the one or more low-power prompting signals at different levels of transmit powers by transmitting the one or more low-power prompting signals at different levels of transmit powers less than 0.8 milliwatt. For instance, the varying low-power prompting signal broadcasting module 508 of the wearable computing device 10\* of FIG. 4A or 4B transmitting the one or more low-power prompting signals 82 at different levels of transmit powers by transmitting (e.g., broadcasting) the one or more low-power prompting signals 82 at different levels of transmit powers less than 0.8 milliwatt.

In some implementations, operation 714 may include or involve an operation 716 for transmitting the one or more low-power prompting signals at different levels of transmit powers by transmitting the one or more low-power prompting signals at three or more different levels of transmit powers. For instance, the varying low-power prompting signal broadcasting module 508 of the wearable computing device 10\* of FIG. 4A or 4B transmitting the one or more low-power prompting signals 82 at different levels of transmit powers by transmitting the one or more low-power prompting signals 82 at three or more different levels of transmit powers (e.g., transmitting with 0.1 milliwatt of transmit power, 0.2 milliwatt of transmit power, and 0.3 milliwatt of transmit power).

In some implementations, operation 714 may include or involve an operation 717 for transmitting the one or more low-power prompting signals at different levels of transmit powers by transmitting the one or more low-power prompting signals at five or more different levels of transmit powers. For instance, the varying low-power prompting signal broadcasting module 508 of the wearable computing device 10\* of FIG. 4A or 4B transmitting the one or more low-power prompting signals 82 at different levels of transmit powers by transmitting the one or more low-power prompting signals 82 at five or more different levels of transmit powers.

In some implementations, operation 714 may include or involve an operation 718 for transmitting the one or more low-power prompting signals at different levels of transmit powers by transmitting the one or more low-power prompting signals at incrementally higher levels of transmit powers from a predefined lowest level of transmit power to a predefined highest level of transmit power. For instance, the varying low-power prompting signal broadcasting module 508 of the wearable computing device 10\* of FIG. 4A or 4B transmitting the one or more low-power prompting signals 82 at different levels of transmit powers by transmitting the one or more low-power prompting signals 82 at incrementally higher levels of transmit powers from a predefined lowest level of transmit power to a predefined highest level of transmit power. For example, the wearable computing device 10\* transmitting the one or more low-power prompting signals 82 with 0.1 milliwatt of transmit power, 0.2 milliwatt of transmit power, and 0.3 milliwatt of transmit power, and so forth, up to 1.0 milliwatt of transmit power.

In some implementations, operation 714 may include or involve an operation 719 for transmitting the one or more low-power prompting signals at the different levels of transmit powers and pausing after each transmission of the one or more low-power prompting signals at each of the different levels of transmit powers to monitor reception through the directional antenna of the one or more signals transmitted by the one or more electronic devices. For instance, the varying low-power prompting signal broadcasting module 508 of the wearable computing device 10\* of FIG. 4A or 4B transmitting the one or more low-power prompting signals 82 at the different levels of transmit powers and pausing for a predefined increment of time after each transmission of the one or more low-power prompting signals 82 at each of the different levels of transmit powers so that the subsequent signal capturing module 506 can monitor reception through the directional antenna 130 of the one or more signals 80 (e.g., responsive signals transmitted by the one or more electronic devices 20\* receiving/detecting the one or more low-power prompting signals 82) transmitted by the one or more electronic devices 20\*.

Figure 7D:
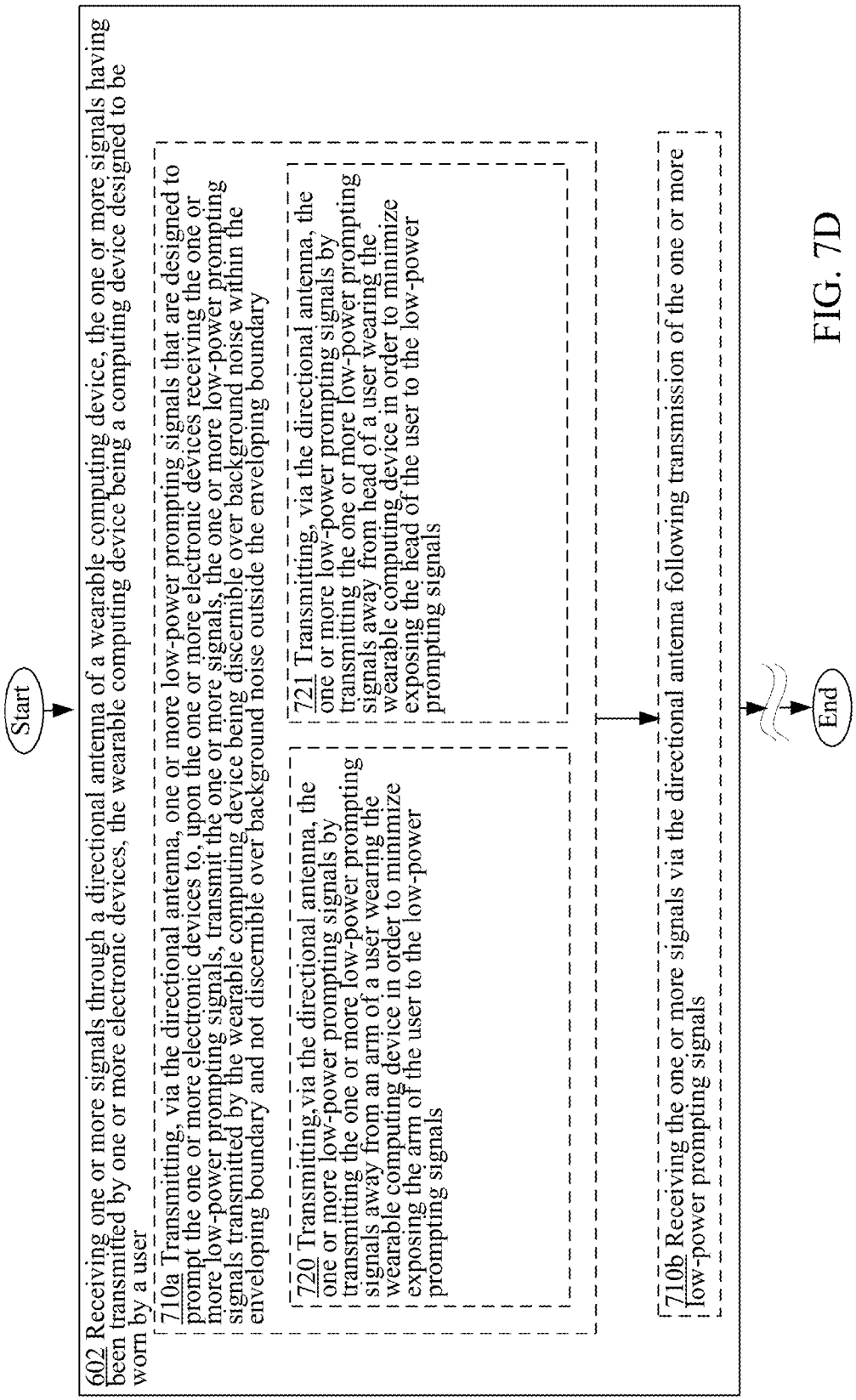
FIG. 7D is a high-level logic flowchart of a process depicting alternate implementations of the signal receiving operation 602 of FIG. 6.

Turning now to FIG. 7D, in some implementations, operation 710a for transmitting, via the directional antenna, one or more low-power prompting signals that are designed to prompt the one or more electronic devices to, upon the one or more electronic devices receiving the one or more low-power prompting signals, transmit the one or more signals, the one or more low-power prompting signals transmitted by the wearable computing device being discernible over background noise within the enveloping boundary and not discernible over background noise outside the enveloping boundary may include an operation 720 for transmitting, via the directional antenna, the one or more low-power prompting signals by transmitting the one or more low-power prompting signals away from an arm of a user wearing the wearable computing device in order to minimize exposing the arm of the user to the low-power prompting signals. For instance, the low-power prompting signal broadcasting module 504 of the wearable computing device 10* of FIG. 4A or 4B transmitting, via the directional antenna 130, the one or more low-power prompting signals 82 by transmitting or broadcasting the one or more low-power prompting signals 82 away from an arm of a user wearing the wearable computing device 10* in order to minimize exposing the arm of the user to the low-power prompting signals 82.

In some alternative implementations, operation 710a may alternatively include an operation 721 for transmitting, via the directional antenna, the one or more low-power prompting signals by transmitting the one or more low-power prompting signals away from head of a user wearing the wearable computing device in order to minimize exposing the head of the user to the low-power prompting signals. For instance, the low-power prompting signal broadcasting module 504 of the wearable computing device 10* of FIG. 4A or 4B transmitting, via the directional antenna 130, the one or more low-power prompting signals 82 by transmitting or broadcasting the one or more low-power prompting signals 82 away from head of a user wearing the wearable computing device 10* in order to minimize exposing the head of the user to the low-power prompting signals 82.

Figure 7E:
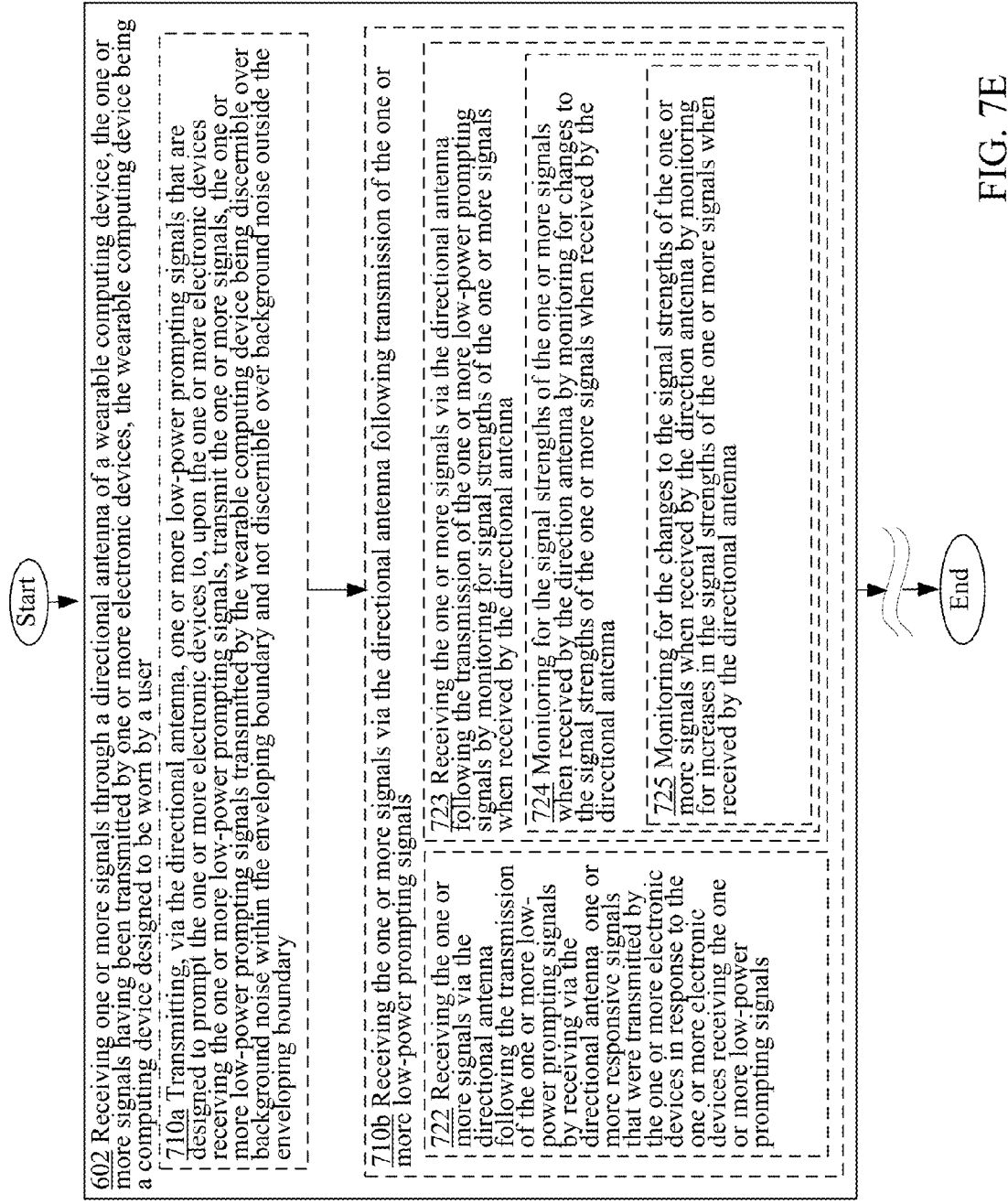
FIG. 7E is a high-level logic flowchart of a process depicting alternate implementations of the signal receiving operation 602 of FIG. 6.

Turning now to FIG. 7E, operation 710b for receiving the one or more signals via the directional antenna following transmission of the one or more low-power prompting signals may include or involve one or more additional operations in various alternative implementations, including, in some cases, an operation 722 for receiving the one or more signals via the directional antenna following the transmission of the one or more low-power prompting signals by receiving via the directional antenna one or more responsive signals that were transmitted by the one or more electronic devices in response to the one or more electronic devices receiving the one or more low-power prompting signals. For instance, the subsequent signal capturing module 506 of the wearable computing device 10* of FIG. 4A or 4B receiving the one or more signals 80 via the directional antenna 130 following the transmission of the one or more low-power prompting signals 82 by receiving via the directional antenna 130 one or more responsive signals (e.g., one or more signals 80) that were transmitted by the one or more electronic devices 20* in response to the one or more electronic devices 20* receiving the one or more low-power prompting signals 82.

In the same or alternative implementations, operation 710b may include or involve an operation 723 for receiving the one or more signals via the directional antenna following the transmission of the one or more low-power prompting signals by monitoring for signal strengths of the one or more signals when received by the directional antenna. For instance, the subsequent signal capturing module 506 including the signal strength detecting module 510 (see FIG. 5A) of the wearable computing device 10* of FIG. 4A or 4B receiving the one or more signals 80 via the directional antenna 130 following the transmission of the one or more low-power prompting signals 82 by having the signal strength detecting module 510 monitor or detect for signal strengths of the one or more signals 80 when received or captured by the directional antenna 130.

As further illustrated in FIG. E, operation 723 may, in various implementations, further include an operation 724 for monitoring for the signal strengths of the one or more signals when received by the directional antenna by monitoring for changes to the signal strengths of the one or more signals when received by the directional antenna. For instance, the signal strength detecting module 510 including the signal strength change detecting module 512 (see FIG. 5A) of the wearable computing device 10* of FIG. 4A or 4B monitoring for the signal strengths of the one or more signals 80 when received by the directional antenna 130 by having the signal strength change detecting module 512 monitor or detect for changes to the signal strengths of the one or more signals 80 when received or captured by the directional antenna 130.

In some cases, operation 724 may, in turn, further include an operation 725 for monitoring for the changes to the signal strengths of the one or more signals when received by the directional antenna by monitoring for increases in the signal strengths of the one or more signals when received by the directional antenna. For instance the signal strength change detecting module 512 of the wearable computing device 10* of FIG. 4A or 4B monitoring for the changes to the signal strengths of the one or more signals 80 when received by the directional antenna 130 by monitoring or detecting for increases in the signal strengths of the one or more signals 80 when received by the directional antenna 130 (e.g., detecting increase in the detected signal strength of the one or more signals 80 over a period of time). In some cases, an inference may be made that those electronic devices 20* that provide one or more signals 80* with increasing higher signal strengths, as detected by the wearable computing device 10*, may be coming nearer to the wearable computing device 10* and therefore, may be the preferred devices for providing one or more functionalities (e.g., a functionality to communicate beyond the spatial pod 50 of the wearable computing device 10* or to obtain GPS data) to the wearable computing device 10*.

Figure 7F:
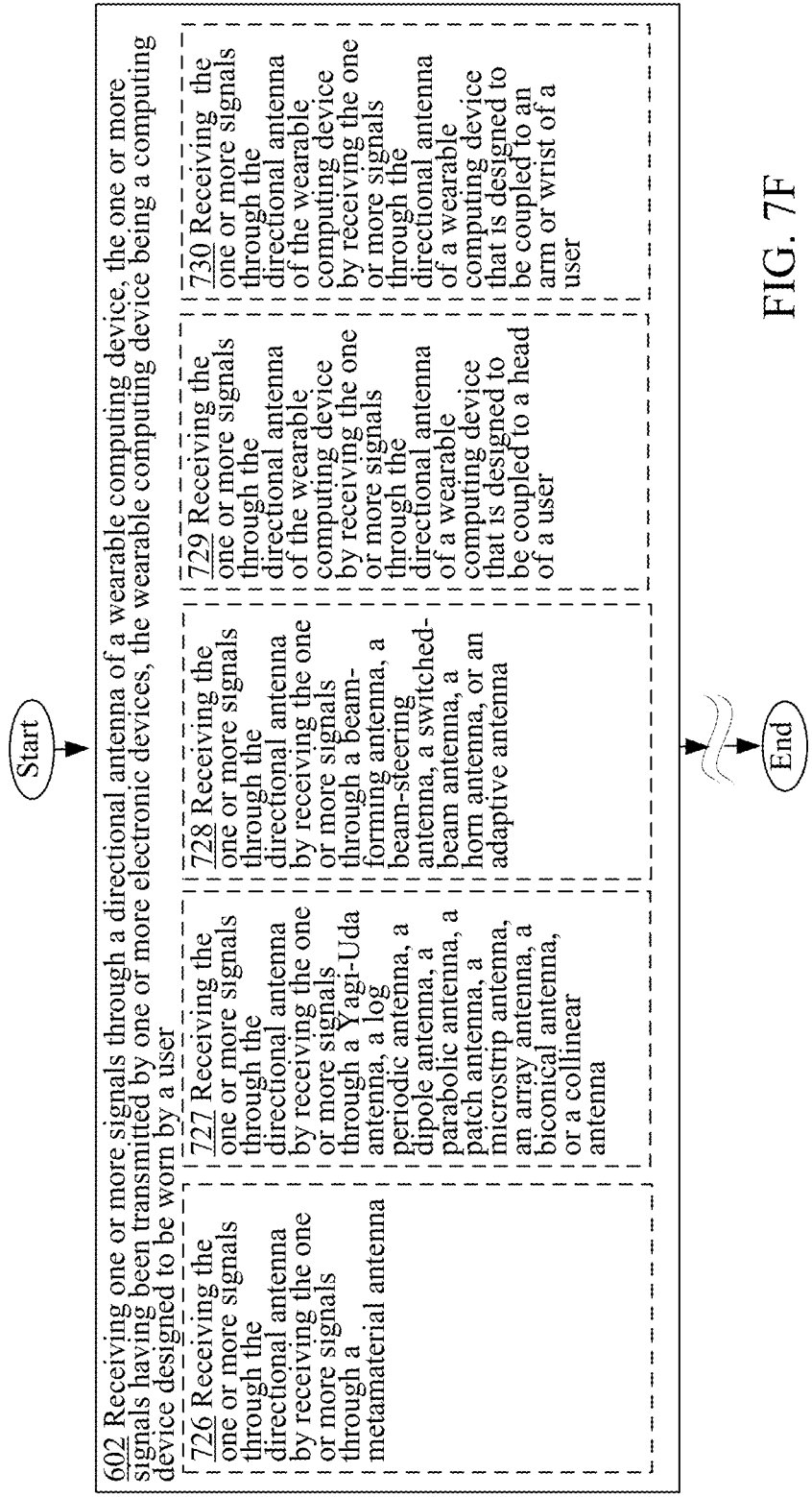
FIG. 7F is a high-level logic flowchart of a process depicting alternate implementations of the signal receiving operation 602 of FIG. 6.

A variety of directional antennas 130 may be employed by the wearable computing device 10* in various alternative implementations. For example, in some implementations, the signal receiving operation 602 may include or involve an operation 726 for receiving the one or more signals through the directional antenna by receiving the one or more signals through a metamaterial antenna as illustrated in FIG. 7F. For instance, the signal capturing module 102* of the wearable computing device 10* of FIG. 4A or 4B receiving the one or more signals 80 through the directional antenna 130 by receiving or capturing the one or more signals 80 through a metamaterial antenna.

In some implementations, the signal receiving operation 602 may include or involve an operation 727 for receiving the one or more signals through the directional antenna by receiving the one or more signals through a Yagi-Uda antenna, a log periodic antenna, a dipole antenna, a parabolic antenna, a patch antenna, a microstrip antenna, an array antenna, a biconical antenna, or a collinear antenna. For instance, the signal capturing module 102* of the wearable computing device 10* of FIG. 4A or 4B receiving the one or more signals 80 through the directional antenna 130 by receiving the one or more signals 80 through a Yagi-Uda antenna, a log periodic antenna, a dipole antenna, a parabolic antenna, a patch antenna, a microstrip antenna, an array antenna, a biconical antenna, or a collinear antenna.

In some implementations, the signal receiving operation 602 may include or involve an operation 728 for receiving the one or more signals through the directional antenna by receiving the one or more signals through a beam-forming antenna, a beam-steering antenna, a switched-beam antenna, a horn antenna, or an adaptive antenna. For instance, the signal capturing module 102* of the wearable computing device 10* of FIG. 4A or 4B receiving the one or more signals 80 through the directional antenna 130 by receiving the one or more signals 80 through a beam-forming antenna, a beam-steering antenna, a switched-beam antenna, a horn antenna, or an adaptive antenna.

As described previously the wearable computing device 10* illustrated, for example, in FIGS. 1A to 1D may be in the form of a pair of glasses or goggles or in the form of a wristwatch as illustrated in, for example, FIG. 2A or 2B. Thus, in various implementations, the signal receiving operation 602 may include an operation 729 for receiving the one or more signals through the directional antenna of the wearable computing device by receiving the one or more signals through the directional antenna of a wearable computing device that is designed to be coupled to a head of a user as further illustrated in FIG. 7F. For instance, the signal capturing module 102* of the wearable computing device 10* of FIG. 4A or 4B receiving the one or more signals 80 through the directional antenna 130 of the wearable computing device 10* by receiving the one or more signals 80 through the directional antenna 130 of a wearable computing device 10* that is designed to be coupled to (worn on) a head of a user (see, for example, the computing glasses 12 of FIG. 2A).

In some alternative implementations, the signal receiving operation 602 may alternatively include or involve an operation 730 for receiving the one or more signals through the directional antenna of the wearable computing device by receiving the one or more signals through the directional antenna of a wearable computing device that is designed to be coupled to an arm or wrist of a user. For instance, the signal capturing module 102* of the wearable computing device 10* of FIG. 4A or 4B receiving the one or more signals 80 through the directional antenna 130 of the wearable computing device 10* by receiving the one or more signals 80 through the directional antenna 130 of a wearable computing device 10* (e.g., see, for example, the computing watch 14 of FIG. 2B) that is designed to be coupled to (worn on) an arm or wrist of a user.

Referring back to the nearby determining operation 604 of FIG. 6, the nearby determining operation 604 similar to the signal receiving operation 602 of FIG. 6 may be executed in a number of different ways in various alternative embodiments as illustrated, for example, in FIGS. 8A, 8B, 8C, 8D, 8E, 8F, and 8G. In some implementations, for example, the nearby determining operation 604 may include an operation 831 for determining that the one or more electronic devices are within the spatial pod of the wearable computing device based, at least in part, on a determination that the one or more signals received by the wearable computing device are one or more responsive signals that were transmitted by the one or more electronic devices in response to the one or more electronic devices receiving one or more low-power prompting signals transmitted from the wearable computing device, the one or more low-power prompting signals that were transmitted by the wearable computing device being discernible over background noise within the enveloping boundary and not discernible over background noise outside the enveloping boundary. For instance, the nearby ascertaining module 104* including the responsive signal ascertaining module 514 (see FIG. 5B) of the wearable computing device 10* of FIG. 4A or 4B determining that the one or more electronic devices 20* are within the spatial pod 50* of the wearable computing device 10* based, at least in part, on the responsive signal ascertaining module 514 determining that the one or more signals 80 received by the wearable computing device 10* are one or more responsive signals that were transmitted by the one or more electronic devices 20* in response to the one or more electronic devices 20* receiving one or more low-power prompting signals 82 transmitted or broadcasted from the wearable computing device 10*, the one or more low-power prompting signals 82 that were transmitted or broadcasted by the wearable computing device 10* being discernible over background noise within the enveloping boundary 52* and not discernible over background noise outside the enveloping boundary 52*. A variety of approaches may be employed in various alternative implementations in order to make the determination that the one or more received signals 80 are one or more responsive signals that were transmitted by the one or more electronic devices 20* in response to the one or more electronic devices 20* receiving the one or more low-power prompting signals 82.

For example, in some implementations, operation 831 may include an operation 832 for determining that the one or more electronic devices are within the spatial pod of the wearable computing device based, at least in part, on a determination that the one or more signals received by the wearable computing device include one or more indicators that indicate that the one or more received signals are one or more responsive signals that were transmitted by the one or more electronic devices in response to the one or more electronic devices receiving the one or more low-power prompting signals from the wearable computing device. For instance, the nearby ascertaining module 104* including the responsive signal ascertaining module 514 (see FIG. 5B) of the wearable computing device 10* of FIG. 4A or 4B determining that the one or more electronic devices 20* are within the spatial pod 50* of the wearable computing device 10* based, at least in part, on the responsive signal ascertaining module 514 determining or ascertaining that the one or more signals 80 received or captured by the wearable computing device 10* include one or more indicators that indicate that the one or more received signals 80 are one or more responsive signals that were transmitted by the one or more electronic devices 20* in response to the one or more electronic devices 20* receiving the one or more low-power prompting signals 82 from the wearable computing device 10*.

In some implementations, operation 831 may include an operation 833 for determining that the one or more electronic devices are within the spatial pod of the wearable computing device based, at least in part, on a determination that the one or more signals received by the wearable computing device are one or more responsive signals that were transmitted by the one or more electronic devices in response to the one or more electronic devices receiving one or more low-power prompting signals from the wearable computing device that were transmitted by the wearable computing device with less than 0.8 milliwatt of transmit power via the directional antenna. For instance, the nearby ascertaining module 104* including the responsive signal ascertaining module 514 (see FIG. 5B) of the wearable computing device 10* of FIG. 4A or 4B determining that the one or more electronic devices 20* are within the spatial pod 50* of the wearable computing device 10* based, at least in part, on the responsive signal ascertaining module 514 determining or ascertaining that the one or more signals 80 received by the wearable computing device 10* are one or more responsive signals that were transmitted by the one or more electronic devices 20* in response to the one or more electronic devices 20* receiving one or more low-power prompting signals 82 from the wearable computing device 10* that were transmitted or broadcasted by, for example, the low-power prompting signal broadcasting module 504 of the wearable computing device 10* with less than 0.8 milliwatt of transmit power via the directional antenna 130.

In some alternative implementations, operation 831 may include an operation 834 for determining that the one or more electronic devices are within the spatial pod of the wearable computing device based, at least in part, on a determination that the one or more signals received by the wearable computing device are one or more responsive signals that were transmitted by the one or more electronic devices in response to the one or more electronic devices receiving one or more low-power prompting signals from the wearable computing device that were transmitted by the wearable computing device with 0.5 milliwatt or less of transmit power via the directional antenna. For instance, the nearby ascertaining module 104* including the responsive signal ascertaining module 514 (see FIG. 5B) of the wearable computing device 10* of FIG. 4A or 4B determining that the one or more electronic devices 20* are within the spatial pod 50* of the wearable computing device 10* based, at least in part, on a determination or ascertaining by the responsive signal ascertaining module 514 that the one or more signals 80 received or captured by the wearable computing device 10* are one or more responsive signals that were transmitted by the one or more electronic devices 20* in response to the one or more electronic devices 20* receiving one or more low-power prompting signals 82 from the wearable computing device 10* that were transmitted or broadcasted by, for example, the low-power prompting signal broadcasting module 504 of the wearable computing device 10* with 0.5 milliwatt or less of transmit power via the directional antenna 130.

Turning now to FIG. 8B, in some implementations, the nearby determining operation 604 of FIG. 8 may include an operation 835 for determining that the one or more electronic devices are within the spatial pod of the wearable computing device based, at least in part, on a determination that the one or more signals received by the wearable computing device are one or more received beacon signals that were received at the directional antenna having one or more signal strengths greater than a predefined amount of signal strength, the one or more received beacon signals having been transmitted by the one or more electronic devices with one or more predefined amounts of transmit powers. For instance, the nearby ascertaining module 104* including the beacon signal ascertaining module 516 of the wearable computing device 10* of FIG. 4A or 4B determining or ascertaining that the one or more electronic devices 20* are within the spatial pod 50* of the wearable computing device 10* based, at least in part, on a the beacon signal ascertaining module 516 determining or ascertaining that the one or more signals 80 received or captured by the wearable computing device 10* are one or more received beacon signals that were received at the directional antenna 130 and that were determined to have one or more signal strengths greater than a predefined amount of signal strength, the one or more received or captured beacon signals (e.g., one or more received signals 80) having been transmitted by the one or more electronic devices 20* with one or more predefined amounts of transmit powers (0.8 milliwatt of transmit power).

As further illustrated in FIG. 8B, operation 835 may further include one or more additional operations including, in some cases, an operation 836 for determining that the one or more electronic devices are within the spatial pod of the wearable computing device by determining that a plurality of electronic devices are within the spatial pod of the wearable computing device based, at least in part, on a determination that a plurality of signals that were received through the directional antenna are a plurality of received beacon signals that have one or more signal strengths greater than the predefined amount of signal strength, the plurality of received beacon signals having been transmitted by the plurality of electronic devices with one or more predefined amounts of transmit powers. For instance, the nearby ascertaining module 104* including the beacon signal ascertaining module 516 of the wearable computing device 10* of FIG. 4A or 4B determining or ascertaining that the one or more electronic devices 20* are within the spatial pod 50* of the wearable computing device 10* by determining or ascertaining that a plurality of electronic devices 20* are within the spatial pod 50* of the wearable computing device 10* based, at least in part, on a determination by the beacon signal ascertaining module 516 that a plurality of signals 80 that were received or captured through the directional antenna 130 are a plurality of received beacon signals that were determined to have one or more signal strengths greater than the predefined amount of signal strength, the plurality of received or captured beacon signals having been transmitted by the plurality of electronic devices 20* with one or more predefined amounts of transmit powers. Note that in various embodiments, a determination may be made that one or more electronic devices 20* that transmitted one or more particular beacon signals are outside the spatial pod 50* of the wearable computing device 10* when the one or more particular beacon signals that are received and detected by the wearable computing device 10* are determined to have signal strengths that are less than the predefined minimum amount of signal strength (e.g., weak beacon signals may at least suggest that the electronic devices 20* that transmitted the beacon signals are relatively far away from the wearable computing device 10*—at least located outside the spatial pod 50* of the wearable computing device 10*).

In some cases, operation 836 may, in turn, further include an operation 837 for determining that the plurality of electronic devices are within the spatial pod of the wearable computing device based, at least in part, on a determination that the plurality of signals that were received through the directional antenna are a plurality of received beacon signals that have varying signal strengths greater than the predefined amount of signal strength, the plurality of received beacon signals having been transmitted by the plurality of electronic devices with one or more predefined amounts of transmit powers. For instance, the nearby ascertaining module 104* including the beacon signal ascertaining module 516 of the wearable computing device 10* of FIG. 4A or 4B determining or ascertaining that the plurality of electronic devices 20* are within the spatial pod 50* of the wearable computing device 10* based, at least in part, on a the beacon signal ascertaining module 516 determining or ascertaining that the plurality of signals 80 that were received or captured through the directional antenna 130 are a plurality of received or captured beacon signals that were determined to have varying signal strengths greater than the predefined amount of signal strength, the plurality of received or captured beacon signals having been transmitted by the plurality of electronic devices 20* with one or more predefined amounts of transmit powers.

In some cases, operation 837 may further include an operation 838 for determining which of the plurality of electronic devices are nearest to the wearable computing device based, at least in part, on signal strengths of the plurality of received beacon signals that were received through the directional antenna and that were transmitted by the plurality of electronic devices. For instance, the nearby device ascertaining module 518 of the wearable computing device 10* of FIG. 4A or 4B determining or ascertaining which of the plurality of electronic devices 20* are nearest to the wearable computing device 10* based, at least in part, on the determined signal strengths of the plurality of received or captured beacon signals (e.g., one or more received signals 80) that were received or captured through the directional antenna 130 and that were transmitted by the plurality of electronic devices 20*.

Figure 8A:
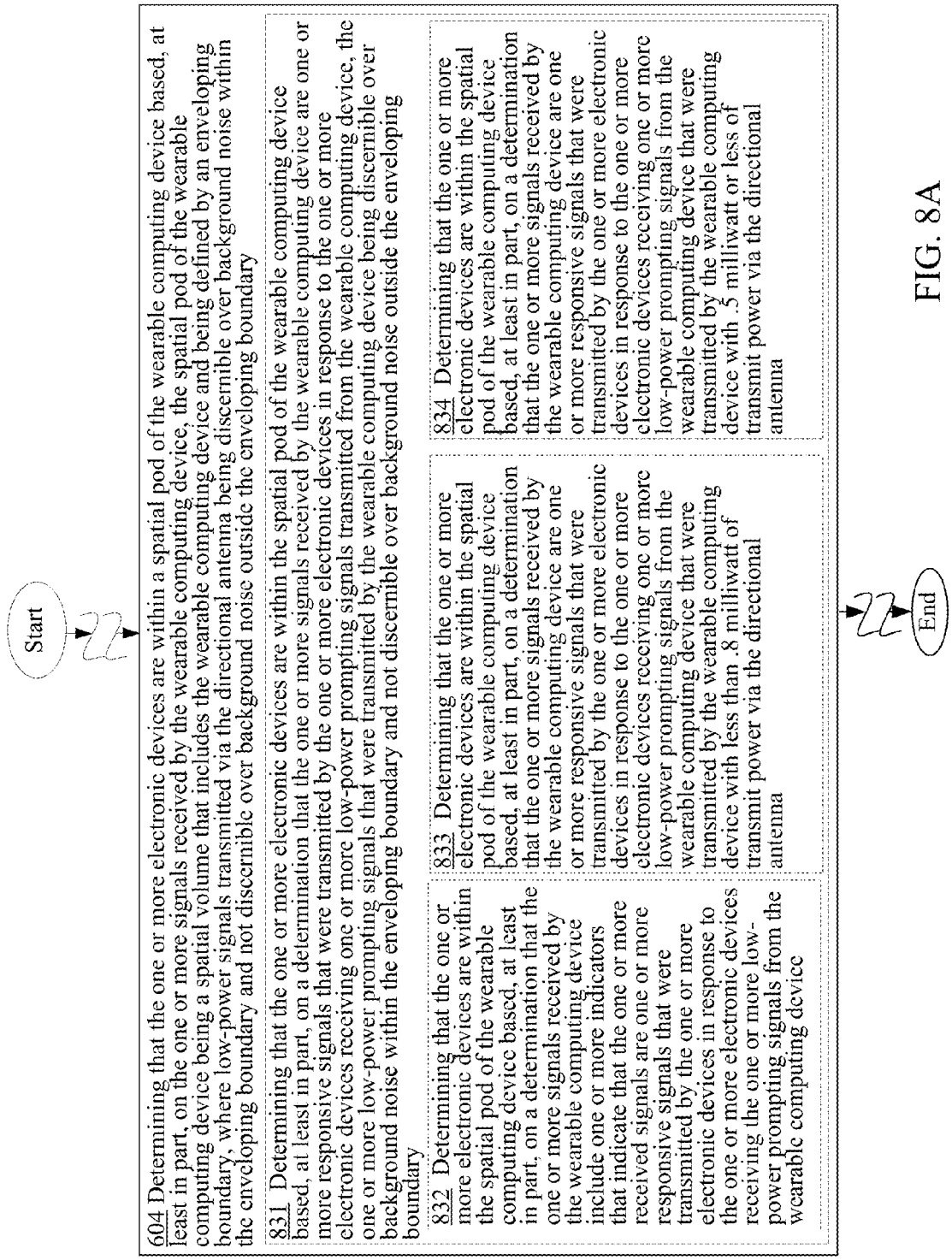
FIG. 8A is a high-level logic flowchart of a process depicting alternate implementations of the nearby determining operation 604 of FIG. 6.
Figure 8C:
FIG. 8C is a high-level logic flowchart of a process depicting alternate implementations of the nearby determining operation 604 of FIG. 6.

Referring now to FIG. 8C, in various implementations, the nearby determining operation 604 may include an operation 839 for determining that the one or more electronic devices are within the spatial pod of the wearable computing device based, at least in part, on the one or more signals received by the wearable computing device, the spatial pod of the wearable computing device being a spatial volume that includes the wearable computing device and being defined by an enveloping boundary, where low-power signals that are transmitted via the directional antenna with less than 0.8 milliwatt of transmit power being discernible over background noise within the enveloping boundary and not discernible over background noise outside the enveloping boundary. For instance, the nearby ascertaining module 104* of the wearable computing device 10* of FIG. 4A or 4B determining or ascertaining that the one or more electronic devices 20* are within the spatial pod 50* of the wearable computing device 10* based, at least in part, on the one or more signals 80 received or captured by the wearable computing device 10*, the spatial pod 50* of the wearable computing device 10* being a spatial volume that includes the wearable computing device 10* and being defined by an enveloping boundary 52*, where low-power signals 70*(see FIG. 1B) that are transmitted or broadcasted via the directional antenna 130 with less than 0.8 milliwatt of transmit power being discernible over background noise within the enveloping boundary 52* and not discernible over background noise outside the enveloping boundary 52*.

In some implementations, the nearby determining operation 604 may include an operation 840 for determining that the one or more electronic devices are within the spatial pod of the wearable computing device based, at least in part, on the one or more signals received by the wearable computing device, the spatial pod of the wearable computing device being a spatial volume that includes the wearable computing device and being defined by an enveloping boundary, where low-power signals that are transmitted via the directional antenna with 0.5 milliwatt or less of transmit power being discernible over background noise within the enveloping boundary and not discernible over background noise outside the enveloping boundary as illustrated, for example, in FIG. 8C. For instance, the nearby ascertaining module 104* of the wearable computing device 10* of FIG. 4A or 4B determining that the one or more electronic devices 20* are within the spatial pod 50* of the wearable computing device 10* based, at least in part, on the one or more signals 80 received or captured by the wearable computing device 10*, the spatial pod 50* of the wearable computing device 10* being a spatial volume that includes the wearable computing device 10* and being defined by an enveloping boundary 52*, where low-power signals 70*(see FIG. 1B) that are transmitted or broadcasted via the directional antenna 130 with 0.5 milliwatt or less of transmit power being discernible over background noise within the enveloping boundary 52* and not discernible over background noise outside the enveloping boundary 52*.

Referring now to FIGS. 8D, 8E, 8F, and 8G, in various implementations, the nearby determining operation 604 may include an operation 841 for determining that the one or more electronic devices are within the spatial pod of the wearable computing device including determining that the one or more electronic devices provide the one or more functionalities. For instance, the nearby ascertaining module 104* including the endowed functionality ascertaining module 520 (see FIG. 5B) of the wearable computing device 10* of FIG. 4A or 4B determining that the one or more electronic devices 20* are within the spatial pod 50* of the wearable computing device 10* including determining, by the endowed functionality ascertaining module 520, that the one or more electronic devices 20* provide the one or more functionalities (e.g., communication functionality to communicate beyond or outside the spatial pod 50* of the wearable computing device 10*, sensor functionalities including GPS functionalities or visual and/or audio capturing functionalities, and so forth).

As further illustrated in FIGS. 8D, 8E, 8F, and 8G, operation 841 may further include an operation 842 for determining that the one or more electronic devices provide the one or more functionalities by querying each of the one or more electronic devices to determine whether the one or more electronic devices provide the one or more functionalities in various alternative implementations. For instance, the endowed functionality ascertaining module 520 including the functionality querying module 522 (see FIG. 5B) of the wearable computing device 10* of FIG. 4A or 4B determining that the one or more electronic devices 20* provide the one or more functionalities when the functionality querying module 522 queries each of the one or more electronic devices 20* to determine whether the one or more electronic devices 20* provide the one or more functionalities.

FIGS. 8D, 8E, 8F, and 8G also shows that operation 842 may further include an operation 843a for transmitting through the directional antenna and to the one or more electronic devices one or more queries to obtain one or more confirmations that the one or more electronic devices provide the one or more functionalities, the one or more queries being transmitted via one or more low-power query signals, the one or more low-power query signals that are transmitted through the directional antenna being discernible over background noise within the enveloping boundary of the spatial pod and not discernible over background noise outside the enveloping boundary and an operation 843b for receiving, through the directional antenna, one or more confirmations via one or more confirmation signals that are received from the one or more electronic devices confirming that the one or more electronic devices provide the one or more functionalities. For instance, the query communicating module 524 (see FIG. 5B) of the wearable computing device 10* of FIG. 4A or 4B transmitting or communicating through the directional antenna 130 and to the one or more electronic devices 20* one or more queries to obtain one or more confirmations that the one or more electronic devices 20* provide the one or more functionalities, the one or more queries being transmitted or communicated via one or more low-power query signals 84 (see FIG. 1C), the one or more low-power query signals 84 that are transmitted or communicated through the directional antenna 130 being discernible over background noise within the enveloping boundary 52* of the spatial pod 50* and not discernible over background noise outside the enveloping boundary 52*; and the confirmation obtaining module 526 of the wearable computing device 10* of FIG. 4A or 4B receiving, or obtaining through the directional antenna 130, one or more confirmations via one or more confirmation signals 85 that are received from the one or more electronic devices 20* confirming that the one or more electronic devices 20* provide the one or more functionalities (e.g., communication functionalities beyond the spatial pod 50* of the wearable computing device 10*, GPS functionalities, and so forth).

In some cases, operation 843a may include or involve an operation 844 for transmitting through the directional antenna and to the one or more electronic devices the one or more queries to obtain one or more confirmations that the one or more electronic devices provide the one or more functionalities by transmitting through the directional antenna and to the one or more electronic devices one or more queries to obtain one or more confirmations that the one or more electronic devices provide one or more communication links to beyond the spatial pod as illustrated in FIG. 8D. For instance, the query communicating module 524 of the wearable computing device 10* of FIG. 4A or 4B transmitting through the directional antenna 130 and to the one or more electronic devices 20* the one or more queries to obtain one or more confirmations that the one or more electronic devices 20* provide the one or more functionalities by transmitting or communicating through the directional antenna 130 and to the one or more electronic devices 20* one or more queries (e.g., one or more low-power query signals 84) to obtain, via the confirmation obtaining module 526, one or more confirmations (e.g., one or more confirmation signals 85) that the one or more electronic devices 20* provide one or more communication links to beyond (outside) the spatial pod 50*.

Figure 8E:
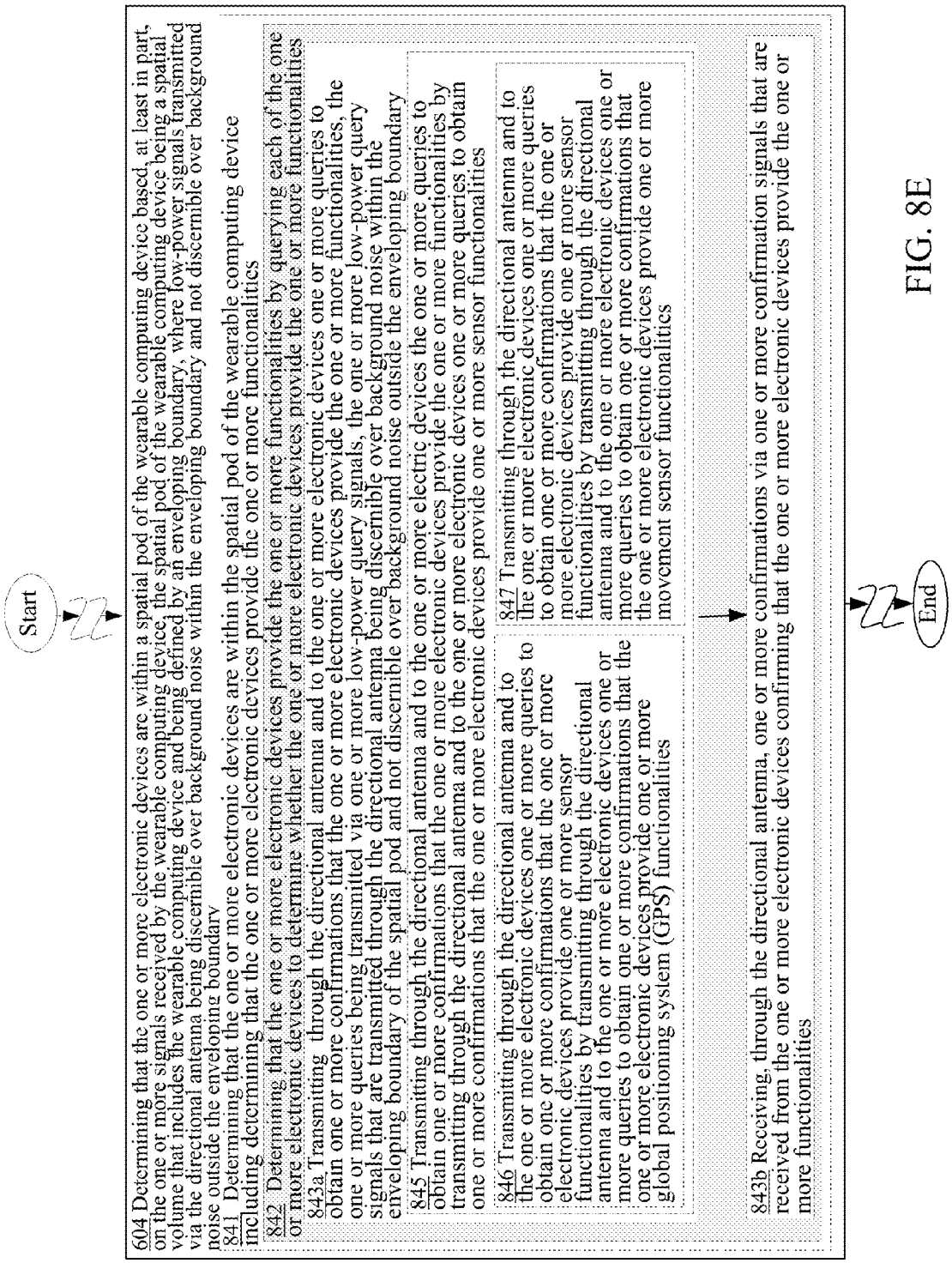
FIG. 8E is a high-level logic flowchart of a process depicting alternate implementations of the nearby determining operation 604 of FIG. 6.

In the same or alternative implementations, operation 843a may additionally or alternatively include or involve an operation 845 for transmitting through the directional antenna and to the one or more electronic devices the one or more queries to obtain one or more confirmations that the one or more electronic devices provide the one or more functionalities by transmitting through the directional antenna and to the one or more electronic devices one or more queries to obtain one or more confirmations that the one or more electronic devices provide one or more sensor functionalities as illustrated in FIG. 8E. For instance, the query communicating module 524 of the wearable computing device 10* of FIG. 4A or 4B transmitting through the directional antenna 130 and to the one or more electronic devices 20* the one or more queries to obtain one or more confirmations that the one or more electronic devices 20* provide the one or more functionalities by transmitting or communicating through the directional antenna 130 and to the one or more electronic devices 20* one or more queries (e.g., one or more low-power query signals 84) to obtain, via the confirmation obtaining module 526, one or more confirmations (e.g., one or more confirmation signals 85) that the one or more electronic devices 20* provide one or more sensor functionalities.

In various implementations, operation 845 may further include or involve an operation 846 for transmitting through the directional antenna and to the one or more electronic devices one or more queries to obtain one or more confirmations that the one or more electronic devices provide one or more sensor functionalities by transmitting through the directional antenna and to the one or more electronic devices one or more queries to obtain one or more confirmations that the one or more electronic devices provide one or more global positioning system (GPS) functionalities. For instance, the query communicating module 524 of the wearable computing device 10* of FIG. 4A or 4B transmitting through the directional antenna 130 and to the one or more electronic devices 20* one or more queries to obtain one or more confirmations that the one or more electronic devices 20* provide one or more sensor functionalities by transmitting or communicating through the directional antenna 130 and to the one or more electronic devices 20* one or more queries (e.g., one or more low-power query signals 84) to obtain, via the confirmation obtaining module 526, one or more confirmations (e.g., one or more confirmation signals 85) that the one or more electronic devices 20* provide one or more global positioning system (GPS) functionalities (e.g., provide location data provided by a GPS device).

In the same or alternative implementations, operation 845 may additionally or alternatively include or involve an operation 847 for transmitting through the directional antenna and to the one or more electronic devices one or more queries to obtain one or more confirmations that the one or more electronic devices provide one or more sensor functionalities by transmitting through the directional antenna and to the one or more electronic devices one or more queries to obtain one or more confirmations that the one or more electronic devices provide one or more movement sensor functionalities. For instance, the query communicating module 524 of the wearable computing device 10* of FIG. 4A or 4B transmitting through the directional antenna 130 and to the one or more electronic devices 20* one or more queries to obtain one or more confirmations that the one or more electronic devices 20* provide one or more sensor functionalities by transmitting through the directional antenna 130 and to the one or more electronic devices 20* one or more queries (e.g., one or more low-power query signals 84) to obtain, via the confirmation obtaining module 526, one or more confirmations (e.g., one or more confirmation signals 85) that the one or more electronic devices 20* provide one or more movement sensor functionalities (e.g., sensor data provided by, for example, an accelerometer, an inertia sensor, a gyroscope, and so forth).

In the same or different implementations, operation 845 may additionally or alternatively include an operation 848 for transmitting through the directional antenna and to the one or more electronic devices one or more queries to obtain one or more confirmations that the one or more electronic devices provide one or more sensor functionalities by transmitting through the directional antenna and to the one or more electronic devices one or more queries to obtain one or more confirmations that the one or more electronic devices provide one or more visual and/or audio sensor functionalities as illustrated in FIG. 8F. For instance, the query communicating module 524 of the wearable computing device 10* of FIG. 4A or 4B transmitting through the directional antenna 130 and to the one or more electronic devices 20* one or more queries to obtain one or more confirmations that the one or more electronic devices 20* provide one or more sensor functionalities by transmitting or communicating through the directional antenna 130 and to the one or more electronic devices 20* one or more queries (e.g., one or more low-power query signals 84) to obtain, via the confirmation obtaining module 526, one or more confirmations (e.g., one or more confirmation signals 85) that the one or more electronic devices 20* provide one or more visual and/or audio sensor functionalities (e.g., image and/or audio data provided through, for example, one or more cameras and/or one or more microphones).

Figure 8G:
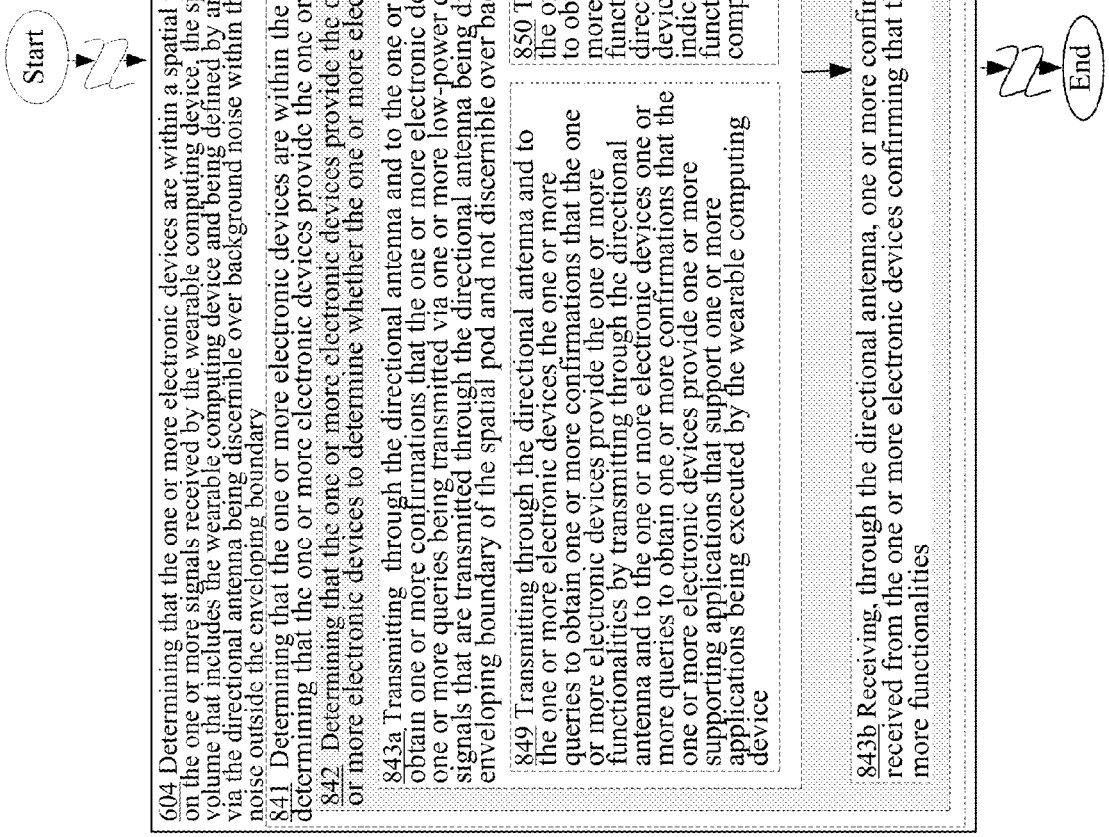
FIG. 8G is a high-level logic flowchart of a process depicting alternate implementations of the nearby determining operation 604 of FIG. 6.

In the same or alternative implementations, operation 843a may additionally or alternatively include or involve an operation 849 for transmitting through the directional antenna and to the one or more electronic devices the one or more queries to obtain one or more confirmations that the one or more electronic devices provide the one or more functionalities by transmitting through the directional antenna and to the one or more electronic devices one or more queries to obtain one or more confirmations that the one or more electronic devices provide one or more supporting applications that support one or more applications being executed by the wearable computing device as illustrated in FIG. 8G. For instance, the query communicating module 524 of the wearable computing device 10* of FIG. 4A or 4B transmitting through the directional antenna 130 and to the one or more electronic devices 20* the one or more queries to obtain one or more confirmations that the one or more electronic devices 20* provide the one or more functionalities by transmitting or communicating through the directional antenna 130 and to the one or more electronic devices 20* one or more queries (e.g., one or more low-power query signals 84) to obtain, via the confirmation obtaining module 526, one or more confirmations (e.g., one or more confirmation signals 85) that the one or more electronic devices 20* provide one or more supporting applications that support one or more applications being executed by the wearable computing device 10*. For example, if the wearable computing device 10* is executing an email application then the wearable computing device 10* obtaining a confirmation that the one or more electronic devices 20* provide the same or similar email application.

In the same or alternative implementations, operation 843a may additionally or alternatively include or involve an operation 850 for transmitting through the directional antenna and to the one or more electronic devices the one or more queries to obtain one or more confirmations that the one or more electronic devices provide the one or more functionalities including transmitting through the directional antenna and to the one or more electronic devices one or more queries to obtain one or more indications as to when will the one or more functionalities be available for use by the wearable computing device. For instance, the query communicating module 524 of the wearable computing device 10* of FIG. 4A or 4B transmitting through the directional antenna 130 and to the one or more electronic devices 20* the one or more queries to obtain one or more confirmations that the one or more electronic devices 20* provide the one or more functionalities including transmitting or communicating through the directional antenna 130 and to the one or more electronic devices 20* one or more queries (e.g., one or more low-power query signals 84) to obtain, via the confirmation obtaining module 526, one or more indications (e.g., one or more confirmation signals 85 that provide one or more indications) as to when will the one or more functionalities be available for use by the wearable computing device 10*.

Referring back to the functionality obtaining operation 606 of FIG. 6, the functionality obtaining operation 606 similar to the signal receiving operation 602 and the nearby determining operation 604 of FIG. 6 may be executed in a number of different ways in various alternative embodiments as illustrated in FIGS. 9A, 9B, 9C, and 9D. In some implementations, for example, the functionality obtaining operation 606 may include an operation 951 for obtaining at least the access to the one or more functionalities from the one or more electronic devices by obtaining, via the directional antenna, one or more channels to control the one or more functionalities. For instance, the functionality acquiring module 106* including the channel acquiring module 530 (see FIG. 5C) of the wearable computing device 10* of FIG. 4A or 4B obtaining at least the access to the one or more functionalities from the one or more electronic devices 20* when the channel acquiring module 530 obtains or acquires, via the directional antenna 130, one or more channels (e.g., communication links/interface) to control the one or more functionalities (e.g., sensor functionalities or application functionalities).

In the same or alternative implementations, the functionality obtaining operation 606 may include an operation 952 for obtaining at least the access to the one or more functionalities from the one or more electronic devices by obtaining, via the directional antenna, one or more channels for inputting data to the one or more functionalities. For instance, the functionality acquiring module 106* including the channel acquiring module 530 of the wearable computing device 10* of FIG. 4A or 4B obtaining at least the access to the one or more functionalities from the one or more electronic devices 20* when the channel acquiring module 530 obtains, via the directional antenna 130, one or more channels for inputting data (e.g., email text or a URL) to the one or more functionalities (e.g., access to the Internet via Wi-Fi or via cellular network) provided by the one or more electronic devices 20*.

In the same or alternative implementations, the functionality obtaining operation 606 may include an operation 953 for obtaining at least the access to the one or more functionalities from the one or more electronic devices by obtaining, via the directional antenna, one or more channels for outputting data from the one or more functionalities. For instance, the functionality acquiring module 106* including the channel acquiring module 530 of the wearable computing device 10* of FIG. 4A or 4B obtaining at least the access to the one or more functionalities from the one or more electronic devices 20* when the channel acquiring module 530 obtains or acquires, via the directional antenna 130, one or more channels for outputting data (e.g., a web page, an email or an instant message, sensor data including GPS data, and so forth) from the one or more functionalities (e.g., Internet access, sensor functionalities, and so forth).

Figure 9A:
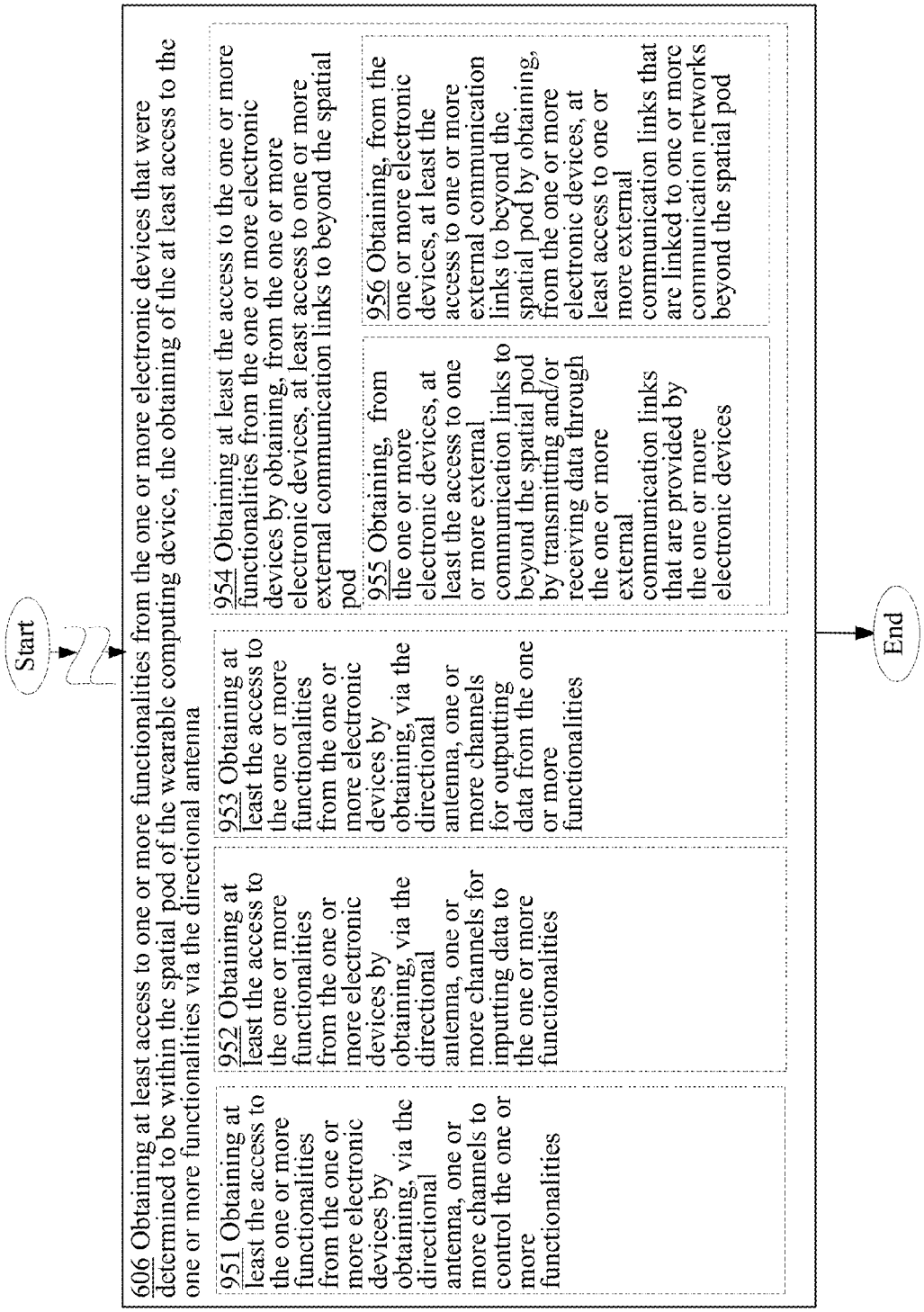
FIG. 9A is a high-level logic flowchart of a process depicting alternate implementations of the functionality obtaining operation 606 of FIG. 6.

In the same or alternative implementations, the functionality obtaining operation 606 may include an operation 954 for obtaining at least the access to the one or more functionalities from the one or more electronic devices by obtaining, from the one or more electronic devices, at least access to one or more external communication links to beyond the spatial pod as further illustrated in FIG. 9A. For instance, the functionality acquiring module 106* including the external communication link acquiring module 532 (see FIG. 5C) of the wearable computing device 10* of FIG. 4A or 4B obtaining at least the access to the one or more functionalities from the one or more electronic devices 20* when the external communication link acquiring module 532 obtains or acquires, from the one or more electronic devices 20*, at least access to one or more external communication links (e.g., Wi-Fi links and/or cellular network links such as 3G or 4G links) to beyond (outside) the spatial pod 50*.

In some cases, operation 954 may, in turn, further include an operation 955 for obtaining, from the one or more electronic devices, at least the access to one or more external communication links to beyond the spatial pod by transmitting and/or receiving data through the one or more external communication links that are provided by the one or more electronic devices. For instance, the external communication link acquiring module 532 including the data transmitting/receiving module 533 (see FIG. 5C) of the wearable computing device 10* of FIG. 4A or 4B obtaining, from the one or more electronic devices 20*, at least the access to one or more external communication links to beyond the spatial pod 50* when the data transmitting/receiving module 534 transmits and/or receives data through the one or more external communication links (e.g., Wi-Fi links, cellular network links, and/or Ethernet links) that are provided by the one or more electronic devices 20*.

In the same or alternative implementations, operation 954 may include an operation 956 for obtaining, from the one or more electronic devices, at least the access to one or more external communication links to beyond the spatial pod by obtaining, from the one or more electronic devices, at least access to one or more external communication links that are linked to one or more communication networks beyond the spatial pod. For instance, the external communication link acquiring module 532 of the wearable computing device 10* of FIG. 4A or 4B obtaining, from the one or more electronic devices 20*, at least the access to one or more external communication links to beyond the spatial pod 50* by obtaining or acquiring, from the one or more electronic devices 20*, at least access to one or more external communication links that are linked to one or more communication networks (e.g., WLAN, WAN, MAN, cellular data networks, PTSN, and so forth) beyond the spatial pod 50*.

Figure 9B:
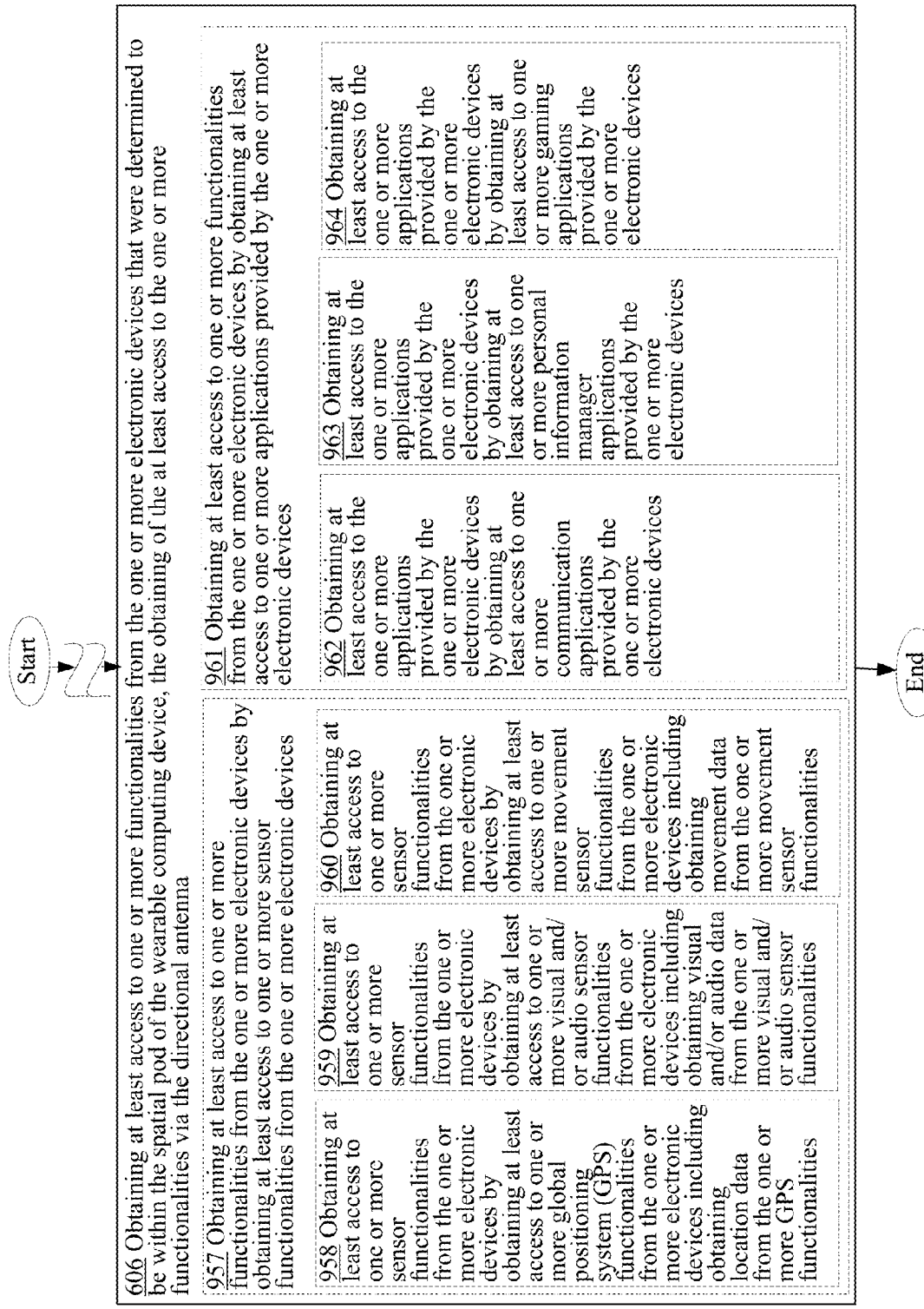
FIG. 9B is a high-level logic flowchart of a process depicting alternate implementations of the functionality obtaining operation 606 of FIG. 6.

Referring now to FIG. 9B, in some implementations, the functionality obtaining operation 606 may include an operation 957 for obtaining at least access to one or more functionalities from the one or more electronic devices by obtaining at least access to one or more sensor functionalities from the one or more electronic devices. For instance, the functionality acquiring module 106* including the sensor functionality acquiring module 534 (see FIG. 5C) of the wearable computing device 10* of FIG. 4A or 4B obtaining at least access to one or more functionalities from the one or more electronic devices 20* when the sensor functionality acquiring module 534 obtains or acquires at least access to one or more sensor functionalities (e.g., GPS functionalities, movement sensor functionalities, visual and/or audio sensing functionalities, and so forth) from the one or more electronic devices 20*.

As further illustrated in FIG. 9B, in some implementations, operation 957 may further include an operation 958 for obtaining at least access to one or more sensor functionalities from the one or more electronic devices by obtaining at least access to one or more global positioning system (GPS) functionalities from the one or more electronic devices including obtaining location data from the one or more GPS functionalities. For instance, the sensor functionality acquiring module 534 (see FIG. 5C) of the wearable computing device 10* of FIG. 4A or 4B obtaining at least access to one or more sensor functionalities from the one or more electronic devices 20* by obtaining at least access to one or more global positioning system (GPS) functionalities from the one or more electronic devices 20* including obtaining location data from the one or more GPS functionalities.

In the same or alternative implementations, operation 957 may additionally or alternatively include an operation 959 for obtaining at least access to one or more sensor functionalities from the one or more electronic devices by obtaining at least access to one or more visual and/or audio sensor functionalities from the one or more electronic devices including obtaining visual and/or audio data from the one or more visual and/or audio sensor functionalities. For instance, the sensor functionality acquiring module 534 (see FIG. 5C) of the wearable computing device 10* of FIG. 4A or 4B obtaining at least access to one or more sensor functionalities from the one or more electronic devices 20* by obtaining at least access to one or more visual and/or audio sensor functionalities from the one or more electronic devices 20* including obtaining visual and/or audio data from the one or more visual and/or audio sensor functionalities (e.g., functionalities provided by one or more image capturing devices such as cameras and/or provided one or more audio sensors such as microphones).

In the same or alternative implementations, operation 957 may additionally or alternatively include an operation 960 for obtaining at least access to one or more sensor functionalities from the one or more electronic devices by obtaining at least access to one or more movement sensor functionalities from the one or more electronic devices including obtaining movement data from the one or more movement sensor functionalities. For instance, the sensor functionality acquiring module 534 (see FIG. 5C) of the wearable computing device 10* of FIG. 4A or 4B obtaining at least access to one or more sensor functionalities from the one or more electronic devices 20* by obtaining at least access to one or more movement sensor functionalities from the one or more electronic devices 20* including obtaining movement data from the one or more movement sensor functionalities (e.g., movement data provided by one or more accelerometers, inertia sensors, gyroscope, and so forth).

In some implementations, the functionality obtaining operation 606 may include an operation 961 for obtaining at least access to one or more functionalities from the one or more electronic devices by obtaining at least access to one or more applications provided by the one or more electronic devices. For instance, the functionality acquiring module 106* including the application access acquiring module 535 (see FIG. 5C) of the wearable computing device 10* of FIG. 4A or 4B obtaining at least access to one or more functionalities from the one or more electronic devices 20* by obtaining at least access to one or more applications (e.g., communication applications such as email or instant messaging applications, personal information manager application such as Microsoft Outlook, gaming applications, and so forth) provided by the one or more electronic devices 20*.

As further illustrated in FIG. 9B, in various implementations, operation 961 may further include one or more additional operations including, in some cases, an operation 962 for obtaining at least access to the one or more applications provided by the one or more electronic devices by obtaining at least access to one or more communication applications provided by the one or more electronic devices. For instance, the application access acquiring module 535 of the wearable computing device 10* of FIG. 4A or 4B obtaining at least access to the one or more applications provided by the one or more electronic devices 20* by obtaining at least access to one or more communication applications (e.g., instant messaging application, VoIP application, text messaging application, email application, and so forth) provided by the one or more electronic devices 20*.

In the same or alternative implementations, operation 961 may additionally or alternatively include an operation 963 for obtaining at least access to the one or more applications provided by the one or more electronic devices by obtaining at least access to one or more personal information manager applications provided by the one or more electronic devices. For instance, the application access acquiring module 535 of the wearable computing device 10* of FIG. 4A or 4B obtaining at least access to the one or more applications provided by the one or more electronic devices 20* by obtaining at least access to one or more personal information manager applications (e.g., Microsoft Outlook) provided by the one or more electronic devices 20*.

In the same or alternative implementations, operation 961 may additionally or alternatively include an operation 964 for obtaining at least access to the one or more applications provided by the one or more electronic devices by obtaining at least access to one or more gaming applications provided by the one or more electronic devices. For instance, the application access acquiring module 535 of the wearable computing device 10* of FIG. 4A or 4B obtaining at least access to the one or more applications provided by the one or more electronic devices 20* by obtaining at least access to one or more gaming applications provided by the one or more electronic devices 20*.

Figure 9C:
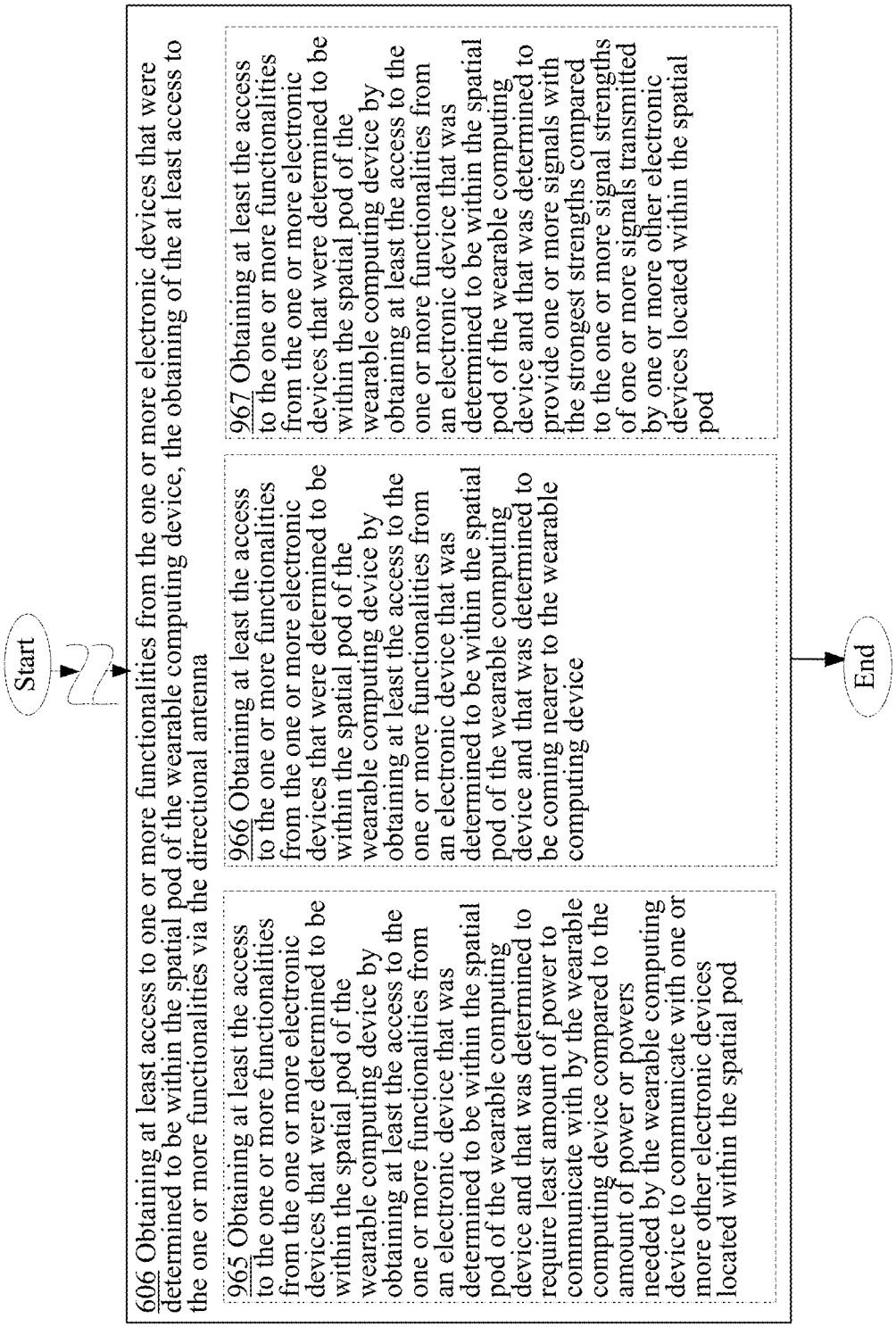
FIG. 9C is a high-level logic flowchart of a process depicting alternate implementations of the functionality obtaining operation 606 of FIG. 6.

Turning now to FIG. 9C, in various implementations, the functionality obtaining operation 606 may include an operation 965 for obtaining at least the access to the one or more functionalities from the one or more electronic devices that were determined to be within the spatial pod of the wearable computing device by obtaining at least the access to the one or more functionalities from an electronic device that was determined to be within the spatial pod of the wearable computing device and that was determined to require least amount of power to communicate with by the wearable computing device compared to the amount of power or powers needed by the wearable computing device to communicate with one or more other electronic devices located within the spatial pod. For instance, the functionality acquiring module 106* including the communication optimal device ascertaining module 536 (see FIG. 5C) of the wearable computing device 10* of FIG. 4A or 4B obtaining at least the access to the one or more functionalities from the one or more electronic devices 20* that were determined to be within the spatial pod 50* of the wearable computing device 10* by obtaining at least the access to the one or more functionalities from an electronic device 20* that was determined (e.g. as determined by the nearby ascertaining module 104*) to be within the spatial pod 50* of the wearable computing device 10* and that was determined, by the communication optimal device ascertaining module 536, to require least amount of power to communicate with by the wearable computing device 10* compared to the amount of power or powers needed by the wearable computing device 10* to communicate with one or more other electronic devices 20* located within the spatial pod 50*.

In the same or alternative implementations, the functionality obtaining operation 606 may additionally or alternatively include an operation 966 for obtaining at least the access to the one or more functionalities from the one or more electronic devices that were determined to be within the spatial pod of the wearable computing device by obtaining at least the access to the one or more functionalities from an electronic device that was determined to be within the spatial pod of the wearable computing device and that was determined to be coming nearer to the wearable computing device. For instance, the functionality acquiring module 106* including the approaching device ascertaining module 538 (see FIG. 5C) of the wearable computing device 10* of FIG. 4A or 4B obtaining at least the access to the one or more functionalities from the one or more electronic devices 20* that were determined to be within the spatial pod 50* of the wearable computing device 10* by obtaining at least the access to the one or more functionalities from an electronic device 20* that was determined (e.g. as determined by the nearby ascertaining module 104*) to be within the spatial pod 50* of the wearable computing device 10* and that was determined, by the approaching device ascertaining module 538, to be coming nearer to the wearable computing device 10*.

In the same or alternative implementations, the functionality obtaining operation 606 may additionally or alternatively include an operation 967 for obtaining at least the access to the one or more functionalities from the one or more electronic devices that were determined to be within the spatial pod of the wearable computing device by obtaining at least the access to the one or more functionalities from an electronic device that was determined to be within the spatial pod of the wearable computing device and that was determined to provide one or more signals with the strongest strengths compared to the one or more signal strengths of one or more signals transmitted by one or more other electronic devices located with the spatial pod. For instance, the functionality acquiring module 106* including the strongest signal strength device ascertaining module 540 (see FIG. 5C) of the wearable computing device 10* of FIG. 4A or 4B obtaining at least the access to the one or more functionalities from the one or more electronic devices 20* that were determined to be within the spatial pod 50* of the wearable computing device 10* by obtaining at least the access to the one or more functionalities from an electronic device 20* that was determined (e.g. as determined by the nearby ascertaining module 104*) to be within the spatial pod 50* of the wearable computing device 10* and that was determined by the strongest signal strength device ascertaining module 540 to provide one or more signals with the strongest strengths compared to the signal strengths of one or more signals transmitted by one or more other electronic devices 10* located within the spatial pod 50*.

Figure 9D:
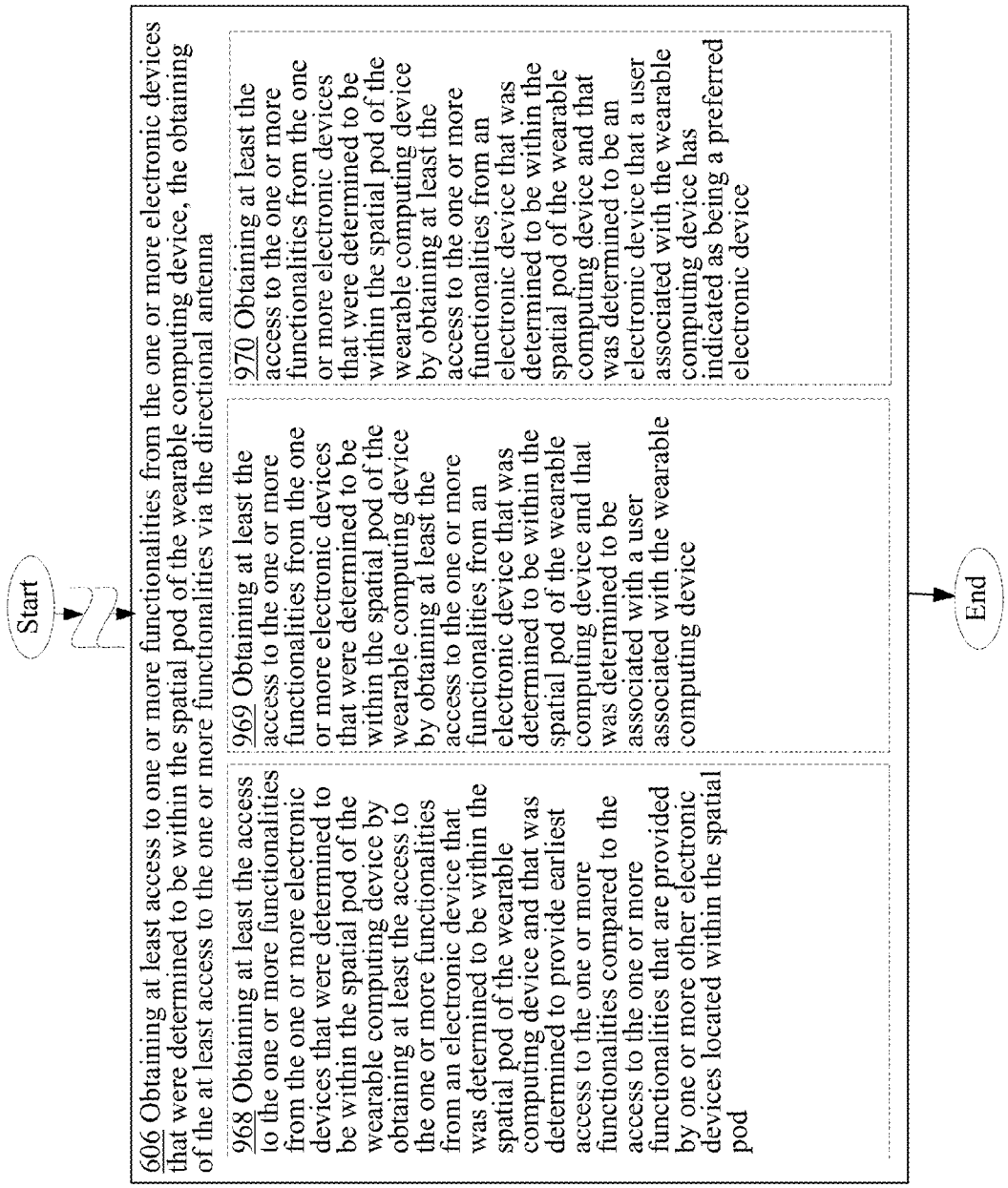
FIG. 9D is a high-level logic flowchart of a process depicting alternate implementations of the functionality obtaining operation 606 of FIG. 6.

Referring now to FIG. 9D, in the same or alternative implementations, the functionality obtaining operation 606 may additionally or alternatively include an operation 968 for obtaining at least the access to the one or more functionalities from the one or more electronic devices that were determined to be within the spatial pod of the wearable computing device by obtaining at least the access to the one or more functionalities from an electronic device that was determined to be within the spatial pod of the wearable computing device and that was determined to provide earliest access to the one or more functionalities compared to the access to the one or more functionalities that are provided by one or more other electronic devices located within the spatial pod. For instance, the functionality acquiring module 106* including the earliest functionality access providing device ascertaining module 542 (see FIG. 5C) of the wearable computing device 10* of FIG. 4A or 4B obtaining at least the access to the one or more functionalities from the one or more electronic devices 20* that were determined to be within the spatial pod 50* of the wearable computing device 10* by obtaining at least the access to the one or more functionalities from an electronic device 20* that was determined (e.g. as determined by the nearby ascertaining module 104*) to be within the spatial pod 50* of the wearable computing device 10* and that was determined by the earliest functionality access providing device ascertaining module 542 to provide earliest access to the one or more functionalities compared to the access to the one or more functionalities that are provided by one or more other electronic devices 20* located within the spatial pod 50*. In some cases, a determination as to which nearby electronic device 20* provides earliest access to a particular functionality may be accomplished by querying each nearby electronic device 20* in order to ascertain which nearby electronic device 20* will provide earliest access to the particular functionality.

In the same or alternative implementations, the functionality obtaining operation 606 may additionally or alternatively include an operation 969 for obtaining at least the access to the one or more functionalities from the one or more electronic devices that were determined to be within the spatial pod of the wearable computing device by obtaining at least the access to the one or more functionalities from an electronic device that was determined to be within the spatial pod of the wearable computing device and that was determined to be associated with a user associated with the wearable computing device. For instance, the functionality acquiring module 106* including the common user associated device ascertaining module 543 (see FIG. 5C) of the wearable computing device 10* of FIG. 4A or 4B obtaining at least the access to the one or more functionalities from the one or more electronic devices 20* that were determined to be within the spatial pod 50* of the wearable computing device 10* by obtaining at least the access to the one or more functionalities from an electronic device 20* that was determined (e.g. as determined by the nearby ascertaining module 104*) to be within the spatial pod 50* of the wearable computing device 10* and that was determined by the common user associated device ascertaining module 543 to be associated with a user associated with the wearable computing device 10*. In some cases, the determination as to whether a particular nearby electronic device 20* is associated with a particular user who is also associated with the wearable computing device 10* may be accomplished by querying the particular nearby electronic device 10* in order to prompt the particular nearby electronic device 20* to provide a user identifier that identifies the user associated with the particular nearby electronic device 20* and that matches with a user identifier of a user who is associated with (e.g., has log-in privileges with) the wearable computing device 10*.

In the same or alternative implementations, the functionality obtaining operation 606 may additionally or alternatively include an operation 970 for obtaining at least the access to the one or more functionalities from the one or more electronic devices that were determined to be within the spatial pod of the wearable computing device by obtaining at least the access to the one or more functionalities from an electronic device that was determined to be within the spatial pod of the wearable computing device and that was determined to be an electronic device that a user associated with the wearable computing device has indicated as being a preferred electronic device. For instance, the functionality acquiring module 106* including the preferred device ascertaining module 546 (see FIG. 5C) of the wearable computing device 10* of FIG. 4A or 4B obtaining at least the access to the one or more functionalities from the one or more electronic devices 20* that were determined to be within the spatial pod 50* of the wearable computing device 10* by obtaining at least the access to the one or more functionalities from an electronic device 20* that was determined to be within the spatial pod 50* of the wearable computing device 10* and that was determined by the preferred device ascertaining module 546 to be an electronic device 20* that a user associated with the wearable computing device 10* has indicated as being a preferred electronic device. For example, a user of the wearable computing device 10* may prefer to use only devices that he/she is associated with or only devices that are linked to a Wi-Fi network. In various embodiments, such preferences may be inputted into the wearable computing device 10*. Based on such a preference, the wearable computing device 10* may obtain particular functionalities from preferred devices.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," "in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A wearable computing device designed to be worn by a user, comprising:
   a directional antenna;
   a signal capturing module configured to capture one or more signals through the directional antenna, the one or more signals having been transmitted by one or more electronic devices;
   a nearby ascertaining module configured to ascertain that the one or more electronic devices that transmitted the one or more signals are within a spatial pod of the wearable computing device based, at least in part, on the one or more signals captured through the directional antenna, the spatial pod of the wearable computing device being a spatial volume that includes the wearable computing device and being defined by an enveloping boundary, where low-power signals transmitted via the directional antenna being discernible over background noise within the enveloping boundary and not discernible over background noise outside the enveloping boundary; and
   a functionality acquiring module configured to acquire, via the directional antenna, at least access to one or more functionalities from the one or more electronic devices that were ascertained to be within the spatial pod of the wearable computing device.

2. The wearable computing device of claim 1, wherein said directional antenna, comprises:
   a metamaterial antenna.

3. The wearable computing device of claim 1, wherein said signal capturing module configured to capture one or more signals through the directional antenna, the one or more signals having been transmitted by one or more electronic devices comprises:
   a signal capturing module configured to capture through the directional antenna one or more signals having one or more frequencies from the 60 GHz frequency band.

4. The wearable computing device of claim 1, wherein said signal capturing module configured to capture one or more signals through the directional antenna, the one or more signals having been transmitted by one or more electronic devices comprises:
   a low-power prompting signal broadcasting module configured to broadcast, via the directional antenna, one or more low-power prompting signals that are designed to prompt the one or more electronic devices to, upon the one or more electronic devices receiving the one or more low-power prompting signals, transmit the one or more signals, the one or more low-power prompting signals broadcasted by the wearable computing device being discernible over background noise within the enveloping boundary and not discernible over background noise outside the enveloping boundary; and
   a subsequent signal capturing module configured to capture the one or more signals via the directional antenna following broadcast of the one or more low-power prompting signals by the low-power prompting signal broadcasting module.

5. The wearable computing device of claim 4, wherein said low-power prompting signal broadcasting module configured to broadcast, via the directional antenna, one or more low-power prompting signals that are designed to prompt the one or more electronic devices to, upon the one or more electronic devices receiving the one or more low-power prompting signals, transmit the one or more signals, the one or more low-power prompting signals broadcasted by the wearable computing device being discernible over background noise within the enveloping boundary and not discernible over background noise outside the enveloping boundary comprises:
   a low-power prompting signal broadcasting module configured to broadcast, via the directional antenna, one or more low-power prompting signals that are transmitted with less than 0.6 milliwatt of transmit power.

6. The wearable computing device of claim 4, wherein said low-power prompting signal broadcasting module configured to broadcast, via the directional antenna, one or more low-power prompting signals that are designed to prompt the one or more electronic devices to, upon the one or more electronic devices receiving the one or more low-power prompting signals, transmit the one or more signals, the one or more low-power prompting signals broadcasted by the wearable computing device being discernible over background noise within the enveloping boundary and not discernible over background noise outside the enveloping boundary comprises:
   a varying low-power prompting signal broadcasting module configured to broadcast, via the directional antenna, the one or more low-power prompting signals at different levels of transmit powers.

7. The wearable computing device of claim 6, wherein said varying low-power prompting signal broadcasting module configured to broadcast, via the directional antenna, the one or more low-power prompting signals at different levels of transmit powers comprises:
   a varying low-power prompting signal broadcasting module configured to broadcast the one or more low-power prompting signals at different levels of transmit powers less than 0.8 milliwatt.

8. The wearable computing device of claim 6, wherein said varying low-power prompting signal broadcasting module configured to broadcast, via the directional antenna, the one or more low-power prompting signals at different levels of transmit powers comprises:
  a varying low-power prompting signal broadcasting module configured to broadcast the one or more low-power prompting signals at three or more different levels of transmit powers.

9. The wearable computing device of claim 6, wherein said varying low-power prompting signal broadcasting module configured to broadcast, via the directional antenna, the one or more low-power prompting signals at different levels of transmit powers comprises:
  a varying low-power prompting signal broadcasting module configured to broadcast the one or more low-power prompting signals at incrementally higher levels of transmit powers from a predefined lowest level of transmit power to a predefined highest level of transmit power.

10. The wearable computing device of claim 6, wherein said varying low-power prompting signal broadcasting module configured to broadcast, via the directional antenna, the one or more low-power prompting signals at different levels of transmit powers comprises:
  a varying low-power prompting signal broadcasting module configured to broadcast the one or more low-power prompting signals at the different levels of transmit powers and pausing after each transmission of the one or more low-power prompting signals at each of the different levels of transmit powers to monitor reception through the directional antenna of the one or more signals transmitted by the one or more electronic devices.

11. The wearable computing device of claim 4, wherein said low-power prompting signal broadcasting module configured to broadcast, via the directional antenna, one or more low-power prompting signals that are designed to prompt the one or more electronic devices to, upon the one or more electronic devices receiving the one or more low-power prompting signals, transmit the one or more signals, the one or more low-power prompting signals broadcasted by the wearable computing device being discernible over background noise within the enveloping boundary and not discernible over background noise outside the enveloping boundary, comprises:
  a low-power prompting signal broadcasting module configured to broadcast, via the directional antenna, the one or more low-power prompting signals away from an arm of a user wearing the wearable computing device in order to minimize exposing the arm of the user to the low-power prompting signals.

12. The wearable computing device of claim 4, wherein said low-power prompting signal broadcasting module configured to broadcast, via the directional antenna, one or more low-power prompting signals that are designed to prompt the one or more electronic devices to, upon the one or more electronic devices receiving the one or more low-power prompting signals, transmit the one or more signals, the one or more low-power prompting signals broadcasted by the wearable computing device being discernible over background noise within the enveloping boundary and not discernible over background noise outside the enveloping boundary comprises:
  a low-power prompting signal broadcasting module configured to broadcast, via the directional antenna, the one or more low-power prompting signals away from head of a user wearing the wearable computing device in order to minimize exposing the head of the user to the low-power prompting signals.

13. The wearable computing device of claim 4, wherein said subsequent signal capturing module configured to capture the one or more signals via the directional antenna following broadcast of the one or more low-power prompting signals by the low-power prompting signal broadcasting module comprises:
  a subsequent signal capturing module configured to capture, via the directional antenna, one or more responsive signals that were transmitted by the one or more electronic devices in response to the one or more electronic devices receiving the one or more low-power prompting signals.

14. The wearable computing device of claim 4, wherein said subsequent signal capturing module configured to capture the one or more signals via the directional antenna following broadcast of the one or more low-power prompting signals by the low-power prompting signal broadcasting module comprises:
  a signal strength detecting module configured to detect for signal strengths of the one or more signals captured by the direction antenna.

15. The wearable computing device of claim 1, wherein said nearby ascertaining module configured to ascertain that the one or more electronic devices that transmitted the one or more signals are within a spatial pod of the wearable computing device based, at least in part, on the one or more signals captured through the directional antenna, the spatial pod of the wearable computing device being a spatial volume that includes the wearable computing device and being defined by an enveloping boundary, where low-power signals transmitted via the directional antenna being discernible over background noise within the enveloping boundary and not discernible over background noise outside the enveloping boundary comprises:
  a nearby ascertaining module including a responsive signal ascertaining module configured to ascertain that the one or more electronic devices are within the spatial pod of the wearable computing device based, at least in part, on the responsive signal ascertaining module ascertaining that the one or more signals captured through the directional antenna are one or more responsive signals that were transmitted by the one or more electronic devices in response to the one or more electronic devices receiving one or more low-power prompting signals broadcasted from the wearable computing device, the one or more low-power prompting signals that were broadcasted from the wearable computing device being discernible over background noise within the enveloping boundary and not discernible over background noise outside the enveloping boundary.

16. The wearable computing device of claim 15, wherein said nearby ascertaining module including a responsive signal ascertaining module configured to ascertain that the one or more electronic devices are within the spatial pod of the wearable computing device based, at least in part, on the responsive signal ascertaining module ascertaining that the one or more signals captured through the directional antenna are one or more responsive signals that were transmitted by the one or more electronic devices in response to the one or more electronic devices receiving one or more low-power prompting signals broadcasted from the wearable computing device, the one or more low-power prompting signals that were broadcasted from the wearable computing device being discernible over background noise within the enveloping boundary and not discernible over background noise outside the enveloping boundary comprises:

a nearby ascertaining module including a responsive signal ascertaining module configured to ascertain that the one or more electronic devices are within the spatial pod of the wearable computing device based, at least in part, on the responsive signal ascertaining module ascertaining that the one or more signals captured by the wearable computing device are one or more responsive signals that were transmitted by the one or more electronic devices in response to the one or more electronic devices receiving one or more low-power prompting signals from the wearable computing device that were broadcasted by the wearable computing device with 0.5 milliwatt or less of transmit power via the directional antenna.

17. The wearable computing device of claim 1, wherein said nearby ascertaining module configured to ascertain that the one or more electronic devices that transmitted the one or more signals are within a spatial pod of the wearable computing device based, at least in part, on the one or more signals captured through the directional antenna, the spatial pod of the wearable computing device being a spatial volume that includes the wearable computing device and being defined by an enveloping boundary, where low-power signals transmitted via the directional antenna being discernible over background noise within the enveloping boundary and not discernible over background noise outside the enveloping boundary comprises:

a nearby ascertaining module including a beacon signal ascertaining module configured to ascertain that the one or more electronic devices are within the spatial pod of the wearable computing device based, at least in part, on beacon signal ascertaining module ascertaining that the one or more signals received by the wearable computing device are one or more received beacon signals that were captured through the directional antenna and that were determined to have one or more signal strengths greater than a predefined amount of signal strength, the one or more received beacon signals having been transmitted by the one or more electronic devices with one or more predefined amounts of transmit powers.

18. The wearable computing device of claim 17, wherein said nearby ascertaining module including a beacon signal ascertaining module configured to ascertain that the one or more electronic devices are within the spatial pod of the wearable computing device based, at least in part, on beacon signal ascertaining module ascertaining that the one or more signals received by the wearable computing device are one or more received beacon signals that were captured through the directional antenna and that were determined to have one or more signal strengths greater than a predefined amount of signal strength, the one or more received beacon signals having been transmitted by the one or more electronic devices with one or more predefined amounts of transmit powers comprises:

a nearby ascertaining module including a beacon signal ascertaining module configured to ascertain that the one or more electronic devices are within the spatial pod of the wearable computing device by determining that a plurality of electronic devices are within the spatial pod of the wearable computing device based, at least in part, on the beacon signal ascertaining module ascertaining that a plurality of signals that were captured through the directional antenna are a plurality of captured beacon signals that were determined to have one or more signal strengths greater than the predefined amount of signal strength, the plurality of captured beacon signals having been transmitted by the plurality of electronic devices with one or more predefined amounts of transmit powers.

19. The wearable computing device of claim 18, wherein said nearby ascertaining module including a beacon signal ascertaining module configured to ascertain that the one or more electronic devices are within the spatial pod of the wearable computing device by determining that a plurality of electronic devices are within the spatial pod of the wearable computing device based, at least in part, on the beacon signal ascertaining module ascertaining that a plurality of signals that were captured through the directional antenna are a plurality of captured beacon signals that were determined to have one or more signal strengths greater than the predefined amount of signal strength, the plurality of captured beacon signals having been transmitted by the plurality of electronic devices with one or more predefined amounts of transmit powers comprises:

a nearby ascertaining module including a beacon signal ascertaining module configured to ascertain that the plurality of electronic devices are within the spatial pod of the wearable computing device based, at least in part, on the beacon signal ascertaining module ascertaining that the plurality of signals that were captured through the directional antenna are a plurality of captured beacon signals that were determined to have varying signal strengths greater than the predefined amount of signal strength, the plurality of captured beacon signals having been transmitted by the plurality of electronic devices with one or more predefined amounts of transmit powers.

20. The wearable computing device of claim 19, wherein said nearby ascertaining module including a beacon signal ascertaining module configured to ascertain that the plurality of electronic devices are within the spatial pod of the wearable computing device based, at least in part, on the beacon signal ascertaining module ascertaining that the plurality of signals that were captured through the directional antenna are a plurality of captured beacon signals that were determined to have varying signal strengths greater than the predefined amount of signal strength, the plurality of captured beacon signals having been transmitted by the plurality of electronic devices with one or more predefined amounts of transmit powers comprises:

a nearby ascertaining module configured to ascertain which of the plurality of electronic devices are nearest to the wearable computing device based, at least in part, on the determined signal strengths of the plurality of captured beacon signals that were captured through the directional antenna and that were transmitted by the plurality of electronic devices.

21. The wearable computing device of claim 1, wherein said nearby ascertaining module configured to ascertain that the one or more electronic devices that transmitted the one or more signals are within a spatial pod of the wearable computing device based, at least in part, on the one or more signals captured through the directional antenna, the spatial pod of the wearable computing device being a spatial volume that includes the wearable computing device and being defined by an enveloping boundary, where low-power signals transmitted via the directional antenna being discernible over background noise within the enveloping boundary and not discernible over background noise outside the enveloping boundary comprises:

a nearby ascertaining module configured to ascertain that the one or more electronic devices are within the spatial pod of the wearable computing device based, at least in part, on the one or more signals captured through the directional antenna, the spatial pod of the wearable computing device being a spatial volume that includes the wearable computing device and being defined by an enveloping boundary, where low-power signals that are broadcasted via the directional antenna with 0.5 milliwatt or less of transmit power being discernible over background noise within the enveloping boundary and not discernible over background noise outside the enveloping boundary.

22. The wearable computing device of claim 1, wherein said nearby ascertaining module configured to ascertain that the one or more electronic devices that transmitted the one or more signals are within a spatial pod of the wearable computing device based, at least in part, on the one or more signals captured through the directional antenna, the spatial pod of the wearable computing device being a spatial volume that includes the wearable computing device and being defined by an enveloping boundary, where low-power signals transmitted via the directional antenna being discernible over background noise within the enveloping boundary and not discernible over background noise outside the enveloping boundary comprises:
an endowed functionality ascertaining module configured to ascertain that the one or more electronic devices provide the one or more functionalities.

23. The wearable computing device of claim 22, wherein said endowed functionality ascertaining module configured to ascertain that the one or more electronic devices provide the one or more functionalities comprises:
a functionality querying module configured to query each of the one or more electronic devices to determine whether the one or more electronic devices provide the one or more functionalities.

24. The wearable computing device of claim 23, wherein said functionality querying module configured to query each of the one or more electronic devices to determine whether the one or more electronic devices provide the one or more functionalities comprises:
a query communicating module configured to communicate through the directional antenna and to the one or more electronic devices one or more queries to obtain one or more confirmations that the one or more electronic devices provide the one or more functionalities, the one or more queries being communicated via one or more low-power query signals, the one or more low-power query signals that are communicated through the directional antenna being discernible over background noise within the enveloping boundary of the spatial pod and not discernible over background noise outside the enveloping boundary; and
a confirmation obtaining module configured to obtain, through the directional antenna, one or more confirmations via one or more confirmation signals that are obtained from the one or more electronic devices confirming that the one or more electronic devices provide the one or more functionalities.

25. The wearable computing device of claim 24, wherein said query communicating module configured to communicate through the directional antenna and to the one or more electronic devices one or more queries to obtain one or more confirmations that the one or more electronic devices provide the one or more functionalities, the one or more queries being communicated via one or more low-power query signals, the one or more low-power query signals that are communicated through the directional antenna being discernible over background noise within the enveloping boundary of the spatial pod and not discernible over background noise outside the enveloping boundary comprises:
a query communicating module configured to communicate through the directional antenna and to the one or more electronic devices one or more queries to obtain one or more confirmations that the one or more electronic devices provide one or more communication links to beyond the spatial pod.

26. The wearable computing device of claim 24, wherein said query communicating module configured to communicate through the directional antenna and to the one or more electronic devices one or more queries to obtain one or more confirmations that the one or more electronic devices provide the one or more functionalities, the one or more queries being communicated via one or more low-power query signals, the one or more low-power query signals that are communicated through the directional antenna being discernible over background noise within the enveloping boundary of the spatial pod and not discernible over background noise outside the enveloping boundary comprises:
a query communicating module configured to communicate through the directional antenna and to the one or more electronic devices one or more queries to obtain one or more confirmations that the one or more electronic devices provide one or more sensor functionalities.

27. The wearable computing device of claim 24, wherein said query communicating module configured to communicate through the directional antenna and to the one or more electronic devices one or more queries to obtain one or more confirmations that the one or more electronic devices provide the one or more functionalities, the one or more queries being communicated via one or more low-power query signals, the one or more low-power query signals that are communicated through the directional antenna being discernible over background noise within the enveloping boundary of the spatial pod and not discernible over background noise outside the enveloping boundary comprises:
a query communicating module configured to communicate through the directional antenna and to the one or more electronic devices one or more queries to obtain one or more confirmations that the one or more electronic devices provide one or more supporting applications that support one or more applications being executed by the wearable computing device.

28. The wearable computing device of claim 24, wherein said query communicating module configured to communicate through the directional antenna and to the one or more electronic devices one or more queries to obtain one or more confirmations that the one or more electronic devices provide the one or more functionalities, the one or more queries being communicated via one or more low-power query signals, the one or more low-power query signals that are communicated through the directional antenna being discernible over background noise within the enveloping boundary of the spatial pod and not discernible over background noise outside the enveloping boundary comprises:
a query communicating module configured to communicate through the directional antenna and to the one or more electronic devices one or more queries to obtain one or more indications as to when will the one or more functionalities be available for use by the wearable computing device.

29. The wearable computing device of claim 1, wherein said functionality acquiring module configured to acquire, via the directional antenna, at least access to one or more functionalities from the one or more electronic devices that were ascertained to be within the spatial pod of the wearable computing device comprises:
   a channel acquiring module configured to acquire, via the directional antenna, one or more channels to control the one or more functionalities.

30. The wearable computing device of claim 1, wherein said functionality acquiring module configured to acquire, via the directional antenna, at least access to one or more functionalities from the one or more electronic devices that were ascertained to be within the spatial pod of the wearable computing device comprises:
   an external communication link acquiring module configured to acquire, from the one or more electronic devices, at least access to one or more external communication links to beyond the spatial pod.

31. The wearable computing device of claim 1, wherein said functionality acquiring module configured to acquire, via the directional antenna, at least access to one or more functionalities from the one or more electronic devices that were ascertained to be within the spatial pod of the wearable computing device comprises:
   a sensor functionality acquiring module configured to acquire at least access to one or more sensor functionalities from the one or more electronic devices.

32. The wearable computing device of claim 31, wherein said sensor functionality acquiring module configured to acquire at least access to one or more sensor functionalities from the one or more electronic devices comprises:
   a sensor functionality acquiring module configured to acquire at least access to one or more visual and/or audio sensor functionalities from the one or more electronic devices including acquiring visual and/or audio data from the one or more visual and/or audio sensor functionalities.

33. The wearable computing device of claim 31, wherein said sensor functionality acquiring module configured to acquire at least access to one or more sensor functionalities from the one or more electronic devices comprises:
   a sensor functionality acquiring module configured to acquire at least access to one or more movement sensor functionalities from the one or more electronic devices including acquiring movement data from the one or more movement sensor functionalities.

34. The wearable computing device of claim 1, wherein said functionality acquiring module configured to acquire, via the directional antenna, at least access to one or more functionalities from the one or more electronic devices that were ascertained to be within the spatial pod of the wearable computing device comprises:
   an application access acquiring module configured to acquire at least access to one or more applications provided by the one or more electronic devices.

35. The wearable computing device of claim 34, wherein said application access acquiring module configured to acquire at least access to one or more applications provided by the one or more electronic devices comprises:
   an application access acquiring module configured to acquire at least access to one or more communication applications provided by the one or more electronic devices.

36. The wearable computing device of claim 1, wherein said functionality acquiring module configured to acquire, via the directional antenna, at least access to one or more functionalities from the one or more electronic devices that were ascertained to be within the spatial pod of the wearable computing device comprises:
   a functionality acquiring module including a communication optimal device ascertaining module configured to acquire at least the access to the one or more functionalities from an electronic device that was determined to be within the spatial pod of the wearable computing device and that was determined, by the communication optimal device ascertaining module, to require least amount of power to communicate with by the wearable computing device compared to the amount of power or powers needed by the wearable computing device to communicate with one or more other electronic devices located within the spatial pod.

37. The wearable computing device of claim 1, wherein said functionality acquiring module configured to acquire, via the directional antenna, at least access to one or more functionalities from the one or more electronic devices that were ascertained to be within the spatial pod of the wearable computing device comprises:
   a functionality acquiring module including an approaching device ascertaining module configured to acquire at least the access to the one or more functionalities from an electronic device that was determined to be within the spatial pod of the wearable computing device and that was determined, by the approaching device ascertaining module, to be coming nearer to the wearable computing device.

38. The wearable computing device of claim 1, wherein said functionality acquiring module configured to acquire, via the directional antenna, at least access to one or more functionalities from the one or more electronic devices that were ascertained to be within the spatial pod of the wearable computing device comprises:
   a functionality acquiring module including a strongest signal strength device ascertaining module configured to acquire at least the access to the one or more functionalities from an electronic device that was determined to be within the spatial pod of the wearable computing device and that was determined, by the strongest signal strength device ascertaining module to provide signals with the strongest strengths compared to the signal strengths of signals transmitted by one or more other electronic devices located with the spatial pod.

39. The wearable computing device of claim 1, wherein said functionality acquiring module configured to acquire, via the directional antenna, at least access to one or more functionalities from the one or more electronic devices that were ascertained to be within the spatial pod of the wearable computing device comprises:
   a functionality acquiring module including an earliest functionality access providing device ascertaining module configured to acquire at least the access to the one or more functionalities from an electronic device that was determined to be within the spatial pod of the wearable computing device and that was determined, by earliest functionality access providing device ascertaining module, to provide earliest access to the one or more functionalities compared to the access to the one or more functionalities that are provided by one or more other electronic devices located within the spatial pod.

40. The wearable computing device of claim 1, wherein said functionality acquiring module configured to acquire, via the directional antenna, at least access to one or more functionalities from the one or more electronic devices that were ascertained to be within the spatial pod of the wearable computing device comprises:
   a functionality acquiring module including a common user associated device ascertaining module configured to acquire at least the access to the one or more functionalities from an electronic device that was determined to be within the spatial pod of the wearable computing device and that was determined, by the common user associated device ascertaining module, to be associated with a user associated with the wearable computing device.

41. An article of manufacture, comprising:

a non-transitory storage medium bearing:

one or more instructions for capturing one or more signals through a directional antenna of a wearable computing device, the one or more signals having been transmitted by one or more electronic devices;

one or more instructions for ascertaining that the one or more electronic devices that transmitted the one or more signals are within a spatial pod of the wearable computing device based, at least in part, on the one or more signals captured through the directional antenna, the spatial pod of the wearable computing device being a spatial volume that includes the wearable computing device and being defined by an enveloping boundary, where low-power signals transmitted via the directional antenna being discernible over background noise within the enveloping boundary and not discernible over background noise outside the enveloping boundary; and one or more instructions for acquiring, via the directional antenna, at least access to one or more functionalities from the one or more electronic devices that were ascertained to be within the spatial pod of the wearable computing device.

42. A wearable computing device, comprising:

a directional antenna;

a signal capturing module configured to capture one or more signals through the directional antenna, the one or more signals having been transmitted by one or more electronic devices;

a nearby ascertaining module configured to ascertain that the one or more electronic devices that transmitted the one or more signals are within a spatial pod of the wearable computing device based, at least in part, on the one or more signals captured through the directional antenna, the spatial pod of the wearable computing device being a spatial volume that includes the wearable computing device and being defined by an enveloping boundary, where low-power signals transmitted via the directional antenna being discernible over background noise within the enveloping boundary and not discernible over background noise outside the enveloping boundary;

a functionality acquiring module configured to acquire, via the directional antenna, at least access to one or more functionalities from the one or more electronic devices that were ascertained to be within the spatial pod of the wearable computing device; and one or more components to facilitate coupling the wearable computing device to a portion of a user's body.

* * * * *